United States Patent
Hitomi et al.

(10) Patent No.: US 8,452,122 B2
(45) Date of Patent: May 28, 2013

(54) DEVICE, METHOD, AND COMPUTER-READABLE MEDIUM FOR IMAGE RESTORATION

(75) Inventors: Yasunobu Hitomi, Kanagawa (JP); Tomoo Mitsunaga, Kanagawa (JP)

(73) Assignee: Sony Corporartion, Tokyo (JP)

( * ) Notice: Subject to any disclaimer, the term of this patent is extended or adjusted under 35 U.S.C. 154(b) by 950 days.

(21) Appl. No.: 12/545,335

(22) Filed: Aug. 21, 2009

(65) Prior Publication Data

US 2010/0046859 A1    Feb. 25, 2010

(30) Foreign Application Priority Data

Aug. 25, 2008   (JP) ................. P2008-215136

(51) Int. Cl.
| G06K 9/40 | (2006.01) |
| G09G 1/14 | (2006.01) |
| G09G 3/28 | (2006.01) |
| G09G 3/30 | (2006.01) |
| G09G 5/02 | (2006.01) |
| G09G 5/10 | (2006.01) |
| G06F 12/06 | (2006.01) |
| H04N 9/64 | (2006.01) |
| H04N 5/202 | (2006.01) |
| H04N 1/40 | (2006.01) |

(52) U.S. Cl.
USPC ............ 382/275; 382/274; 345/20; 345/63; 345/77; 345/571; 345/596; 345/690; 348/251; 348/254; 358/461

(58) Field of Classification Search
None
See application file for complete search history.

(56) References Cited

U.S. PATENT DOCUMENTS

| 7,834,917 B2* | 11/2010 | Kinoshita et al. ............. 348/241 |
| 8,000,563 B2* | 8/2011 | Yoshino et al. ............... 382/300 |
| 8,009,209 B2* | 8/2011 | Chapman et al. ............. 348/246 |
| 2001/0005429 A1* | 6/2001 | Ishiga et al. ................. 382/167 |

(Continued)

FOREIGN PATENT DOCUMENTS

| JP | 2006-135919 | 5/2006 |
| JP | 2006-339699 | 12/2006 |

(Continued)

OTHER PUBLICATIONS

European Search Report dated Dec. 1, 2009, in corresponding European Patent Application No. 09 25 1970.

(Continued)

*Primary Examiner* — Randolph I Chu
(74) *Attorney, Agent, or Firm* — Finnegan, Henderson, Farabow, Garrett & Dunner, L.L.P.

(57) ABSTRACT

An image processing apparatus includes: an assumed deteriorated image pixel value computing unit configured to calculate a pixel value of an assumed deteriorated image, wherein deterioration of a target image configured of multiple channels is assumed, for each of the channels as an assumed deteriorated image pixel value; a pseudo target image pixel value computing unit configured to calculate, regarding a pixel of interest that is a pixel of the target image corresponding to the assumed deteriorated image, a pixel value estimated for each of the channels as a pseudo target image pixel value for each of the channels based on the pixel values of the pixel of interest, and pixels adjacent thereto; and a restored image creating unit configured to create a restored image restored from the target image based on the calculated assumed deteriorated image pixel value and the calculated pseudo target image pixel value.

10 Claims, 49 Drawing Sheets

U.S. PATENT DOCUMENTS

| | | |
|---|---|---|
| 2003/0048368 A1* | 3/2003 | Bosco et al. .................. 348/272 |
| 2006/0050956 A1* | 3/2006 | Tanaka .......................... 382/162 |
| 2006/0098869 A1* | 5/2006 | Chen ............................. 382/167 |
| 2006/0198556 A1* | 9/2006 | Chen et al. .................... 382/162 |
| 2006/0245646 A1* | 11/2006 | Ishiga .......................... 382/167 |
| 2007/0236573 A1* | 10/2007 | Alon et al. ............... 348/207.99 |
| 2007/0292022 A1* | 12/2007 | Nilsson et al. ............... 382/167 |
| 2007/0296871 A1* | 12/2007 | Yoo et al. ..................... 348/701 |
| 2008/0095466 A1* | 4/2008 | Kinrot et al. ................. 382/284 |
| 2008/0218610 A1* | 9/2008 | Chapman et al. ............. 348/246 |
| 2008/0247643 A1* | 10/2008 | Ishiga .......................... 382/167 |
| 2008/0253652 A1* | 10/2008 | Gupta et al. .................. 382/167 |
| 2008/0285845 A1* | 11/2008 | Kang ............................ 382/162 |
| 2009/0010539 A1* | 1/2009 | Guarnera et al. ............. 382/167 |
| 2009/0097743 A1* | 4/2009 | Quan ............................ 382/163 |
| 2009/0129663 A1* | 5/2009 | Chen ............................. 382/149 |
| 2010/0013963 A1* | 1/2010 | Jannard et al. ................ 348/242 |
| 2012/0086838 A1* | 4/2012 | Ovsiannikov ................. 348/242 |

FOREIGN PATENT DOCUMENTS

| | | |
|---|---|---|
| JP | 2007-174276 | 7/2007 |
| JP | 2008-042313 | 2/2008 |
| JP | 2008-042874 | 2/2008 |
| WO | WO 2008/065641 A2 | 6/2008 |

OTHER PUBLICATIONS

P. Campisi et al., "Blind Image Deconvolution—Theory and Application", CRC Press, pp. 288-289, 2001.

* cited by examiner

FIG. 3

| R  | Gr | R  | Gr | R  | Gr |
|----|----|----|----|----|----|
| Gb | B  | Gb | B  | Gb | B  |
| R  | Gr | R  | Gr | R  | Gr |
| Gb | B  | Gb | B  | Gb | B  |
| R  | Gr | R  | Gr | R  | Gr |
| Gb | B  | Gb | B  | Gb | B  |

FIG. 51

| | | TARGET CHANNEL | | | |
|---|---|---|---|---|---|
| | | Gr | R | B | Gb |
| REFERENCE CHANNEL | Gr | O | O | O | O |
| | R | | O | O | |
| | B | | O | O | |
| | Gb | O | O | O | O |

DEVICE, METHOD, AND COMPUTER-READABLE MEDIUM FOR IMAGE RESTORATION

BACKGROUND OF THE INVENTION

1. Field of the Invention

The present invention relates to an image processing apparatus, and specifically relates to an image processing apparatus and an imaging apparatus which executes a restoration process regarding images, and a processing method according to these, and a program that causes a computer to execute the method thereof.

2. Description of the Related Art

Heretofore, a deteriorated image restoration process wherein a deteriorated image is restored has been widely familiar as an image processing technique. For example, in a case where a deteriorated model of an image and an observed image are known, this deteriorated image restoration process is a process wherein a subject image is restored from an observed image including deterioration. For example, in the case of assuming that a model of an observed image g, a deterioration matrix h, and noise n shown in Expression 1 are known, a subject image f shown in Expression 1 can be obtained.

$$g = h \otimes f + n \qquad \text{Expression 1}$$

$$error^2 = \|h \otimes \hat{f} - g\|^2 \qquad \text{Expression 2}$$

$$\hat{f}^{k+1} = \hat{f}^k + \lambda h^T \left( h \otimes \hat{f}^k - g \right) \qquad \text{Expression 3}$$

$$\hat{f}^{k+1} = \hat{f}^k \left( h \frac{g}{h \otimes \hat{f}^k} \right) \qquad \text{Expression 4}$$

$$\hat{f}^{k+1} = \hat{f}^k + a \left( h \otimes \hat{f}^k - g \right) \qquad \text{Expression 5}$$

$$\hat{f}^{k+1} = \hat{f}^k \left( b \frac{g}{h \otimes \hat{f}^k} \right) \qquad \text{Expression 6}$$

There is a method to solve this problem as a problem to minimize an error between an observed image and an estimated deteriorated image which is obtained as a convolution result of a deterioration matrix h and an estimated subject image f^ (shown in Expression 2), as one solution of this problem.

Also, as an iterative solution for this minimization problem, there are the Back-projection method shown in Expression 3 (e.g., "Landweber" in Patrizio Campisi, Karen Egiazarian: "Blind Image Deconvolution—Theory and Application", CRC Press, pp 288-289 (see (7.34) and (7.35) and others), and the Lucy-Richardson method shown in Expression 4 (e.g., see Patrizio Campisi, Karen Egiazarian: "Blind Image Deconvolution—Theory and Application", CRC Press, pp 288-289 (see (7.34) and (7.35) and others)). These are methods wherein an observed image and an estimated deteriorated image are compared by subtraction or division, and the obtained error and the value of a ratio are fed back to a restored image. With these methods, there are terms of products by employing a blurring matrix and a constant λ at the time of this feedback, but there is also a method wherein these are taken as an arbitrary matrix a or b (shown in Expression 5 and Expression 6).

SUMMARY OF THE INVENTION

The above-mentioned iterative solution shown as a technique according to the related art is a solution to execute multiple times of iterative processes regarding one observed image, or a solution to execute an iterative process regarding multiple observed images. In order to improve precision at the time of restoring an observed image by employing such an iterative solution, for example, the number of times of iteration has to be increased, or the number of frames of observed image has to be increased.

However, for example, in a case where an image to be imaged by an imaging apparatus such as a digital video camera (e.g., camera integral-type recorder) is subjected to a restoration process, it is important to execute this restoration process rapidly, and also to improve the precision of this restoration process. Thus, with each mode, it is important to improve precision at the time of restoring an image.

It has been found to be desirable to improve precision at the time of restoring an image.

According to an embodiment of the present invention, there are provided an image processing apparatus, a processing method according thereto, and a program that causes a computer to execute the method thereof, the image processing apparatus including: an assumed deteriorated image pixel value computing unit configured to calculate a pixel value of an assumed deteriorated image, which is an image where deterioration of a target image made up of a plurality of channels is assumed, for each of the channels as an assumed deteriorated image pixel value; a pseudo target image pixel value computing unit configured to calculate, regarding a pixel of interest that is a pixel of the target image corresponding to a pixel of the assumed deteriorated image, a pixel value estimated for each of the channels as a pseudo target image pixel value for each of the channels based on the pixel value of the pixel of interest, and the pixel values of pixels adjacent thereto; and a restored image creating unit configured to create a restored image restored from the target image based on the calculated assumed deteriorated image pixel value and the calculated pseudo target image pixel value. Thus, there is provided an effect wherein an assumed deteriorated image pixel value and a pseudo target image pixel value are calculated for each channel, and a restored image is created based on the calculated assumed deteriorated image pixel value and pseudo target image pixel value.

The pseudo target image pixel value computing unit may take the pixel value of the pixel of interest as the pseudo target image pixel value in the case of calculating the pseudo target image pixel value regarding the same channel as the channel of the pixel of interest, and calculates the pseudo target image pixel value based on the pixel value of the pixel of interest, and the pixel values of pixels adjacent thereto in the case of calculating the pseudo target image pixel value regarding a channel different from the channel of the pixel of interest. Thus, there is provided an effect wherein the pixel value of a pixel of interest is taken as a pseudo target image pixel value in the case of calculating a pseudo target image pixel value regarding the same channel as the channel of the pixel of interest, and a pseudo target image pixel value is calculated based on the pixel value of the pixel of interest, and the pixel values of pixels adjacent thereto in the case of calculating a pseudo target image pixel value regarding a channel different from the channel of the pixel of interest.

The pseudo target image pixel value computing unit may calculate the pseudo target image pixel value based on, of the pixels adjacent to the pixel of interest, the pixel value of a pixel having the same channel as the channel of the pixel of interest, and the pixel value of the pixel of interest, in the case of calculating the pseudo target image pixel value regarding a channel different from the channel of the pixel of interest. Thus, there is provided an effect wherein a pseudo target image pixel value is calculated based on, of the pixels adjacent to the pixel of interest, the pixel value of a pixel having the same channel as the channel of the pixel of interest, and the pixel value of the pixel of interest, in the case of calculating a pseudo target image pixel value regarding a channel different from the channel of the pixel of interest.

The pseudo target image pixel value computing unit may include: a spatial high-frequency component computing unit configured to calculate the spatial high-frequency component of each pixel of a first channel that is the channel of the pixel of interest of the pixels adjacent to the pixel of interest; a spatial low-frequency component computing unit configured to calculate the spatial low-frequency component of the first channel of the pixels adjacent to the pixel of interest; a second channel spatial low-frequency component computing unit configured to calculate the spatial low-frequency component of each pixel of a second channel that is a channel different from the first channel of the pixels adjacent to the pixel of interest; a spatial high-frequency component scaling coefficient computing unit configured to calculate the scaling coefficient of the spatial high-frequency component based on the spatial low-frequency component according to the second channel, and the spatial low-frequency component according to the first channel; and a pseudo target image pixel value computing unit configured to calculate the pseudo target image pixel value of the second channel based on the spatial low-frequency component according to the second channel, the spatial high-frequency component according to the first channel, and the scaling coefficient. Thus, there is provided an effect wherein the spatial high-frequency component and spatial low-frequency component of each pixel of the first channel are calculated, the spatial low-frequency component of each pixel of the second channel is calculated, a scaling coefficient is calculated based on the spatial low-frequency components according to the second channel and the spatial low-frequency components according to the first channel, and the pseudo target image pixel value of the second channel is calculated based on the spatial low-frequency components according to the second channel, the spatial high-frequency components according to the first channel, and the scaling coefficient.

The pseudo target image pixel value computing unit may include: a pixel distribution linear approximating unit configured to calculate a linear approximation straight line where a pixel value distribution regarding the pixel values of pixels of a first channel that is the channel of the pixel of interest, and a second channel that is a different channel from the first channel, of the pixel of interest, and the pixels adjacent thereto, is subjected to linear approximation; and a pixel value estimating unit configured to estimate the pseudo target image pixel value of the second channel from the pixel value of the pixel of interest by using the linear approximation straight line. Thus, there is provided an effect wherein a linear approximation straight line is calculated, and the pseudo target image pixel value of the second channel is estimated from the pixel value of a pixel of interest by using this linear approximation straight line.

The pseudo target image pixel value computing unit may include: an interpolating unit configured to interpolate, at the position of a pixel of a first channel that is the channel of the pixel of interest, of the pixels adjacent to the pixel of interest, the pixel values of two pixels of a second channel that is a channel different from the first channel to calculate an interpolation value; a first sum-of-products unit configured to integrate difference value weight corresponding to the difference value of the pixel of interest, and the pixel value of a pixel of the first channel adjacent thereto, distance weight corresponding to distance between the pixel of interest and a pixel of the first channel adjacent thereto, and the interpolation value for each pixel of the first channel of the pixels adjacent to the pixel of interest, and add the integrated values integrated for each of the pixels to calculate a first sum-of-products value; a second sum-of-products unit configured to integrate the difference value weight and the distance weight for each pixel of the first channel of the pixels adjacent to the pixel of interest, and add the integrated values integrated for each of the pixels to calculate a second sum-of-products value; and a pseudo target image pixel value computing unit configured to calculate the pseudo target image pixel value of the second channel based on the first sum-of-products value and the second sum-of-products value. Thus, there is provided an effect wherein the sum of products of difference value weight, distance weight, and an interpolation value is carried out to obtain a first sum-of-products value, the sum of products of difference value weight and distance weight is carried out to obtain a second sum-of-products value, and the pseudo target image pixel value of the second channel is calculated based on the first sum-of-products value and the second sum-of-products value.

The assumed deteriorated image pixel value computing unit may calculate the pixel values of the assumed deteriorated image by using the blurring function for each channel regarding the pixel values of the pixel corresponding to the pixel of interest and pixels adjacent thereto, which are pixels making up the restored image created most recently by the restored image creating unit. Thus, there is provided an effect wherein the pixel values of the assumed deteriorated image are calculated by using the blurring function for each channel regarding the pixel values of the pixel corresponding to the pixel of interest and pixels adjacent thereto with a restored image created most recently.

The image processing apparatus may further include: an updating signal computing unit configured to calculate the difference value between the calculated assumed deteriorated image pixel value and the calculated pseudo target image pixel value, and calculate an updating signal used for creating the restored image based on the difference value thereof, with the restored image creating unit creating the restored image based on the calculated updating signal. Thus, there is provided an effect wherein the difference value between an assumed deteriorated image pixel value and a pseudo target image pixel value is calculated, an updating signal is calculated based on the difference value, and a restored image is created based on this updating signal.

Also, an according to an embodiment of the present invention, there are provided an imaging apparatus, a processing method according thereto, and a program that causes a computer to execute the method thereof, the imaging apparatus including: an imaging unit configured to image a subject to generate an imaged image made up of a plurality of channels; an assumed deteriorated image pixel value computing unit configured to calculate the pixel values of an assumed deteriorated image that is an image where deterioration of the imaged image is assumed, for each of the channels as assumed deteriorated image pixel values; a pseudo target image pixel value computing unit configured to calculate, regarding a pixel of interest that is a pixel of the imaged image corresponding to a pixel of the assumed deteriorated image, a pixel value estimated for each of the channels as a pseudo target image pixel value for each of the channels based on the pixel value of the pixel of interest, and the pixel values of pixels adjacent thereto; and a restored image creating unit configured to create a restored image where the imaged image is restored, based on the calculated assumed deteriorated image pixel value, and the calculated pseudo target image pixel value. Thus, there is provided an effect wherein an assumed deteriorated image pixel value and a pseudo target image pixel value are calculated for each channel, and a restored image is created based on the calculated assumed deteriorated image pixel value and pseudo target image pixel value.

According to the above configurations, there is provided an excellent advantage wherein precision at the time of restoring an image can be improved.

BRIEF DESCRIPTION OF THE DRAWINGS

FIG. 3 is a diagram illustrating a Bayer array serving as an example of a color filter disposed on the light receiving surface of an imaging device according to an embodiment of the present invention;

FIG. 51 is a diagram illustrating relationship between a reference channel and a target channel used for the pseudo observed image pixel value calculating process according to an embodiment of the present invention.

DESCRIPTION OF THE PREFERRED EMBODIMENTS

Figure 1:
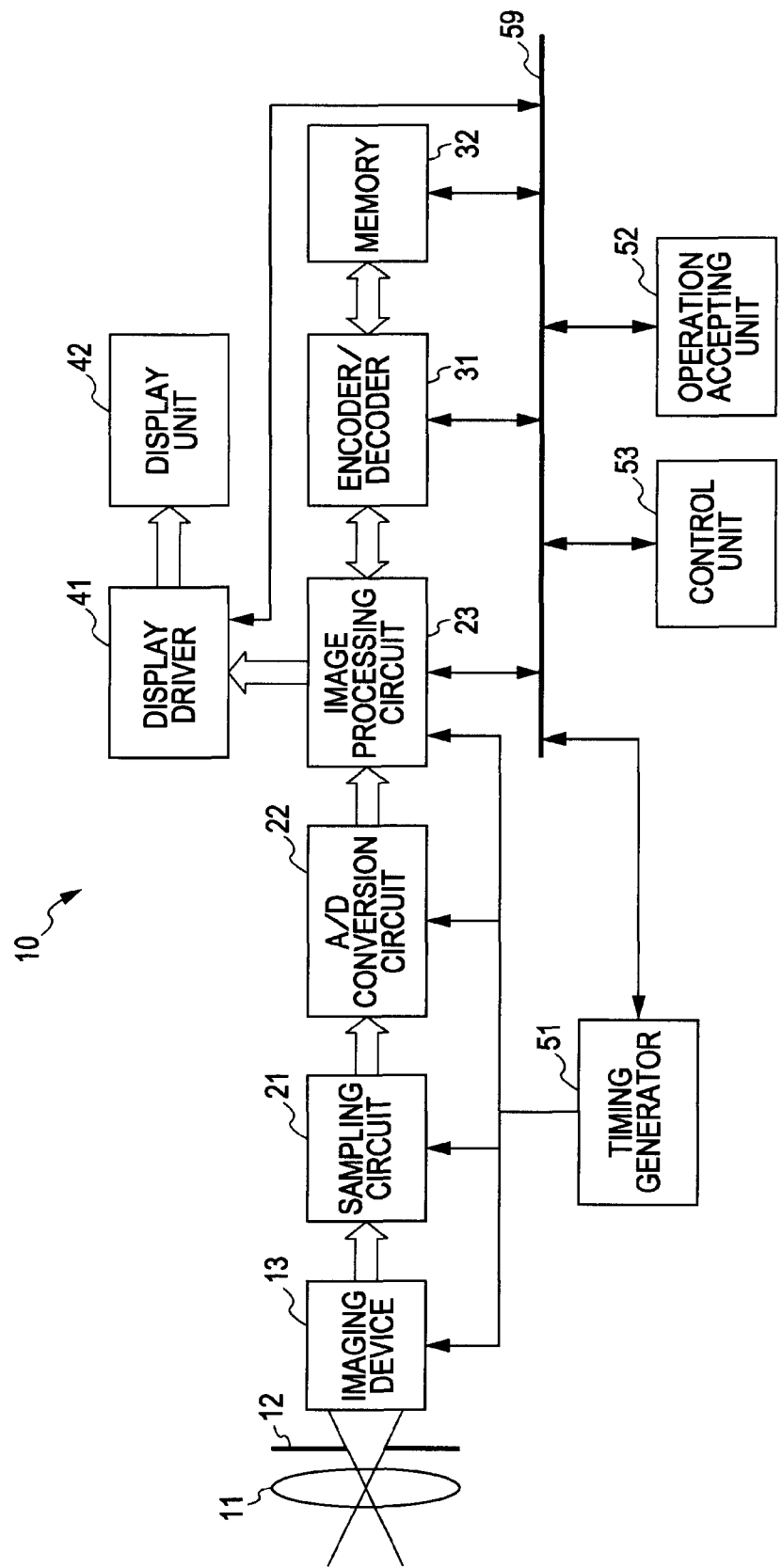
FIG. 1 is a block diagram illustrating an internal configuration example of an imaging apparatus according to an embodiment of the present invention.

Next, embodiments of the present invention will be described in detail with reference to the drawings. FIG. 1 is a block diagram illustrating an internal configuration example of an imaging apparatus 10 according to an embodiment of the present invention.

The imaging apparatus 10 includes a lens 11, a diaphragm 12, an imaging device 13, a sampling circuit 21, a A/D (Analog/Digital) conversion circuit 22, an image processing circuit 23, an encoder/decoder 31, and memory 32. Also, the imaging apparatus 10 includes a display driver 41, a display unit 42, a timing generator 51, an operation accepting unit 52, a control unit 53, and a bus 59. Note that the image processing circuit 23, the encoder/decoder 31, the memory 32, the display driver 41, the timing generator 51, the operation accepting unit 52, and the control unit 53 are connected mutually via the bus 59. The imaging apparatus 10 can be realized with, for example, a digital still camera or digital video camera (e.g., camera integral-type recorder) which images a subject to generate a still image or moving image.

The lens 11 is a lens used for condensing light from a subject. The diaphragm 12 adjusts the light quantity of light condensed by the lens 11. That is to say, the light from a subject, condensed by the lens 11, of which the light quantity has been adjusted by the diaphragm 12, is supplied to the imaging device 13.

The imaging device 13 is an image sensor which is driven by the timing generator 51, converts the light from a subject input via the lens 11 and the diaphragm 12 into an electric signal (image signal) by photoelectric conversion, and outputs this converted electric signal to the sampling circuit 21. That is to say, upon the light from the subject input via the lens 11 and the diaphragm 12 reaching light receiving elements on the sensor imaging surface of the imaging device 13, photoelectric conversion is carried out by these light receiving elements, thereby generating electric signals. Note that the imaging device 13 is realized with, for example, a CCD (Charge Coupled Device), CMOS (Complementary Metal Oxide Semiconductor), or the like.

The sampling circuit 21 is driven by the timing generator 51, samples the electric signal supplied from the imaging device 13 to subject this to an analog process such as removal of noise components, and supplies the analog signal subjected to such a process to the A/D conversion circuit 22. Noise that occurs at the imaging device 13 can be reduced by the sampling circuit 21. Note that the sampling circuit 21 is realized with, for example, a correlated double sampling (CDS) circuit.

The A/D conversion circuit 22 is driven by the timing generator 51, converts the analog signal supplied from the sampling circuit 21 into a digital signal, and supplies this converted digital signal to the image processing circuit 23. Note that the imaging device 13, the sampling circuit 21, and the A/D conversion circuit 22 are an example of the imaging unit that realizes a feature of the present invention.

The image processing circuit 23 subjects the digital signal (image data) supplied from the A/D conversion circuit 22 to a predetermined image process, and supplies the image data subjected to this image process to the display driver 41 and the encoder/decoder 31. Specifically, the digital signal supplied from the image processing circuit 23 is temporarily stored in image memory (RAM (Random Access Memory) for image)

within the image processing circuit 23. Subsequently, the processor for signal process of the image processing circuit 23 subjects the digital signal stored in the image memory to an image process programmed beforehand. Note that the image processing circuit 23 is realized with, for example, a DSP (Digital Signal Processor). Also, the details of the process executed by the image processing circuit 23 will be described in detail with reference to FIGS. 2 through 14, and others.

The encoder/decoder 31 encodes the image data supplied from the image processing circuit 23, and supplies and records the encoded image data to the memory 32. Also, the encoder/decoder 31 reads out the image data from the memory 32 to decode this, and supplies this to the image processing circuit 23.

The memory 32 is memory which stores the image data encoded by the encoder/decoder 31. Also, the memory 32 supplies the stored image data to the encoder/decoder 31. Note that the memory 32 is realized with, for example, a recording apparatus employing semiconductor memory, a magnetic recording medium, a magneto-optical recording medium, an optical recording medium, or the like.

The display driver 41 converts the digital signal supplied from the image processing circuit 23 into an analog signal, and controls the display unit 42 to display the image corresponding to the converted analog signal.

The display unit 42 displays the image corresponding to the analog signal converted by the display driver 41. Note that, in a normal state, a digital signal (pixel stream) is overwritten continuously in the built-in image memory of the image processing circuit 23 with a constant frame rate by the control of the timing generator 51. Subsequently, the image data of the built-in image memory of the image processing circuit 23 is output to the display unit 42 via the display driver 41, and the image corresponding to the image data thereof is displayed on the display unit 42. The display unit 42 is realized with, for example, a LCD (Liquid Crystal Display) or the like, and also has a function as a finder.

The timing generator 51 is a timing generator which controls the operation timing of a signal processing system (imaging device 13, sampling circuit 21, A/D conversion circuit 22, and image processing circuit 23). For example, in a state of being imaged, the timing generator 51 controls the signal processing system so as to maintain capturing of an image with a constant frame rate.

The operation accepting unit 52 is an operation accepting unit which accepts operation input such as a shutter operation by the user, the other command input, or the like, and supplies the content of the accepted operation input to the control unit 53. For example, the operation accepting unit 52 includes operation buttons such as a shutter button provided on the imaging apparatus 10 main unit, and so forth.

The control unit 53 is a control unit which controls the whole imaging apparatus 10, reads out a control program stored in the driver (not shown), and executes various types of control based on the control program thereof, or the command from the user accepted by the operation accepting unit 52, or the like. The control unit 53 is realized with, for example, a CPU (Central Processing Unit).

Next, a signal process executed by the image processing circuit 23 will be described in detail with reference to the drawing. The signal process shown in an embodiment of the present invention is realized by a computing unit within the image processing circuit 23 executing a calculation described with a predetermined program code as to the stream of the digital signal (image signal) input to the image processing circuit 23. Therefore, each processing unit within the program thereof will be described below as a functional block, and a sequence executed by each process will be described with a flowchart. Note that an arrangement may be made wherein a hardware circuit which realizes the same process as that in the function block described below is installed, besides the process being realized by the program that will be described with an embodiment of the present invention.

Figure 2:
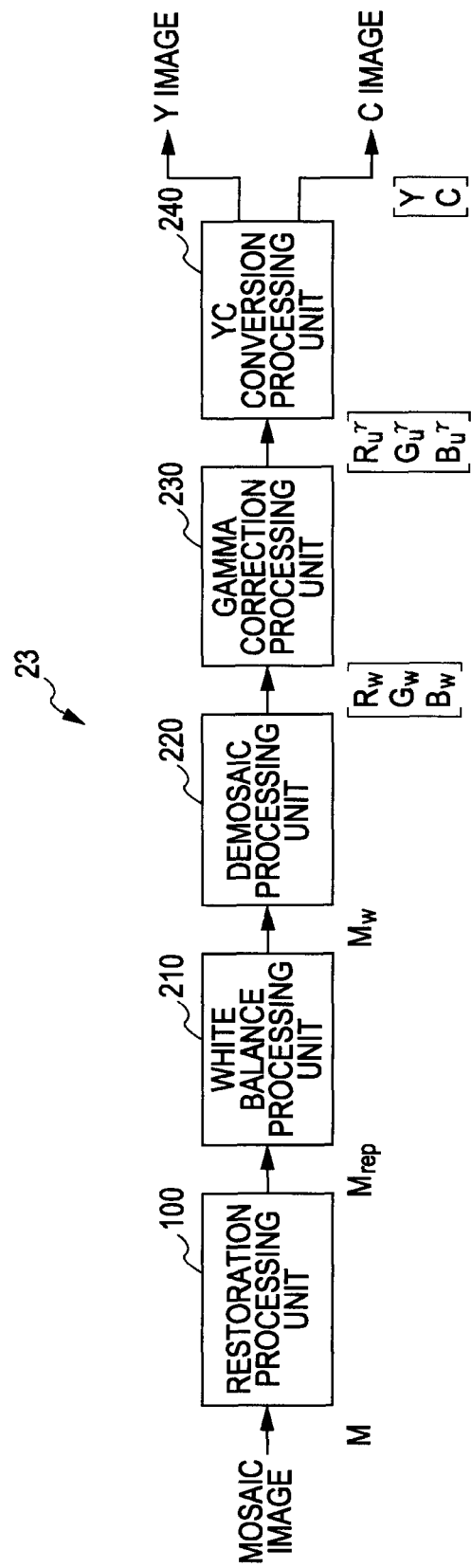
FIG. 2 is a block diagram illustrating a functional configuration example of an image processing circuit according to an embodiment of the present invention.

FIG. 2 is a block diagram illustrating a functional configuration example of the image processing circuit 23 according to an embodiment of the present invention. Note that FIG. 2 illustrates the configuration of the whole signal process executed by the image processing circuit 23. The image processing circuit 23 includes a restoration processing unit 100, a white balance processing unit 210, a demosaic processing unit 220, a gamma correction processing unit 230, and a YC conversion processing unit 240. A mosaic image M digitized by the A/D conversion circuit 22 is input to the image processing circuit 23 as an input image. Subsequently, the image processing circuit 23 subjects the input mosaic image M to various types of image process. This mosaic image M is an image where the intensity signal corresponding to one of R (Red), G (Green), and B (Blue) is stored in each pixel, and a color array thereof is, for example, a Bayer array shown in FIG. 3.

The restoration processing unit 100 subjects the mosaic image M to a process that restores optical deterioration and sensor deterioration. A mosaic image $M_{rep}$ subjected to the restoration process is supplied to the white balance processing unit 210. Note that the restoration processing unit 100 will be described in detail with reference to FIGS. 5 through 14 and other drawings.

The white balance processing unit 210 subjects the mosaic $M_{rep}$ subjected to the restoration process to a white balance process. This white balance process is a process to apply a suitable coefficient to the mosaic image $M_{rep}$ in accordance with the color that each pixel intensity has such that the color balance of an achromatic subject area becomes achromatic. A mosaic image $M_w$ subjected to the white balance process is supplied to the demosaic processing unit 220.

The demosaic processing unit 220 executes a demosaic process (interpolation process) such that the intensities of all the channels of R, G, and B are aligned to each pixel position of the mosaic image $M_w$ subjected to the white balance process. An RGB image ($[R_w, G_w, B_w]^T$) subjected to this demosaic process is supplied to the gamma correction processing unit 230. Note that the RGB image ($[R_w, G_w, B_w]^T$) subjected to this demosaic process is an image corresponding to three colors of R, G, and B. Also, a matrix $A^T$ means the transposed matrix of a matrix A.

The gamma correction processing unit 230 subjects an RGB image ($[R_m, G_m, B_m]^T$) to gamma correction. The RGB image ($[R_u^\gamma, G_u^\gamma, B_u^\gamma]^T$) subjected to gamma correction is supplied to the YC conversion processing unit 240.

The YC conversion processing unit 240 subjects an RGB image ($[R_u^\gamma, G_u^\gamma, B_u^\gamma]^T$) subjected to the gamma correction to a YC matrix process, and band limitation as to chroma components, thereby generating a luminance signal (Y) and color difference signals (Cr, Cb). The luminance signal (Y-image) and the color difference signal (C-image) are supplied to the encoder/decoder 31 or display driver 41.

FIG. 3 is a diagram illustrating a Bayer array serving as an example of a color filter to be disposed on the light receiving surface of the imaging device 13 according to an embodiment of the present invention. With this Bayer array, the pixels of the color of G are disposed in a checkered pattern, and with pixel positions other than G, the pixels of the color of R are disposed in a square grating state with one pixel interval in the horizontal direction and in the vertical direction, the pixels of the color of B are disposed in the remaining pixel positions in a square grating state with one pixel interval in the horizontal direction and in the vertical direction. Note that, with an embodiment of the present invention, G pixels included in a row including R pixels are indicated with Gr, and G pixels included in a row including B pixels are indicated with Gb.

Figure 4A:
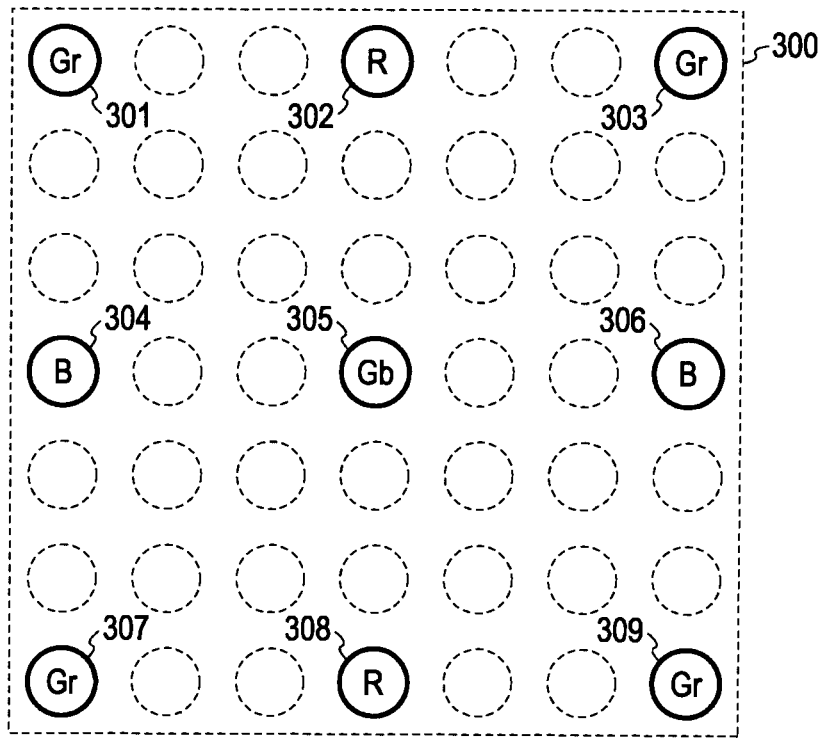
FIGS. 4A and 4B are diagrams schematically illustrating a mosaic image to be subjected to a restoration process of a restoration processing unit according to an embodiment of the present invention, and a mosaic image subjected to the restoration process by the restoration processing unit 100.
Figure 4B:
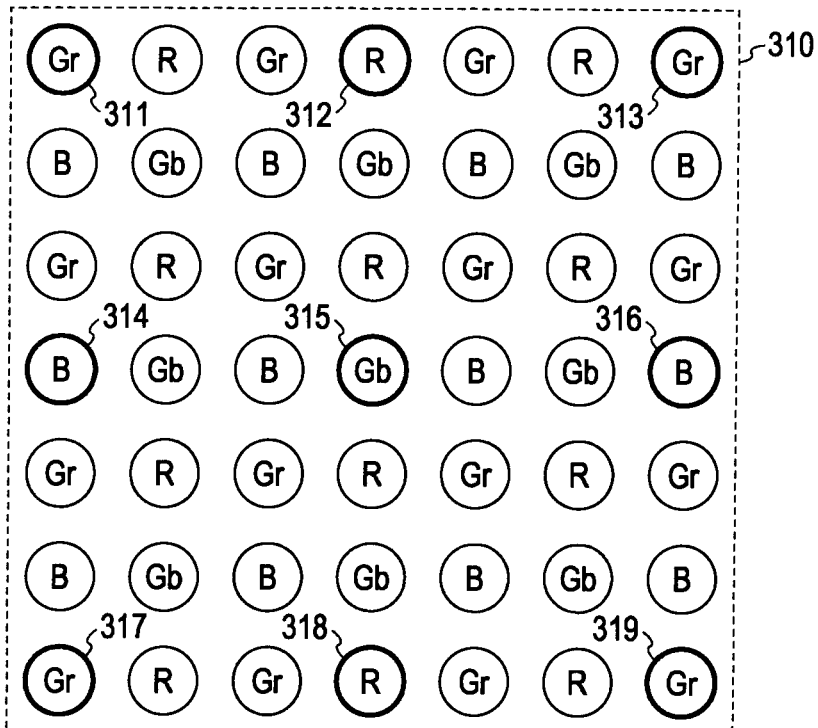

FIGS. 4A and 4B are diagrams schematically illustrating a mosaic image to be subjected to the restoration process of the restoration processing unit 100 according to an embodiment of the present invention, and a mosaic image subjected to the restoration process by the restoration processing unit 100. With these mosaic images, each pixel is disposed corresponding to the Bayer array shown in FIG. 3. With an embodiment of the present invention, description will be made regarding an example wherein the restoration processing unit 100 inputs a mosaic image to be subjected to the restoration process as an observed image, and the restoration processing unit 100 outputs a mosaic image subjected to the restoration process as a restored image.

FIG. 4A illustrates an observed image 300 to be subjected to the restoration process of the restoration processing unit 100, and FIG. 4B illustrates a restored image 310 subjected to the restoration process by the restoration processing unit 100. In FIGS. 4A and 4B, a portion of the images are indicated by being surrounded with a rectangle made up of a dashed line, and pixels included in each rectangle are indicated with circles, and characters that indicate the channel of each pixel are shown in a circle. Here, the restored image 310 shown in FIG. 4B is a high-resolution image converted such that the resolution of the observed image 300 shown in FIG. 4A becomes triple vertically and horizontally. Thus, the observed image 300 to be subjected to the restoration process, and the restored image 310 subjected to the restoration process differ in resolution. Therefore, in FIGS. 4A and 4B, in order to enable the observed image 300 and the restored image 310 to be compared, a circle that indicates a pixel commonly included in the observed image 300 and the restored image 310 is illustrated with a heavy line. That is to say, pixels commonly included in the observed image 300 and the restored image 310 are pixels 301 through 309 in the observed image 300, and pixels 311 through 319 in the restored image 310. Also, with the observed image 300 shown in FIG. 4A, of the positions corresponding to the pixels positions of the pixels making up the restored image 310, a position where no pixel exists is indicated with a circle made up of a dashed line. That is to say, the observed image 300 becomes a low-resolution image as compared with the restored image 310, and accordingly, no pixel exists at a position other than the pixel positions of the pixels 301 through 309.

Figure 5:
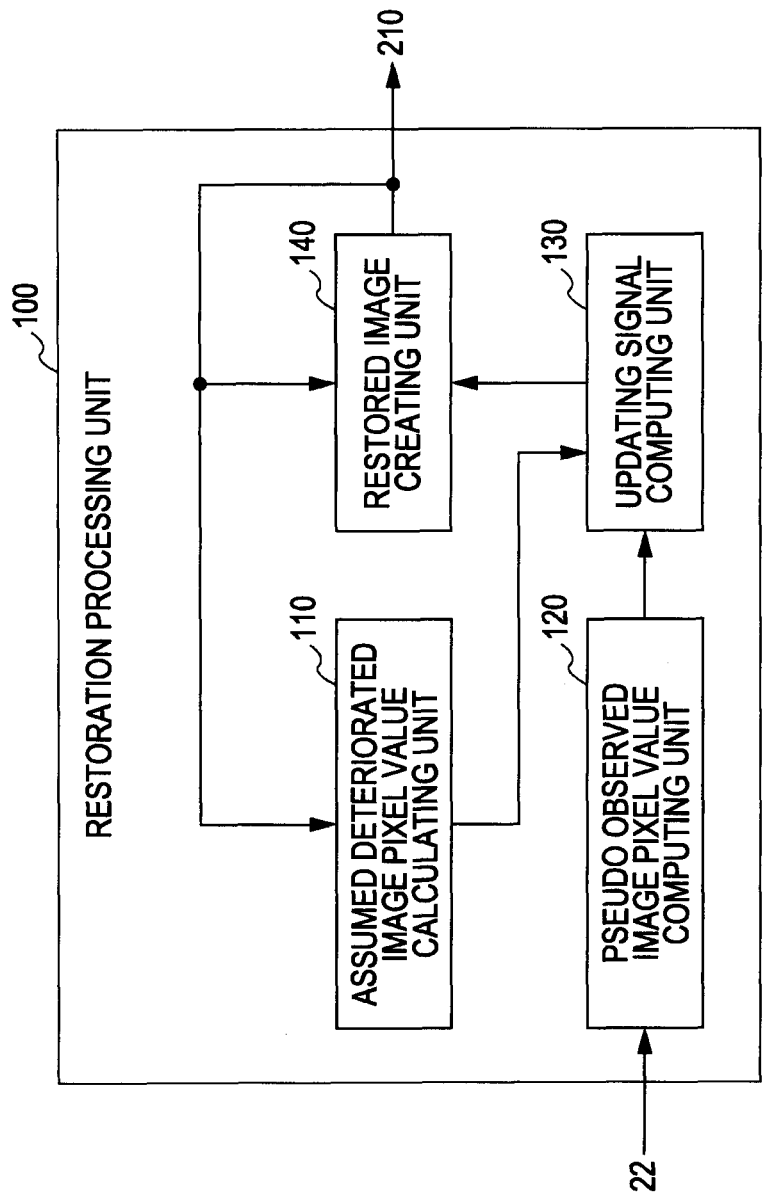
FIG. 5 is a block diagram illustrating a functional configuration example of the restoration processing unit according to an embodiment of the present invention.

FIG. 5 is a block diagram illustrating a functional configuration example of the restoration processing unit 100 according to an embodiment of the present invention. The restoration processing unit 100 includes an assumed deteriorated image pixel value computing unit 110, a pseudo observed image pixel value computing unit 120, an updating signal computing unit 130, and a restored image creating unit 140. Note that, with an embodiment of the present invention, deterioration due to the optical system is defined with a PSF (Point Spread Function).

The assumed deteriorated image pixel value computing unit 110 calculates an assumed deteriorated image pixel value used at the time of creating an updating signal based on the frame (restored image) output from the restored image creating unit 140, and outputs the calculated assumed deteriorated image pixel value to the updating signal computing unit 130. The assumed deteriorated image pixel value computing unit 110 employs a channel-classified blurring function (e.g., PSF shown in FIGS. 6A and 6B) at the time of calculating an assumed deteriorated image pixel value. Note that the assumed deteriorated image pixel value computing unit 110 will be described in detail with reference to FIG. 8.

The pseudo observed image pixel value computing unit 120 calculates a pseudo observed image pixel value used at the time of creating an updating signal based on the frame (observed image) output from the A/D conversion circuit 22, and outputs the calculated pseudo observed image pixel value to the updating signal computing unit 130. Note that the pseudo observed image pixel value computing unit 120 will be described in detail with reference to FIG. 10. Also, the pseudo observed image pixel value computing unit 120 is an example of the pseudo target image pixel value computing unit that realizes a feature of the present invention.

The updating signal computing unit 130 calculates an updating signal used for creating a restored image based on the assumed deteriorated image pixel value output from the assumed deteriorated image pixel value computing unit 110, and the pseudo observed image pixel value output from the pseudo observed image pixel value computing unit 120, and outputs the calculated updating signal to the restored image creating unit 140. Note that the updating signal computing unit 130 will be described in detail with reference to FIG. 13.

The restored image creating unit 140 updates the restored image created most recently based on the updating signal output from the updating signal computing unit 130 to create a new restored image, and subsequently, outputs the newly created restored image to the white balance processing unit 210, and also uses the restored image thereof at the time of creating a restored image regarding the next frame (observed image). Note that the restored image creating unit 140 will be described in detail with reference to FIG. 14.

Figure 6A:
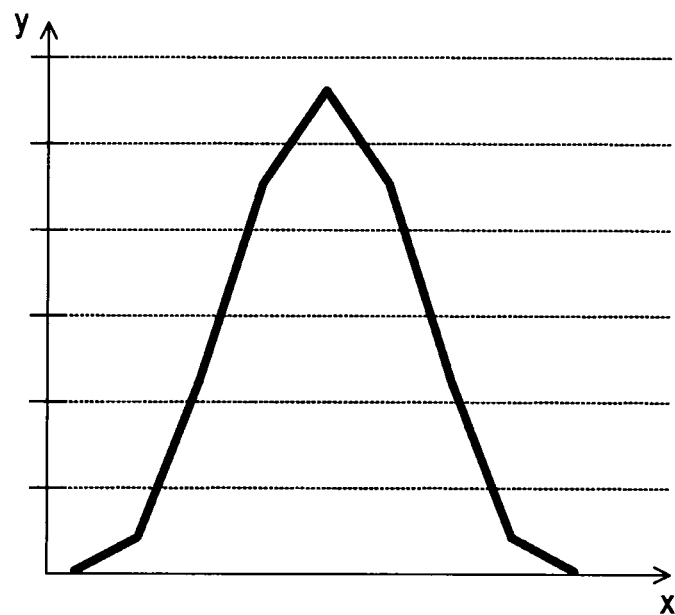
FIGS. 6A and 6B are diagrams illustrating a graph that represents the value of a PSF (Point Spread Function) serving as an example of a channel-classified blurring matrix used at the time of an assumed deteriorated image pixel value computing unit according to an embodiment of the present invention calculating an assumed deteriorated image pixel value.
Figure 6B:
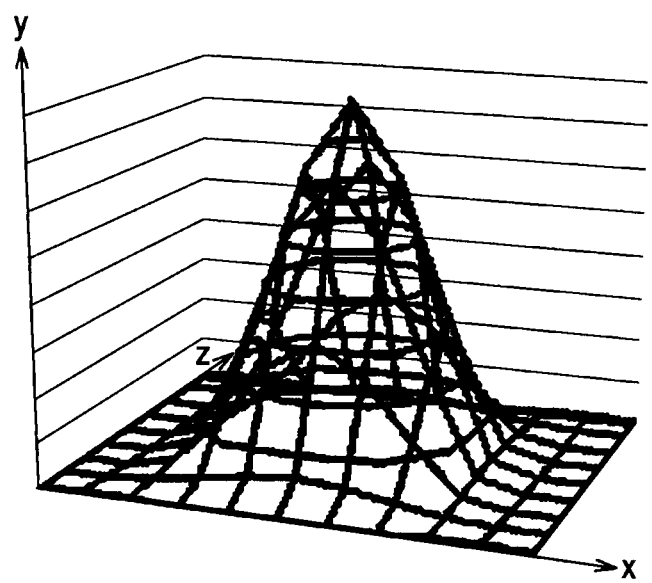

FIGS. 6A and 6B are diagrams illustrating a graph that represents the value of a PSF serving as an example of a channel-classified blurring matrix used at the time of the assumed deteriorated image pixel value computing unit 110 according to an embodiment of the present invention calculating an assumed deteriorated image pixel value. FIG. 6A illustrates a graph that represents the value of a two-dimensional PSF, and FIG. 6B illustrates a graph that represents the value of a three-dimensional PSF. Note that, with the graph shown in FIG. 6A, the x axis is an axis that indicates the position of a pixel (pixel position) on an image, and the y axis is an axis that indicates the value of the response as to the pixel position. Also, with the graph shown in FIG. 6B, the x axis and the z axis are axes that indicate a pixel position on an image, and the y axis is an axis that indicates the value of response as to the pixel position. Here, a value of the y axis shown in FIGS. 6A and 6B (the value of response as to a pixel position) is a value that indicates how blurred the output as to a pixel position serving as input appears as an image. Also, let us say that a value on the y axis shown in FIGS. 6A and 6B is a value normalized in accordance with a normal distribution. Note that the PSF shown in FIGS. 6A and 6B is an example of the blurring function that realizes a feature of the present invention.

Figure 7:
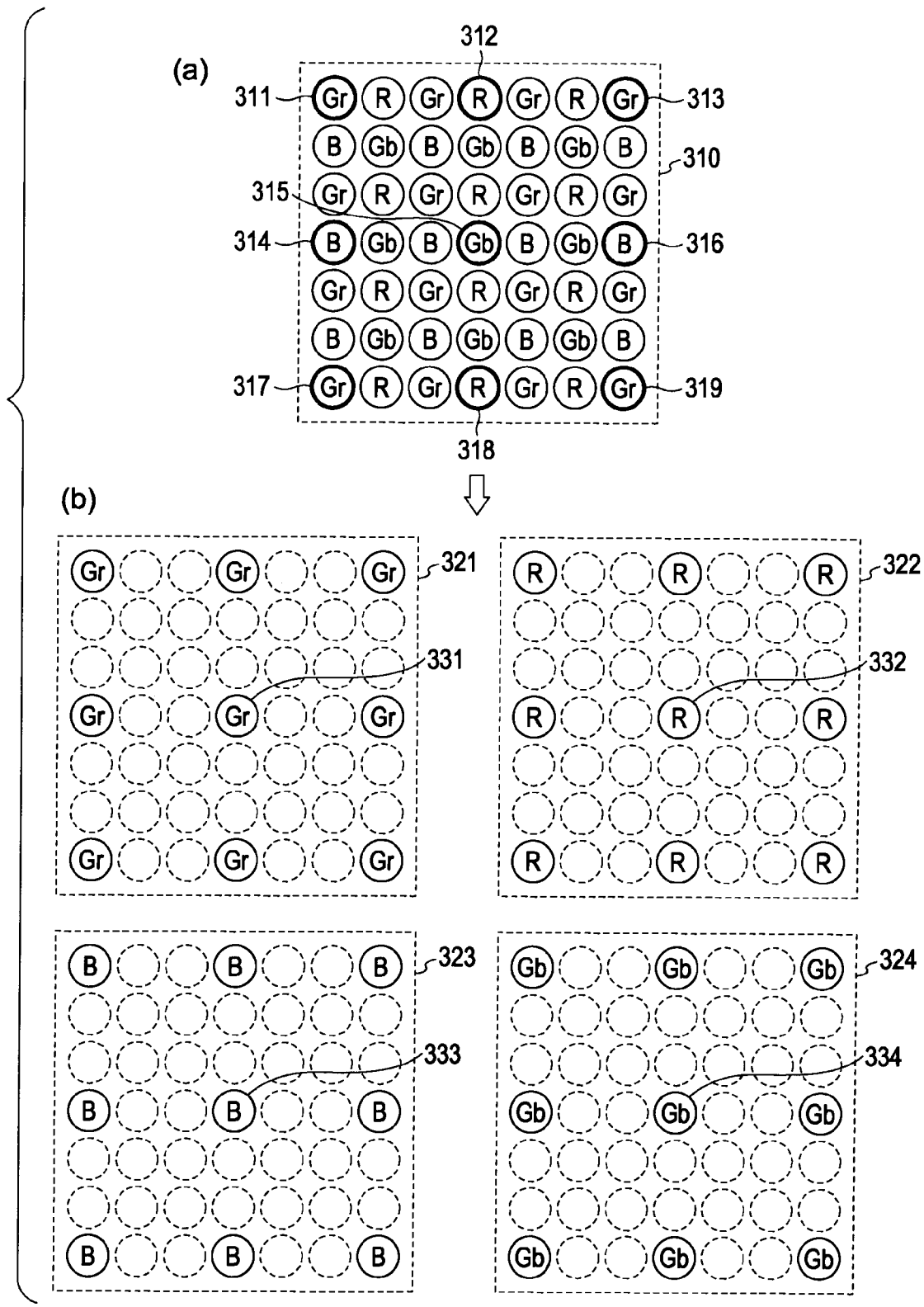
FIG. 7 is a diagram schematically illustrating a restored image to be processed of the assumed deteriorated image pixel value computing unit according to an embodiment of the present invention, and assumed deteriorated images made up of assumed deteriorated image pixel values calculated by the assumed deteriorated image pixel value computing unit.

FIG. 7 is a diagram schematically illustrating a restored image 310 to be processed of the assumed deteriorated image pixel value computing unit 110 according to an embodiment of the present invention, and assumed deteriorated images 321 through 324 made up of assumed deteriorated image pixel values calculated by the assumed deteriorated image pixel value computing unit 110. Note that the restored image 310 shown in (a) in FIG. 7 is the same as the restored image 310 shown in FIG. 4B, and accordingly, detailed description thereof will be omitted here. Also, (b) in FIG. 7 illustrates the assumed deteriorated images 321 through 324 that are an example of an assumed deteriorated image made up of assumed deteriorated image pixel values calculated for each channel. The assumed deteriorated images will be described in detail with reference to FIG. 8.

Figure 8:
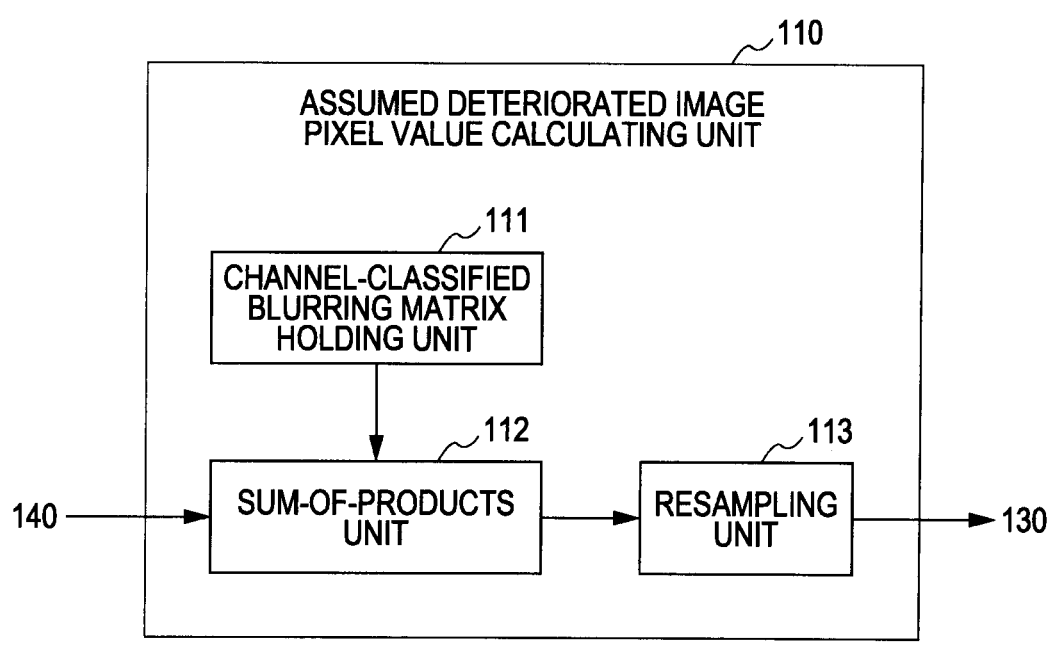
FIG. 8 is a block diagram illustrating a functional configuration example of the assumed deteriorated image pixel value computing unit according to an embodiment of the present invention.

FIG. 8 is a block diagram illustrating a functional configuration example of the assumed deteriorated image pixel value computing unit 110 according to an embodiment of the present invention. The assumed deteriorated image pixel value computing unit 110 includes a channel-classified blurring matrix holding unit 111, a sum-of-products unit 112, and a resampling unit 113.

The channel-classified blurring matrix holding unit 111 holds a blurring matrix that assumes optical deterioration for each channel, and supplies the held channel-classified blurring matrix to the sum-of-products unit 112. For example, the PSF shown in FIGS. 6A and 6B can be used as a channel-classified blurring matrix.

The sum-of-products unit 112 calculates the pixel value of an assumed deteriorated image (assumed deteriorated image pixel value) by using the channel-classified blurring matrix held in the channel-classified blurring matrix holding unit 111 regarding each pixel of the restored image output from the restored image creating unit 140, and subsequently, outputs the calculated assumed deteriorated image pixel value to the resampling unit 113.

With an embodiment of the present invention, of the pixels of a restored image, description will be made with the position of a pixel serving as a reference being referred to as a pixel-of-interest position at the time of calculating an assumed deteriorated image pixel value. Also, a pixel exists in this pixel-of-interest position will be referred to as a pixel of interest. With this example, description will be made regarding a case where the position of a restored image corresponding to the pixel position of each pixel making up an observed image is taken as a pixel-of-interest position, and a pixel exists in this pixel-of-interest position is taken as a pixel of interest. For example, with the example shown in (a) in FIG. 7, the pixels 311 through 319 of the restored image 310 are pixels of interest, and the positions of the pixels 311 through 319 are pixel-of-interest positions. Also, each pixel of an observed image will also be described similarly by using a pixel-of-interest position and a pixel of interest.

Specifically, of a pixel of interest of a restored image, and pixels adjacent to this pixel of interest, the sum-of-products unit 112 obtains sum of products from pixel values of the same channel, and the channel-classified blurring matrix held at the channel-classified blurring holding unit 111 corresponding to the channel thereof, and calculates an assumed deteriorated image pixel value at the pixel-of-interest position thereof. Note that, for example, a pixel that exists in a range of 7 pixels by 7 pixels with a pixel of interest as the center can be used as a pixel that exists in the vicinity of the pixel of interest. For example, in a case where the pixel 315 shown in (a) in FIG. 7 is taken as a pixel of interest, and an assumed deteriorated image pixel value is calculated regarding the pixel-of-interest position thereof, a range of 7 pixels by 7 pixels with the pixel 315 as the center (the range of the restored image 310) becomes a calculation target. That is to say, in a case where an assumed deteriorated image pixel value is calculated by taking the position of the pixel 315 shown in (a) in FIG. 7 as a pixel-of-interest position, the pixel value of each pixel included in the range of the restored image 310 is used to calculate an assumed deteriorated image pixel value for each channel.

Now, description will be made with the channel to be calculated of an assumed deteriorated image pixel value being referred to as a target channel. For example, in a case where an assumed deteriorated image pixel value is calculated regarding the target channel Gr by taking the position of the pixel 315 shown in (a) in FIG. 7 as a pixel-of-interest position, an integration process is executed by using (16) pixel values of the channel Gr included in the range of the restored image 310, and the blurring matrix of the channel Gr. An integration value that is this integration result is added sequentially, whereby an assumed deteriorated image pixel value regarding the channel Gr is obtained. Also, for example, in a case where an assumed deteriorated image pixel value is calculated regarding the target channel R by taking the position of the pixel 315 shown in (a) in FIG. 7 as a pixel-of-interest position, an integration process is executed by using (12) pixel values of the channel R included in the range of the restored image 310, and the blurring matrix of the channel R. An integration value that is this integration result is added sequentially, whereby an assumed deteriorated image pixel value regarding the channel R is obtained. Similarly, an assumed deteriorated image pixel value is calculated by using the target channel included in the range of the restored image 310 regarding each of the target channels B and Gr with the position of the pixel 315 shown in (a) in FIG. 7 as a pixel-of-interest position. Also, the other pixel-of-interest positions are calculated similarly. That is to say, four assumed deteriorated image pixel values are calculated regarding one pixel-of-interest position. The calculation of the assumed deteriorated image pixel values is executed, for example, while moving a pixel-of-interest position in the raster order. That is to say, with the restored image 310 shown in (a) in FIG. 7, the calculation of the assumed deteriorated image pixel values is executed in the order of the pixel 311→pixel 312→pixel 313→ . . . →pixel 314→pixel 315→pixel 316→ . . . →pixel 317→pixel 318→pixel 319→ . . . .

The resampling unit 113 disposes (resamples) the assumed deteriorated image pixel value obtained by the sum-of-products unit 112 in a pixel-of-interest position, and outputs the assumed deteriorated image pixel value thus disposed to the updating signal computing unit 130. For example, in a case where the assumed deteriorated image pixel value obtained regarding the target channel Gr is resampled with the position of the pixel 315 shown in (a) in FIG. 7 as a pixel-of-interest position, resampling is carried out at the position of the pixel 331 of the assumed deteriorated image (target channel Gr) 321 shown in (b) in FIG. 7. Also, for example, in a case where the assumed deteriorated image pixel value obtained regarding the target channel R is resampled with the position of the pixel 315 shown in (a) in FIG. 7 as a pixel-of-interest position, resampling is carried out at the position of the pixel 332 of the assumed deteriorated image (target channel R) 322 shown in (b) in FIG. 7. Similarly, in a case where the assumed deteriorated image pixel values obtained regarding the target channels B and Gb are resampled with the position of the pixel 315 shown in (a) in FIG. 7 as a pixel-of-interest position, resampling is carried out in the same way. Specifically, the assumed deteriorated image pixel value obtained regarding the target channel B is resampled in the position of the pixel 333 of the assumed deteriorated image (target channel B) 323 shown in (b) in FIG. 7. Also, the assumed deteriorated image pixel value obtained regarding the target channel Gb is resampled in the position of the pixel 334 of the assumed deteriorated image (target channel Gb) 324 shown in (b) in FIG. 7. Resampling is thus carried out, whereby assumed deteriorated images 321 through 324 corresponding to the four channels are obtained regarding the one restored image 310.

Note that, with the resampling process by the assumed deteriorated image pixel value computing unit 110, in a case where deterioration due to the imaging device 13 is not assumed, only the resampling process of a pixel position that does not involve resolution conversion is carried out. That is to say, four assumed deteriorated images having the same resolution as an observed image are created. Also, in a case where an observed image is not a Bayer array, the resampling process can be omitted. The case where an observed image is not a Bayer array is, for example, a case where an image subjected to a demosaic process is taken as an observed image.

Figure 9:
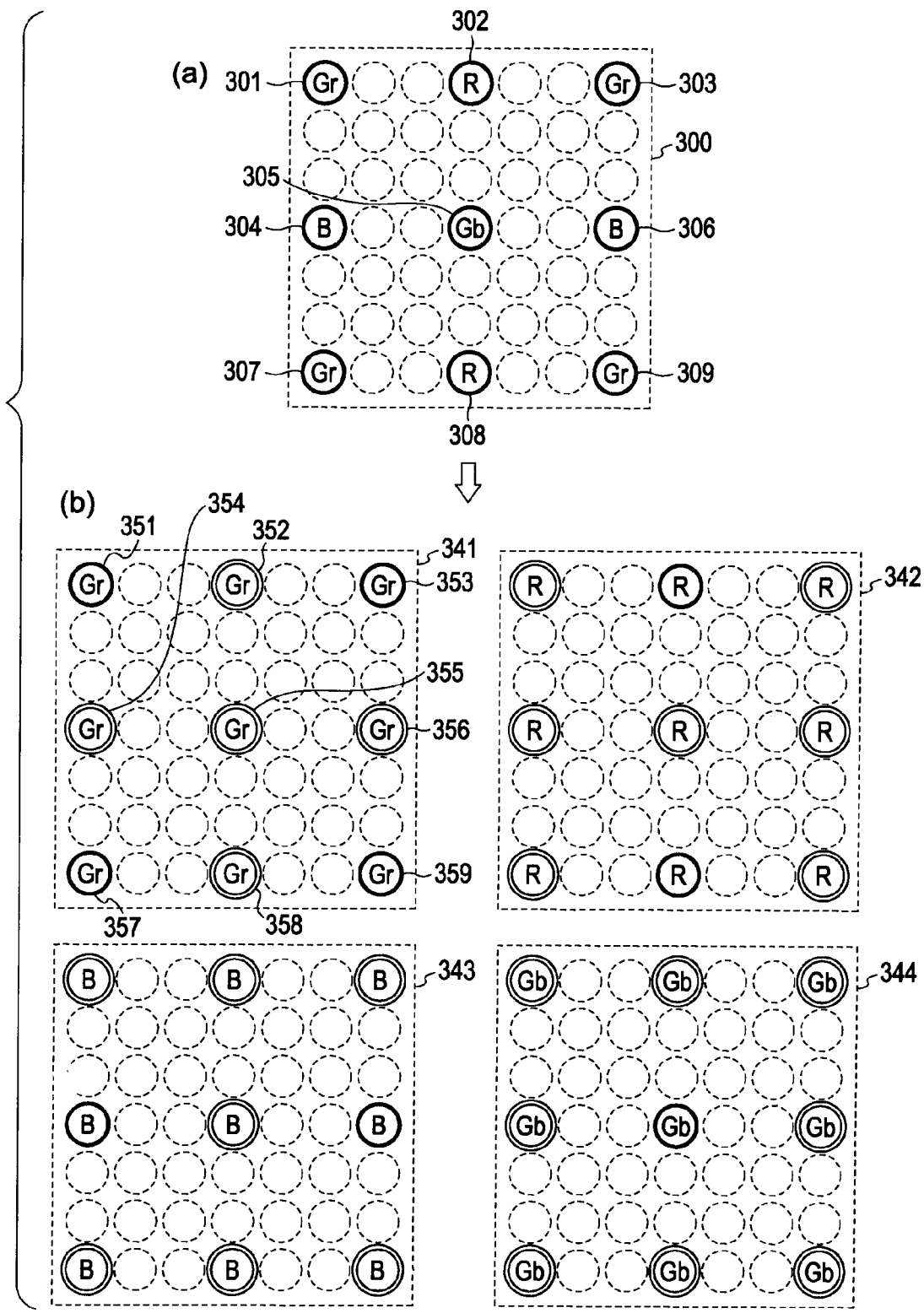
FIG. 9 is a diagram schematically illustrating an observed image to be processed of a pseudo observed image pixel value computing unit according to an embodiment of the present invention, and pseudo observed images made up of pseudo observed image pixel values calculated by the pseudo observed image pixel value computing unit.

FIG. 9 is a diagram schematically illustrating an observed image 300 to be processed by the pseudo observed image pixel value computing unit 120 according to an embodiment of the present invention, and pseudo observed images 341 through 344 made up of pseudo observed image pixel values calculated by the pseudo observed image pixel value computing unit 120. Note that the observed image 300 shown in (a) in FIG. 9 is the same as the observed image 300 shown in FIG. 4A, and accordingly, detailed description thereof will be omitted here. Also, (b) in FIG. 9 illustrates the pseudo observed images 341 through 344 that are an example of a pseudo observed image made up of pseudo observed image pixel values calculated for each channel. The pseudo observed images will be described in detail with reference to FIG. 10.

Figure 10:
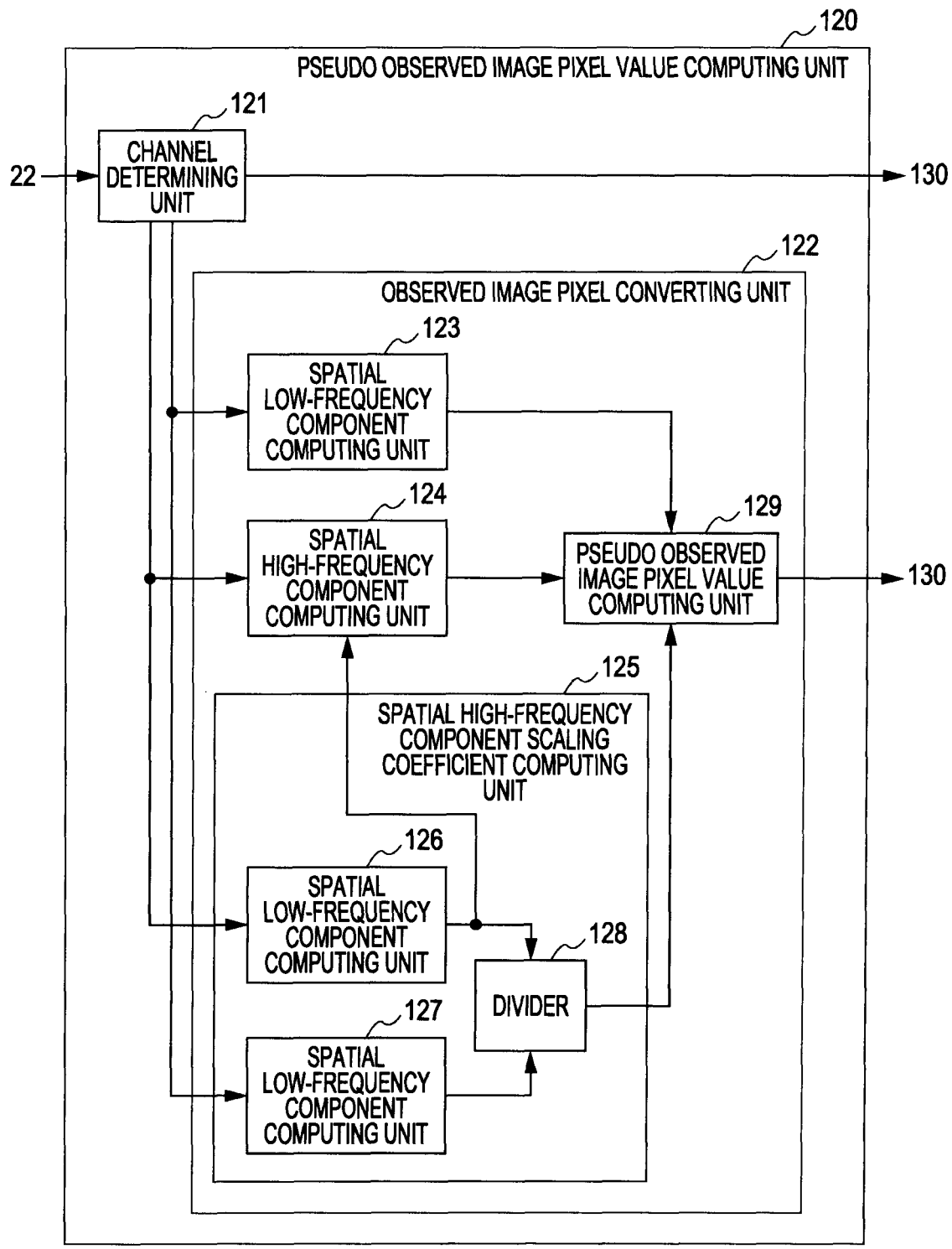
FIG. 10 is a block diagram illustrating a functional configuration example of the pseudo observed image pixel value computing unit according to an embodiment of the present invention.

FIG. 10 is a block diagram illustrating a functional configuration example of the pseudo observed image pixel value computing unit 120 according to an embodiment of the present invention. The pseudo observed image pixel value computing unit 120 includes a channel determining unit 121, and an observed image pixel converting unit 122. Here, the pseudo observed image pixel value computing unit 120 calculates each pixel value of a pseudo observed image for each channel with each pixel making up an observed image as a pixel of the same channel in a pseudo manner. The pixel values of this pseudo observed image (pseudo observed image pixel values) are calculated by taking advantage of a feature wherein pixel high-frequency components become generally the same value even in a case where the channels thereof differ, but pixel low-frequency components become different values according to the types of channels thereof. Note that description will be made with the channel to be calculated being referred to as a target channel, in the same way as with the case described regarding the assumed deteriorated image pixel value computing unit 110. Also, the pseudo observed image pixel value computing unit 120 calculates four pseudo observed image pixel values regarding the one pixel-of-interest position in the same way as the assumed deteriorated image pixel value computing unit 110. That is to say, a pseudo observed image pixel value is obtained at every four target channels.

The channel determining unit 121 inputs a pixel of interest of the observed image output from the A/D conversion circuit 22, and the pixel value of each pixel adjacent to the pixel of interest thereof, and determines whether or not the channel of the pixel of interest, and the channel of the target channel are the same. Subsequently, in a case where determination is made that the channel of the pixel of interest, and the channel of the target channel are the same, the channel determining unit 121 outputs the pixel value of the pixel of interest to the updating signal computing unit 130 as a pseudo observed image pixel value.

On the other hand, in a case where determination is made that the channel of the pixel of interest, and the channel of the target channel, are not the same, the channel determining unit 121 outputs, of the pixel of interest thereof, and each pixel adjacent thereto, the pixel value of the target channel to the spatial low-frequency component computing units 123 and 127. Also, of the pixel of interest thereof, and each pixel adjacent thereto, the channel determining unit 121 outputs the pixel value of the channel (reference channel) of the pixel of interest to the spatial high-frequency component computing unit 124 and the spatial low-frequency component computing unit 126.

Here, the reference channel is a channel to be used at the time of calculating a pseudo observed image pixel value in a case where the channel of the pixel of interest, and the target channel are not the same, and is the same channel as the channel of the pixel of interest. For example, in a case where a pseudo observed image pixel value is calculated regarding the target channel Gr with the positions of the pixels 301, 303, 307, and 309 shown in (a) in FIG. 9 as pixel-of-interest positions, the channel Gr of the pixels of interest (pixels 301, 303, 307, and 309) and the target channel Gr are the same. Therefore, the pixel values of the pixels of interest (pixels 301, 303, 307, and 309) are output as pseudo observed image pixel values, i.e., as the pseudo observed image pixel values of the pixels 351, 353, 357, and 359 of the pseudo observed image (target channel Gr) 341 shown in (b) in FIG. 9. On the other hand, for example, in a case where a pseudo observed image pixel value is calculated regarding the target channel Gr with the position of the pixel 302 shown in (a) in FIG. 9 as a pixel-of-interest position, the channel R of the pixel of interest (pixel 302) and the target channel Gr are not the same. Therefore, of the pixel 302 and each pixel adjacent thereto, the channel (reference channel) R of the pixel of interest (pixel 302) and the target channel Gr are used to calculate a pseudo observed image pixel value. This pseudo observed image pixel value is output as the pseudo observed image pixel value of the pixel 352 of the pseudo observed image (target channel Gr) 341 shown in (b) in FIG. 9. Similarly, in a case where a pseudo observed image pixel value is calculated regarding the target channel Gr with the positions of the pixels 304 through 306, and 308 shown in (a) in FIG. 9 as pixel-of-interest positions, the channel of the pixel of interest and the target channel Gr are not the same. Therefore, of the pixel of interest and each pixel adjacent thereto, the channel (reference channel) of the pixel of interest and the target channel Gr are used to calculate a pseudo observed image pixel value.

With the pseudo observed images 341 through 344 shown in (b) in FIG. 9, a pixel position where the pixel value of a pixel of interest of the observed image 300 is output as a pseudo observed image pixel value is indicated with a heavy circle. Also, with the pseudo observed images 341 through 344 shown in (b) in FIG. 9, a pixel position where a pseudo observed image pixel value is calculated by using the channel (reference channel) of the pixel of interest and the target channel is indicated with a double circle. Thus, four pseudo observed image pixel values are obtained regarding one pixel-of-interest position. Note that the calculation of a pseudo observed image pixel value by using the reference channel and the target channel is carried out by the observed image pixel converting unit 122.

The observed image pixel converting unit 122 estimates the pixel value of the target channel at a pixel-of-interest position. The observed image pixel converting unit 122 includes a spatial low-frequency component computing unit 123, a spatial high-frequency component computing unit 124, a spatial high-frequency component scaling coefficient computing unit 125, and a pseudo observed image pixel value computing unit 129. Also, the spatial high-frequency component scaling coefficient computing unit 125 calculates the scaling coefficient of the spatial high-frequency components of the reference channel, and includes a spatial low-frequency component computing units 126 and 127, and a divider 128. With this example, it is taken into consideration that there is correlation between channels regarding change in pixel values, and the pixel value of the target channel at a pixel-of-interest position is estimated based on the correlation between channels regarding change in pixel values. Specifically, the amount of change (the spatial high-frequency components of the reference channel) of the channel (reference channel) of the pixel of interest is subjected to scaling, and is added to the DC components of the target channel (the spatial low-frequency components of the target channel) at a pixel-of-interest position. Thus, the pixel value of the target channel at the pixel-of-interest position is estimated.

The spatial low-frequency component computing unit 123 applies a low-frequency pass filter (low-pass filter) to the pixel value of the channel (target channel) of each pixel adjacent to the pixel of interest to calculate the spatial low-frequency components of the target channel at the pixel-of-interest position, and subsequently, outputs spatial low-frequency components $I_{LowFreq}$ that is the calculation result to the pseudo observed image pixel value computing unit 129. Note that the spatial low-frequency component computing unit 123 is an example of the second channel spatial low-frequency component computing unit that realizes a feature of the present invention.

The spatial high-frequency component computing unit 124 calculates the spatial high-frequency components of the reference channel at the pixel-of-interest position, and subsequently, outputs spatial high-frequency components $I'_{HighFreq}$ that is the calculation result to the pseudo observed image pixel value computing unit 129. Specifically, the spatial high-frequency component computing unit 124 calculates, as shown in Expression 7, the difference value between the pixel value I' of the pixel of interest and the spatial low-frequency components $I'_{LowFreq}$ of the reference channel at the pixel-of-interest position calculated by the spatial low-frequency component computing unit 126. Subsequently, this difference value (spatial high-frequency components $I'_{HighFreq}$) is output to the pseudo observed image pixel value computing unit 129 as the spatial high-frequency components of the reference channel at the pixel-of-interest position. Note that a high-frequency pass filter (high-pass filter) may be employed to calculate the spatial high-frequency components of the reference channel at the pixel-of-interest position.

$$I'_{HighFreq} = I' - I'_{LowFreq} \quad \text{Expression 7}$$

The spatial low-frequency component computing unit 126 applies a low-frequency pass filter to the pixel values of the reference channel of the pixel of interest, and each pixel adjacent thereto to calculate the spatial low-frequency components of the reference channel at the pixel-of-interest position, and subsequently, outputs spatial low-frequency components $I'_{LowFreq}$ that is the calculation result to the spatial high-frequency component computing unit 124 and the divider 128.

The spatial low-frequency component computing unit 127 applies a low-frequency pass filter to the pixel values of the target channel of the pixel of interest, and each pixel adjacent thereto to calculate the spatial low-frequency components of the target channel at the pixel-of-interest position, and subsequently, outputs spatial low-frequency components $I_{LowFreq}$ that is the calculation result to the divider 128. Note that the spatial low-frequency component computing unit 127 may double as the spatial low-frequency component computing unit 123. Also, the spatial low-frequency component computing unit 127 is an example of the second channel spatial low-frequency component computing unit that realizes a feature of the present invention.

The divider 128 calculates the scaling coefficient of the spatial high-frequency components of the reference channel based on the spatial low-frequency components of the target channel from the spatial low-frequency component computing unit 127, and the spatial low-frequency components of the reference channel from the spatial low-frequency component computing unit 126. This scaling coefficient is a coefficient used for adjusting the sizes of the spatial high-frequency components of the reference channel, and normalizes the spatial high-frequency components of the reference channel. For example, as shown in Expression 8, the divider 128 divides the spatial low-frequency components $I_{LowFreq}$ by the spatial low-frequency components $I'_{LowFreq}$ to calculate a scaling coefficient k. Note that, as shown in Expression 9, the scaling coefficient k may be calculated by using a ratio between the variance $\sigma_{I,I}$ of the pixel values of the target channel of the pixel of interest and each pixel adjacent thereto, and the covariance $\sigma_{I,I'}$ of the target channel and the reference channel of the pixel of interest and each pixel adjacent thereto.

$$k = \frac{I_{LowFreq}}{I'_{LowFreq}} \quad \text{Expression 8}$$

$$k = \frac{\sigma_{I,I'}}{\sigma_{I,I}} \quad \text{Expression 9}$$

The pseudo observed image pixel value computing unit 129 calculates the pseudo observed image pixel value of the pixel-of-interest position based on the spatial low-frequency components from the spatial low-frequency component computing unit 123, the spatial high-frequency components from the spatial high-frequency component computing unit 124, and the scaling coefficient from the divider 128, and subsequently, outputs the pseudo observed image pixel value of the pixel-of-interest position to the updating signal computing unit 130. For example, as shown in Expression 10, the pseudo observed image pixel value computing unit 129 calculates the pseudo observed image pixel value $I_{pseudo}$ of the pixel-of-interest position by using the spatial low-frequency components $I_{LowFreq}$, the spatial high-frequency components $I'_{HighFreq}$, and the scaling coefficient k. Note that the pseudo observed image pixel value computing unit 129 is an example of the pseudo target image pixel value computing unit that realizes a feature of the present invention.

$$I_{pseudo} = k \times I'_{HighFreq} + I_{LowFreq} \quad \text{Expression 10}$$

Figure 11:
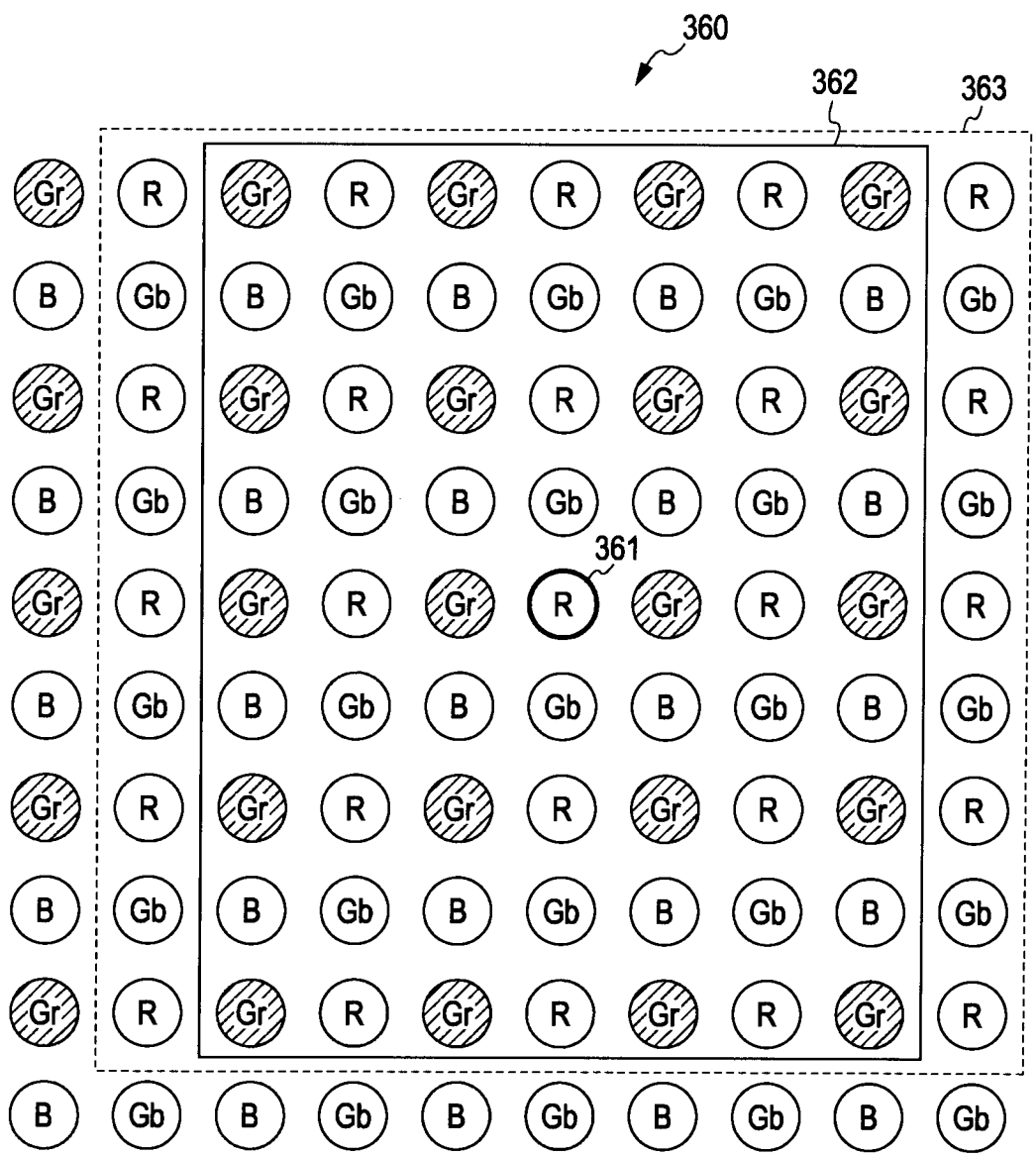
FIG. 11 is a diagram schematically illustrating an observed image to be input to the pseudo observed image pixel value computing unit according to the present invention.
Figure 12:
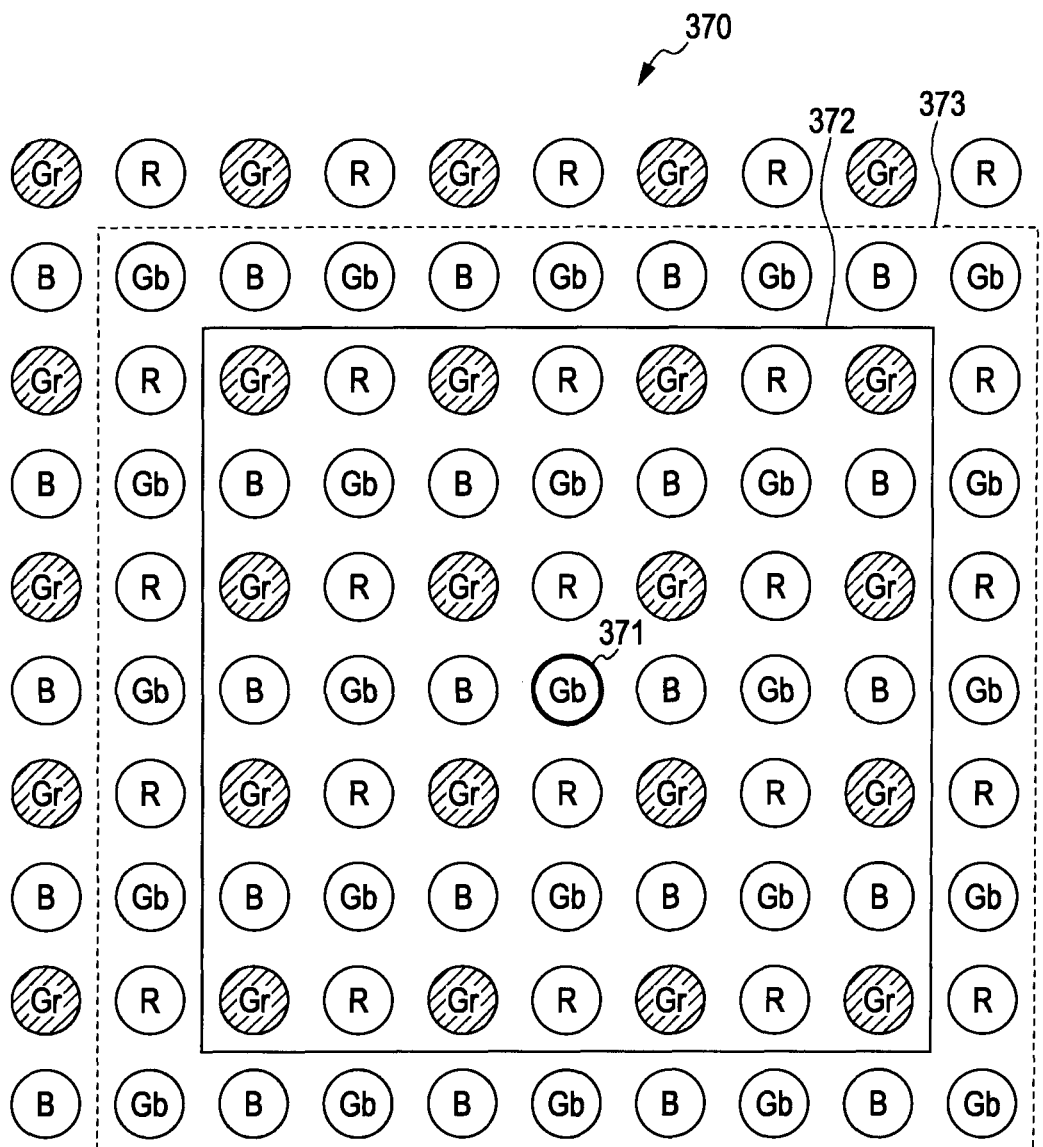
FIG. 12 is a diagram schematically illustrating an observed image to be input to the pseudo observed image pixel value computing unit according to an embodiment of the present invention.

FIGS. 11 and 12 are diagrams schematically illustrating an observed image to be input to the pseudo observed image pixel value computing unit 120 according to an embodiment of the present invention. Note that, the observed images shown in FIGS. 11 and 12, a dashed-line circle (shown in FIGS. 4, 7, and 9) corresponding to a pixel position of a restored image is omitted. Also, with the observed images shown in FIGS. 11 and 12, a pixel of interest is indicated with a heavy circle, and a pixel of the target channel is indicated with a hatched circle. FIG. 11 illustrates an observed image 360 made up of a pixel of interest (a pixel that exists in a position equivalent to a pixel-of-interest position of a restored image) 361, and each pixel adjacent to the pixel of interest 361. Also, FIG. 11 exemplifies a case where the R channel is taken as the channel (reference channel) of the pixel of interest 361, and the channel Gr is taken as the target channel.

With the example shown in FIG. 11, the channel R of the pixel of interest 361, and the target channel Gr are not the same. Therefore, of each pixel adjacent to the pixel of interest 361, the pixel values of the target channel Gr are output to the spatial low-frequency component computing units 123 and 127. Also, of the pixel of interest 361 and each pixel adjacent thereto, the pixel values of the reference channel R are output to the spatial high-frequency component computing unit 124 and the spatial low-frequency component computing unit 126.

Subsequently, the spatial low-frequency component computing units 123 and 127 applies a low-frequency pass filter (e.g., 4×5) to the pixel values of the target channel Gr included in a target channel spatial low-frequency component calculation range 362 (a range indicated with a solid-line rectangle), and subsequently, calculates the spatial low-frequency components of the target channel Gr at the position of the pixel of interest 361. In this case, for example, the spatial low-frequency components of the phase of the position of the pixel of interest 361 can be obtained directly by employing a low-frequency pass filter of an even number tap. Also, an arrangement may be made wherein a low-frequency pass filter of an odd number tap is employed to obtain the spatial low-frequency components of the position of the target channel Gr beforehand, and according to such interpolation, the spatial low-frequency components in the position of the pixel of interest 361 are obtained.

Subsequently, the spatial low-frequency component computing unit 126 applies a low-frequency pass filter (e.g., 5×5) to the pixel values of the reference channel R included in a reference channel spatial low-frequency and high-frequency component calculation range 363 (a range indicated with a dashed-line rectangle), and subsequently, calculates the spatial low-frequency components of the reference channel R at the position of the pixel of interest 361.

Subsequently, the divider 128 calculates the scaling coefficient of the spatial high-frequency components of the reference channel R based on the spatial low-frequency components of the target channel Gr at the position of the pixel of interest 361, and the spatial low-frequency components of the reference channel R at the position of the pixel of interest 361. This calculation is carried out in accordance with, for example, Expression 8.

Subsequently, the spatial high-frequency component computing unit 124 calculates the difference value between the spatial low-frequency components of the reference channel R at the position of the pixel of interest 361, and the pixel value of the reference channel R of the pixel of interest 361, and subsequently, calculates the spatial high-frequency components of the reference channel R at the position of the pixel of interest 361.

Subsequently, the pseudo observed image pixel value computing unit 129 calculates a pseudo observed image pixel value at the position of the pixel of interest 361. Specifically, in accordance with Expression 10, the spatial low-frequency components of the target channel Gr at the position of the pixel of interest 361, the spatial high-frequency components of the reference channel R, and the scaling coefficient of the spatial high-frequency components of the reference channel R are used to calculate a pseudo observed image pixel value at the position thereof. Subsequently, the pseudo observed image pixel value at the position of the pixel of interest 361 is output to the updating signal computing unit 130.

FIG. 12 illustrates an observed image 370 made up of a pixel of interest 371, and each pixel adjacent the pixel of interest 371. Also, FIG. 12 exemplifies a case where the Gb channel is taken as the channel (reference channel) of the pixel of interest 371, and the channel Gr is taken as the target channel. Note that this example is a modification of FIG. 11, wherein a low-frequency pass filter used at the time of calculating spatial low-frequency components differs. Therefore, description regarding a portion common to FIG. 11 will be omitted, and description will be made below with a portion different from FIG. 11 as the center.

With the example shown in FIG. 12, the channel (reference channel) Gb of the pixel of interest 371, and the target channel Gr are not the same. Therefore, of each pixel adjacent to the pixel of interest 371, the pixel values of the target channel Gr are output to the spatial low-frequency component computing units 123 and 127. Also, of the pixel of interest 371 and each pixel adjacent thereto, the pixel values of the reference channel Gb are output to the spatial high-frequency component computing unit 124 and the spatial low-frequency component computing unit 126.

Subsequently, the spatial low-frequency component computing units 123 and 127 apply a low-frequency pass filter (e.g., 4×4) to the pixel values of the target channel Gr included in the target channel spatial low-frequency component calculation range 372 (range indicated with a solid-line rectangle), and subsequently, calculate the spatial low-frequency components of the target channel Gr at the position of the pixel of interest 371.

Subsequently, the spatial low-frequency component computing unit 126 applies a low-frequency pass filter (e.g., 5×5) to the pixel values of the reference channel Gb included in the reference channel spatial low-frequency and high-frequency component calculation range 373 (range indicated with a dashed-line rectangle), and subsequently, calculate the spatial low-frequency components of the reference channel Gb at the position of the pixel of interest 371. Calculation is carried out in the same way as FIG. 11, and a pseudo observed image pixel value at the position of the pixel of interest 371 is calculated, and is subsequently output to the updating signal computing unit 130.

Figure 13:
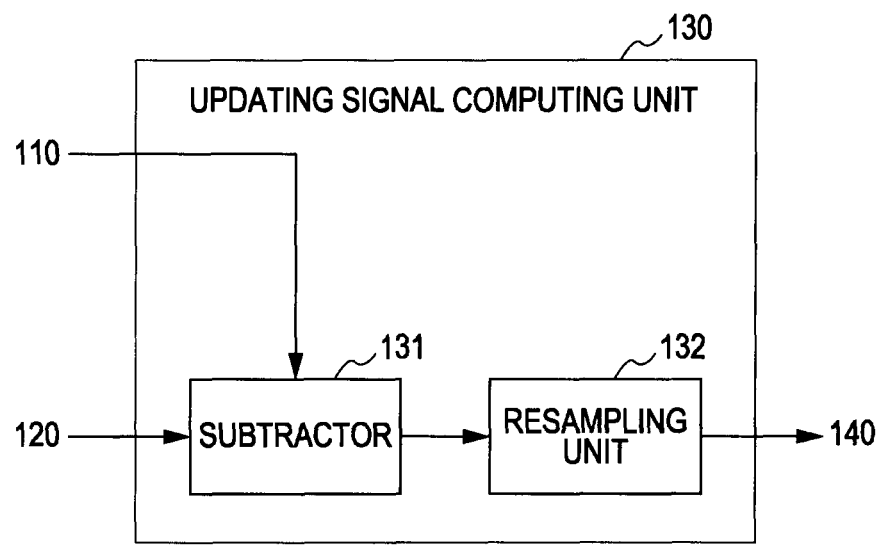
FIG. 13 is a block diagram illustrating a functional configuration example of an updating signal computing unit according to an embodiment of the present invention.

FIG. 13 is a block diagram illustrating a functional configuration example of the updating signal computing unit 130 according to an embodiment of the present invention. The updating signal computing unit 130 includes a subtractor 131, and a resampling unit 132.

The subtractor 131 subtracts the assumed deteriorated image pixel value output from the assumed deteriorated image pixel value computing unit 110 from the pseudo observed image pixel value output from the pseudo observed image pixel value computing unit 120, and outputs the difference value that is the subtraction result to the resampling unit 132. As described above, the pseudo observed image pixel values and assumed deteriorated image pixel values of four target channels (Gr, R, B, and Gb) are created regarding one pixel-of-interest position. Therefore, the four pseudo observed image pixel values and assumed deteriorated image pixel values created regarding one pixel-of-interest position are input to the subtractor 131 sequentially. Subsequently, the subtraction process is carried out sequentially regarding the input four pseudo observed image pixel values and assumed deteriorated image pixel values for each target channel.

The resampling unit 132 resamples the difference value output from the subtractor 131 from a pixel-of-interest position to the pixel positions of a restored image, and outputs the resampled difference value to the restored image creating unit 140 as an updating signal. That is to say, the four difference values calculated for each target channel regarding one pixel-of-interest position (position equivalent to a pixel position of an observed image) are subjected to upsampling to the pixel positions of the restored image having resolution three times the resolution of the observed image. Subsequently, the resampled difference value is output as an updating signal for each pixel position of the restored image.

Figure 14:
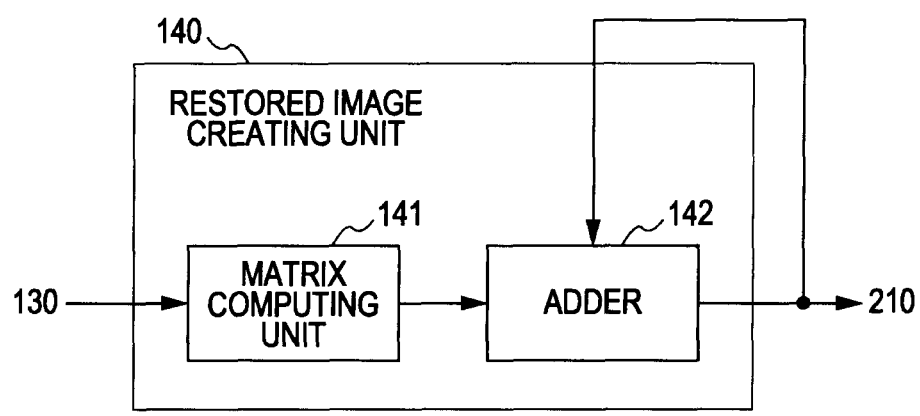
FIG. 14 is a block diagram illustrating a functional configuration example of a restored image creating unit according to an embodiment of the present invention.

FIG. 14 is a block diagram illustrating a functional configuration example of the restored image creating unit 140 according to an embodiment of the present invention. The restored image creating unit 140 includes a matrix computing unit 141, and an adder 142. Note that the restored image creating unit 140 creates a restored image with, for example, the Back-projection method and a simplified type thereof shown in Expressions 3 and 5.

The matrix computing unit 141 executes a calculation wherein a predetermined matrix is applied to the updating signal output from the resampling unit 132 (the difference value between the pseudo observed image pixel value and the assumed deteriorated image pixel value), and outputs the calculation result thereof to the adder 142. Here, examples of the predetermined matrix include the matrixes shown in Expressions 3 and 5 (e.g., matrix $\lambda h^T$ or matrix a).

The adder 142 adds the value of the calculation result output from the matrix computing unit 141, and the pixel value (restored image signal) of each pixel position making up the restored image created most recently. Subsequently, the addition value that is the addition result is output to the white balance processing unit 210 as a restored image signal. Also, this restored image signal is employed for creation of the next restored image signal. That is to say, the restored image created most recently is updated by the restored image creating unit 140, and a new restored image is created. Note that, for example, an image of which the resolution has been converted from an observed image first input to the restoration processing unit 100 can be used as the first restored image.

Figure 15:
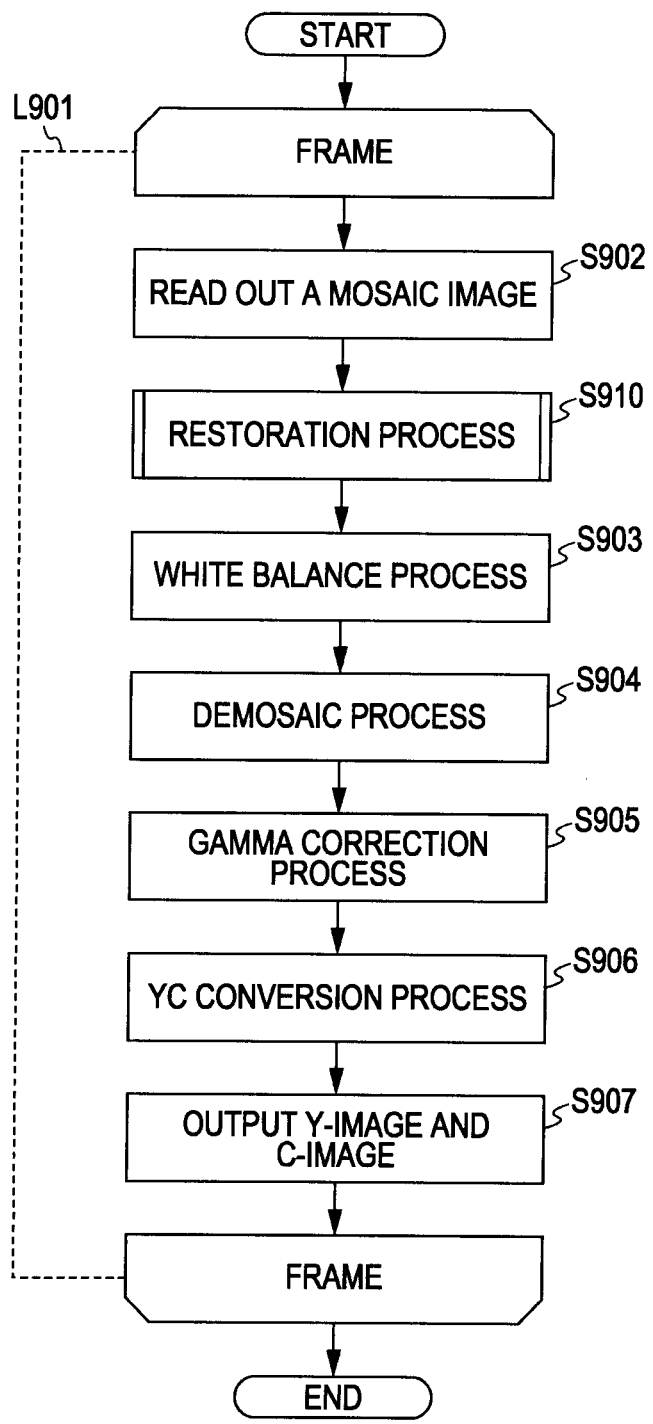
FIG. 15 is a flowchart illustrating the procedure of an image processing circuit according to an embodiment of the present invention.

Next, the operation of the imaging apparatus 10 according to an embodiment of the present invention will be described with reference to the drawings. FIG. 15 is a flowchart illustrating the procedure of the image processing circuit 23 according to an embodiment of the present invention.

In loop L901, with regard to frames (mosaic images) output sequentially from the A/D conversion circuit 22, processes in steps S902 through S907, and S910 are repeated one frame at a time until there is no subsequent frame.

First, the image processing circuit 23 reads out one frame (mosaic image) stored in the internal image memory thereof (step S902).

Next, the restoration processing unit 100 executes a restoration process to restore optical deterioration and sensor deterioration of the readout mosaic image (step S910). Note that this restoration process will be described in detail with reference to FIG. 16.

Next, the white balance processing unit 210 executes a white balance process regarding the mosaic image subjected to the restoration process (step S903). The demosaic processing unit 220 executes a demosaic process to generated an RGB image including the whole information of R, G, and B at each pixel position regarding the mosaic image subjected to the white balance process (step S904). The gamma correction processing unit 230 executes a gamma correction process regarding the RGB image (step S905). The YC conversion processing unit 240 converts the RGB image subjected to the gamma correction into a Y-image and a C-image (step S906). The Y-image and the C-image are output for the sake of display to the display unit 42 or recording to the memory 32 (step S907). Subsequently, if there is no subsequent frame input, the operation of the image processing circuit 23 is ended.

Figure 16:
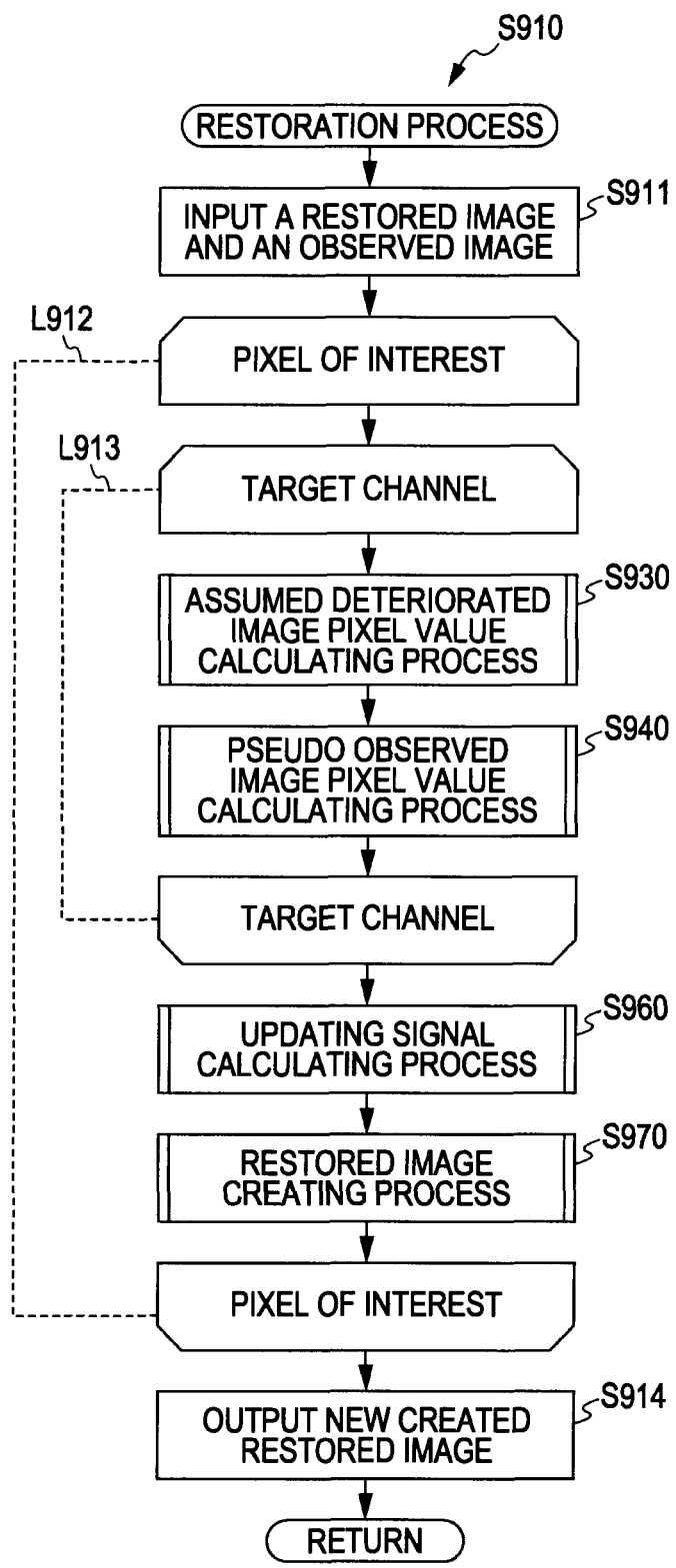
FIG. 16 is a flowchart illustrating the procedure of a restoration process by the restoration processing unit according to an embodiment of the present invention.

FIG. 16 is a flowchart illustrating the procedure of the restoration process (step S910 in FIG. 15) by the restoration processing unit 100 according to an embodiment of the present invention. Note that this example exemplifies a case where a series of the restoration process is executed in increments of pixels.

First, the restoration processing unit 100 inputs the mosaic image (observed image) read out from the internal image memory of the image processing circuit 23, and the mosaic image (restored image) output from the restored image creating unit 140 (step S911).

Next, in loop L912, processes in loop L913, steps S960, and S970 are executed regarding each pixel of interest of the observed image and the restored image (two mosaic images). Also, in loop L913, processes in steps S930 and S940 are executed at every four target channels regarding each pixel of interest of the observed image and the restored image (two mosaic images).

In loop L913, first, the assumed deteriorated image pixel value computing unit 110 executes an assumed deteriorated image pixel value calculating process to calculate an assumed deteriorated image pixel value regarding the pixels of interest of the restored image (step S930). This assumed deteriorated image pixel value calculating process will be described in detail with reference to FIG. 17. Note that step S930 is an example of the assumed deteriorated image pixel value calculating procedure that realizes a feature of the present invention.

Subsequently, the pseudo observed image pixel value computing unit 120 executes a pseudo observed image pixel value calculating process to calculate a pseudo observed image pixel value regarding the pixels of interest of the observed image (step S940). This pseudo observed image pixel value calculating process will be described in detail with reference to FIG. 18. Note that step S940 is an example of the pseudo target image pixel value calculating procedure that realizes a feature of the present invention. The loop L913 is repeated until the calculations of an assumed deteriorated image pixel value and a pseudo observed image pixel value regarding the four target channels are ended. In a case where the calculations of an assumed deteriorated image pixel value and a pseudo observed image pixel value regarding the four target channels have been ended, the loop L913 is ended, and the process proceeds to step S960.

Subsequently, the updating signal computing unit 130 executes an updating signal calculating process to calculate an updating signal based on the assumed deteriorated image pixel value and the pseudo observed image pixel value (step S960). This updating signal calculating process will be described in detail with reference to FIG. 20.

Subsequently, the restored image creating unit 140 executes a restored image creating process to update the restored image and create a new restored image based on the restored image signal and the updating signal (step S970). This restored image creating process will be described in detail with reference to FIG. 21. Note that step S970 is an example of the restored image creating procedure that realizes a feature of the present invention.

The loop L912 is repeated until the restored image creating process is ended regarding each pixel of interest. In a case where the restored image creating process has been ended regarding each pixel of interest, the loop L912 is ended, and the process proceeds to step S914.

Subsequently, the restoration processing unit 100 outputs a new restored image to the white balance processing unit 210 (step S914). Note that this example has exemplified a case where a series of the restoration process are executed in increments of pixels, but each restoration process may be executed in increments of frames.

Figure 17:
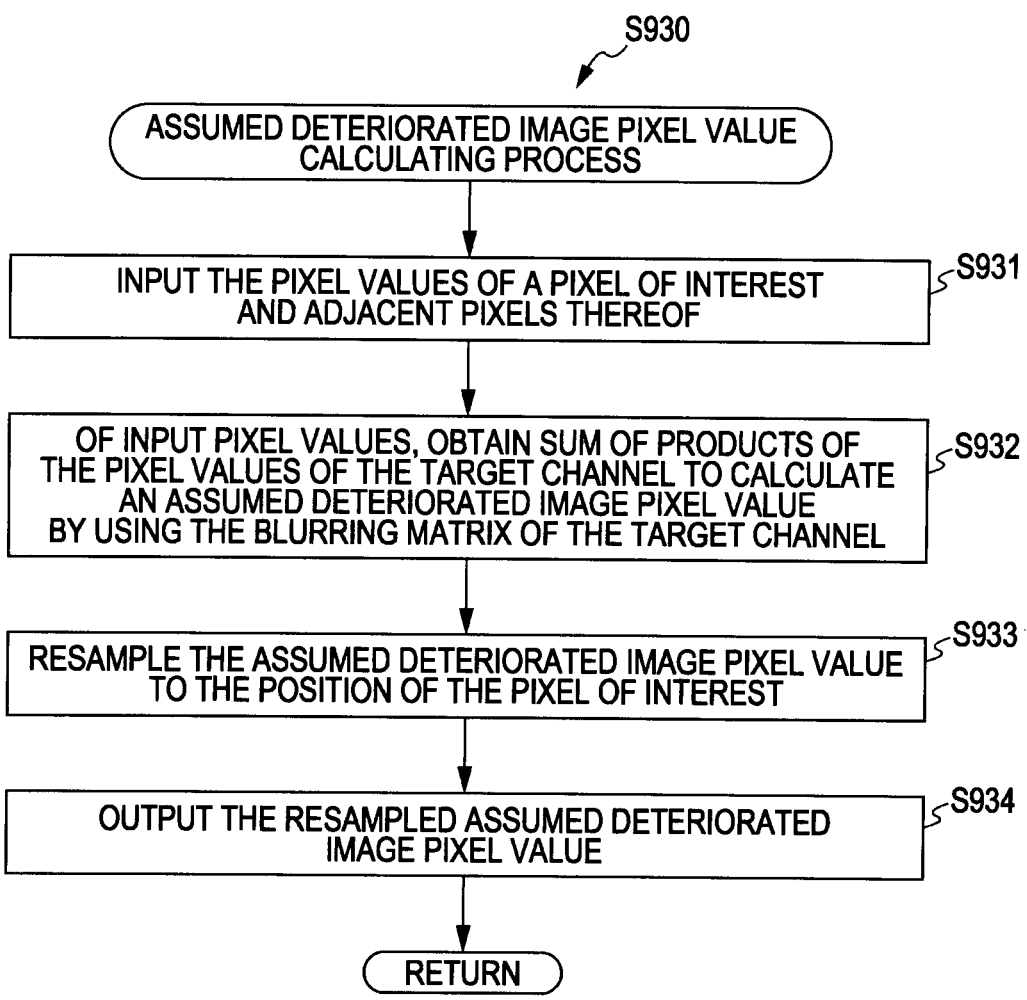
FIG. 17 is a flowchart illustrating the procedure of an assumed deteriorated image pixel value calculating process by the assumed deteriorated image pixel value computing unit according to an embodiment of the present invention.

FIG. 17 is a flowchart illustrating the procedure of the assumed deteriorated image pixel value calculating process (step S930 in FIG. 16) by the assumed deteriorated image pixel value computing unit 110 according to an embodiment of the present invention.

First, the sum-of-products unit 112 inputs the pixel values of a pixel of interest and each pixel adjacent thereto of the restored image output from the restored image creating unit 140 (step S931).

Next, of the pixel of interest and each pixel adjacent thereto of the restored image, the sum-of-product unit 112 employs a blurring matrix of the target channel to obtain sum of products, and calculates an assumed deteriorated image pixel value at the pixel-of-interest position thereof (step S932).

Subsequently, the resampling unit 113 resamples the assumed deteriorated image pixel value to the pixel-of-interest position (step S933), and outputs the resampled assumed deteriorated image pixel value to the updating signal computing unit 130 (step S934).

Figure 18:
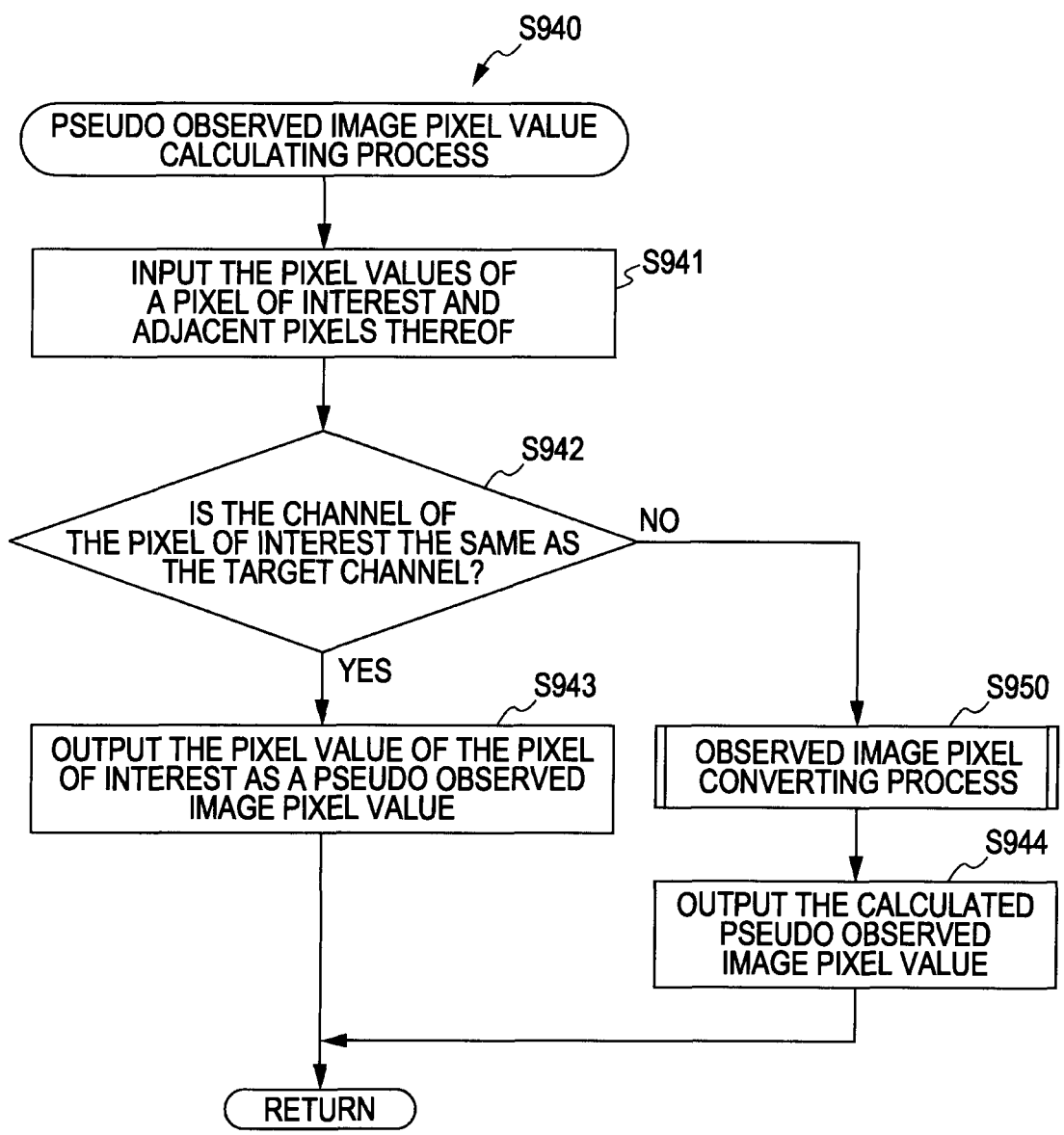
FIG. 18 is a flowchart illustrating the procedure of a pseudo observed image pixel value calculating process by the pseudo observed image pixel value computing unit according to an embodiment of the present invention.

FIG. 18 is a flowchart illustrating the procedure of the pseudo observed image pixel value calculating process (step S940 in FIG. 16) by the pseudo observed image pixel value computing unit 120 according to an embodiment of the present invention.

First, the channel determining unit 121 inputs the pixel values of a pixel of interest and each pixel adjacent thereto of the observed image read out from the internal image memory of the image processing circuit 23 (step S941).

Next, the channel determining unit 121 determines whether or not the channel of the pixel of interest of the observed image, and the target channel are the same (step S942). In a case where determination is made that the channel of the pixel of interest of the observed image, and the target channel are the same (step S942), the channel determining unit 121 outputs the pixel value of the pixel of interest of the observed image to the updating signal computing unit 130 as a pseudo observed image pixel value (step S943). On the other hand, in a case where determination is made that the channel of the pixel of interest of the observed image, and the target channel are not the same (step S942), the observed image pixel converting unit 122 executes an observed image pixel converting process to convert the pixel value of the pixel of interest thereof into a pseudo observed image pixel value (step S950). This observed image pixel converting process will be described in detail with reference to FIG. 19. Subsequently, the obtained pseudo observed image pixel value is output to the updating signal computing unit 130 (step S944).

Figure 19:
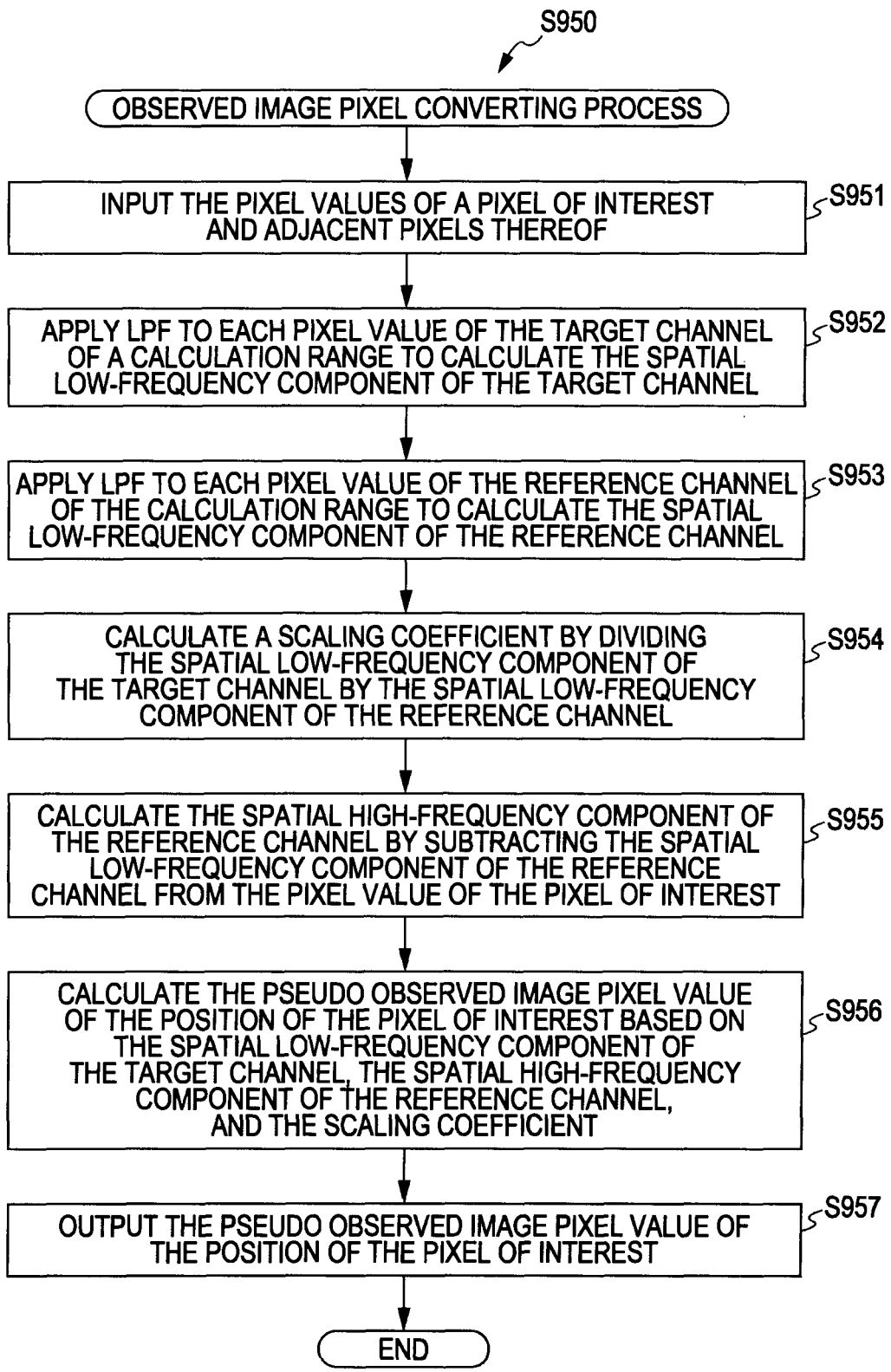
FIG. 19 is a flowchart illustrating the procedure of an observed image pixel converting process by an observed image pixel converting unit according to an embodiment of the present invention.

FIG. 19 is a flowchart illustrating the procedure of the observed image pixel converting process (step S950 in FIG. 18) by the observed image pixel converting unit 122 according to an embodiment of the present invention.

First, the observed image pixel converting unit 122 inputs the pixel values of the pixel of interest and each pixel adjacent thereto of the observed image output from the channel determining unit 121 (step S951).

Next, the spatial low-frequency component computing units 123 and 127 apply a low-frequency pass filter (LPF) to the pixel values of the target channel included in the calculation range, and calculates the spatial low-frequency components of the target channel at the pixel-of-interest position (step S952).

Subsequently, the spatial low-frequency component computing unit 126 applies a low-frequency pass filter to the pixel values of the reference channel included in the calculation range, and calculates the spatial low-frequency components of the reference channel at the pixel-of-interest position (step S953).

Subsequently, the divider 128 divides the spatial low-frequency components of the target channel at the pixel-of-interest position by the spatial low-frequency components of the reference channel at the pixel-of-interest position to calculate the scaling coefficient of the spatial high-frequency components of the reference channel (step S954).

Subsequently, the spatial high-frequency component computing unit 124 calculates the difference value between the spatial low-frequency components of the reference channel at the pixel-of-interest position, and the pixel value of the reference channel of the pixel of interest to calculate the spatial high-frequency components of the reference channel at the pixel-of-interest position (step S955).

Subsequently, the pseudo observed image pixel value computing unit 129 calculates a pseudo observed image pixel value at the pixel-of-interest position (step S956). That is to say, the spatial low-frequency components of the target channel, the spatial high-frequency components of the reference channel, the scaling coefficient of the spatial high-frequency components of the reference channel, at the pixel-of-interest position are used to calculate a pseudo observed image pixel value at the position thereof.

Subsequently, the pseudo observed image pixel value computing unit 129 outputs the obtained pseudo observed image pixel value to the updating signal computing unit 130 (step S957).

Figure 20:
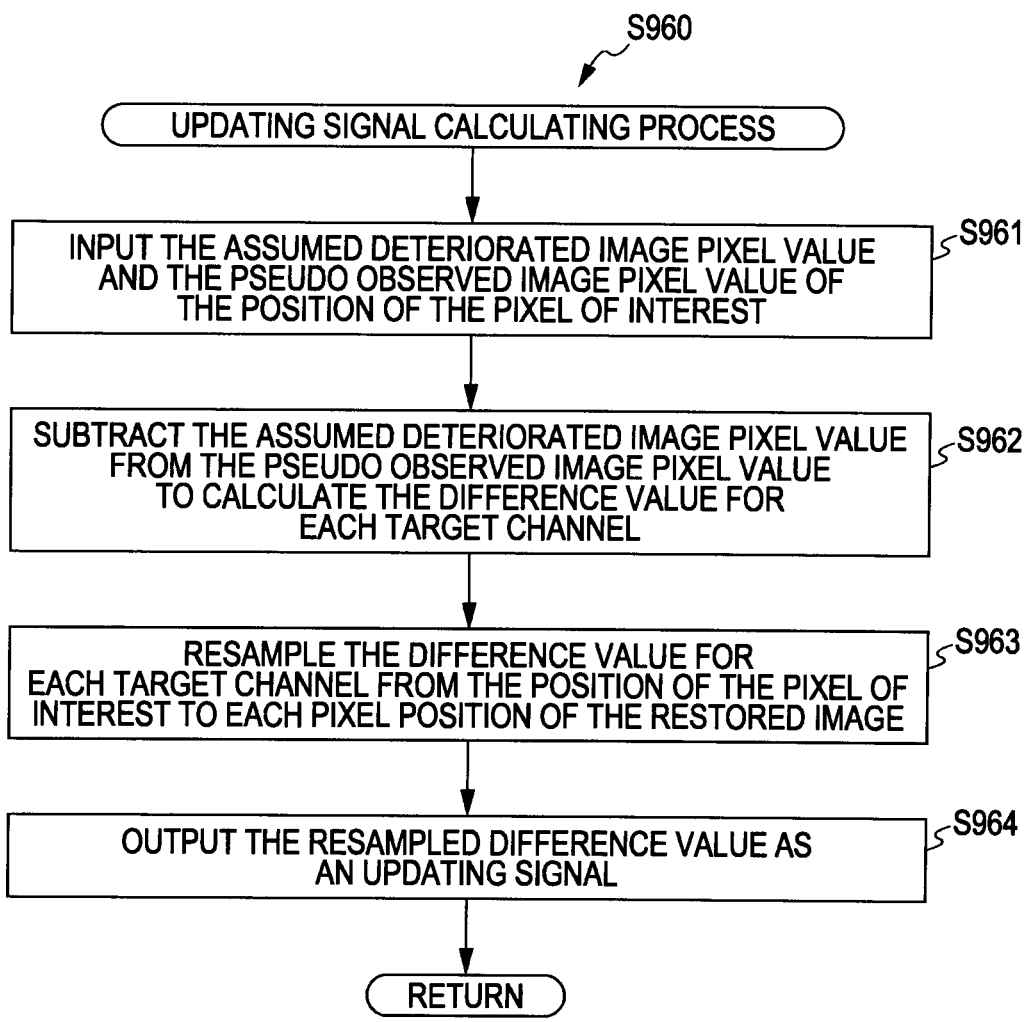
FIG. 20 is a flowchart illustrating the procedure of an updating signal calculating process by the updating signal computing unit according to an embodiment of the present invention.

FIG. 20 is a flowchart illustrating the procedure of the updating signal calculating process (step S960 in FIG. 16) by the updating signal computing unit 130 according to an embodiment of the present invention.

First, the subtractor 131 inputs the assumed deteriorated image pixel value and pseudo observed image pixel value calculated regarding the pixel-of-interest position (step S961). Subsequently, the subtractor 131 subtracts the assumed deteriorated image pixel value from the pseudo observed image pixel value for each target channel to calculate the difference value for each target channel (step S962). That is to say, the difference value for each target channel is calculated regarding the assumed deteriorated image pixel value and pseudo observed image pixel value calculated at every four target channels regarding one pixel-of-interest position.

Next, the resampling unit 132 resamples the difference value obtained for each target channel from the pixel-of-interest position to the pixel positions of the restored image (step S963). Subsequently, the resampling unit 132 outputs the difference value resampled to the pixel positions of the restored image to the restored image creating unit 140 as an updating signal (step S964).

Figure 21:
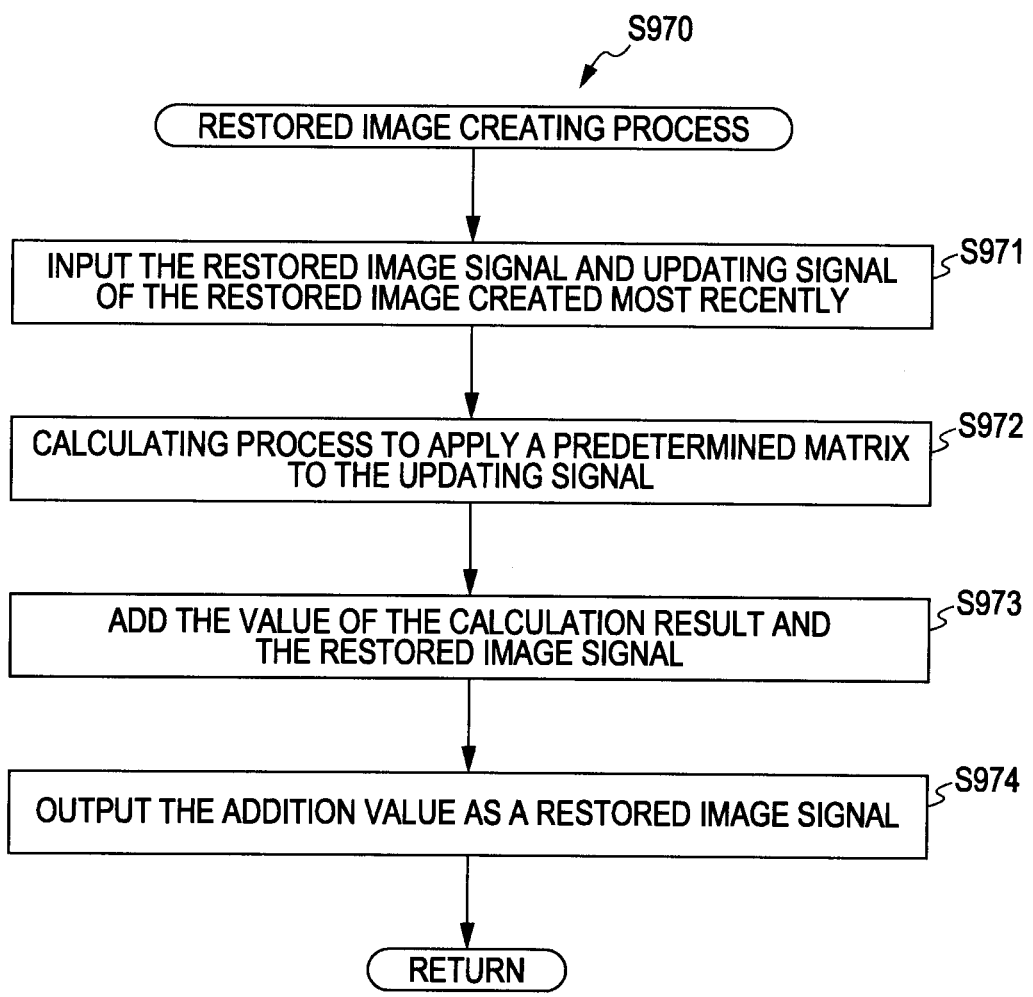
FIG. 21 is a flowchart illustrating the procedure of a restored image creating process by the restored image creating unit according to an embodiment of the present invention.

FIG. 21 is a flowchart illustrating the procedure of the restored image creating process (step S970 in FIG. 16) by the restored image creating unit 140 according to an embodiment of the present invention.

First, the matrix computing unit 141 inputs the updating signal output from the resampling unit 132 (step S971), and executes computation to apply a predetermined array to the updating signal (step S972).

Next, the adder 142 adds the value of the computation result output from the matrix computing unit 141, and the restored image signal of the restored image created most recently (step S973). Subsequently, the adder 142 outputs the addition value that is the addition result to the white balance processing unit 210 as a restored image signal (step S974).

Description has been made so far regarding the example wherein, focusing attention on that there is a correlation between channels regarding change in pixel values, the pixel value of the target channel at the pixel-of-interest position is estimated based on this correlation between channels regarding change in pixel values. Description will be made below regarding an example wherein, focusing attention on that there is a correlation between channels regarding change in pixel values, following this correlation between channels being approximated linearly, the pixel value of the target channel is estimated from the pixel value of the reference channel at the pixel-of-interest position.

Figure 22:
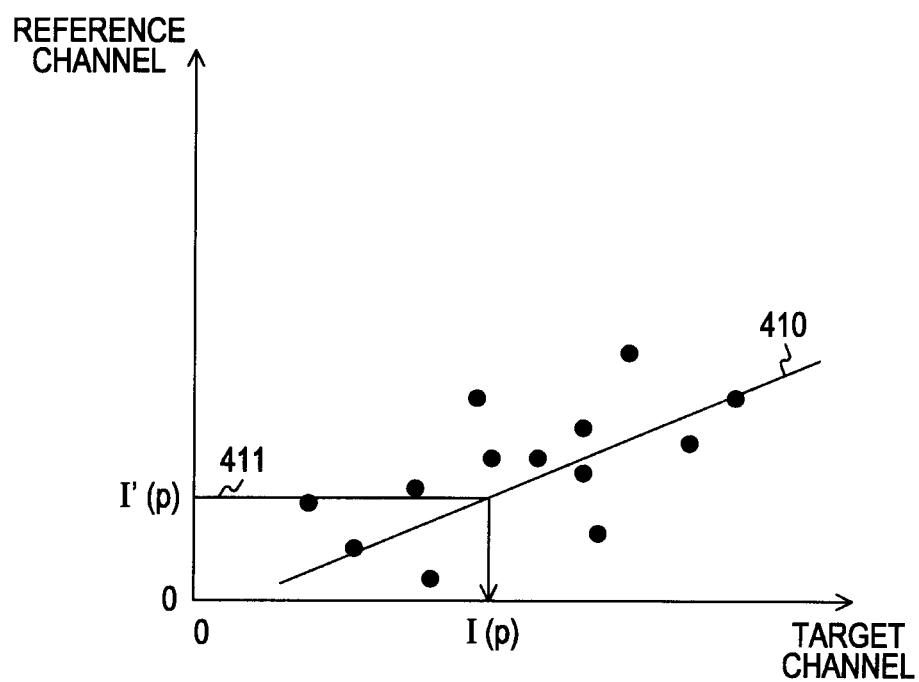
FIG. 22 is a diagram illustrating an example of a pixel value distribution graph that represents a pixel value distribution between a reference channel relating to a pixel of interest, and each pixel adjacent thereto, and a target channel.

FIG. 22 is a diagram illustrating an example of a pixel value distribution graph that represents a pixel value distribution between the reference channel relating to a pixel of interest and each pixel adjacent thereto, and a target channel. With the pixel value distribution graph shown in FIG. 22, the horizontal axis indicates a pixel value of the target channel, and the vertical axis indicates a pixel value of the reference channel. Also, with regard to the pixel of interest and pixels adjacent thereto, the corresponding positions of the pixel values of adjacent two pixels of the target channel and the reference channel are indicated with black circles. FIG. 22 will now be described in detail with reference to FIG. 23.

Figure 23:
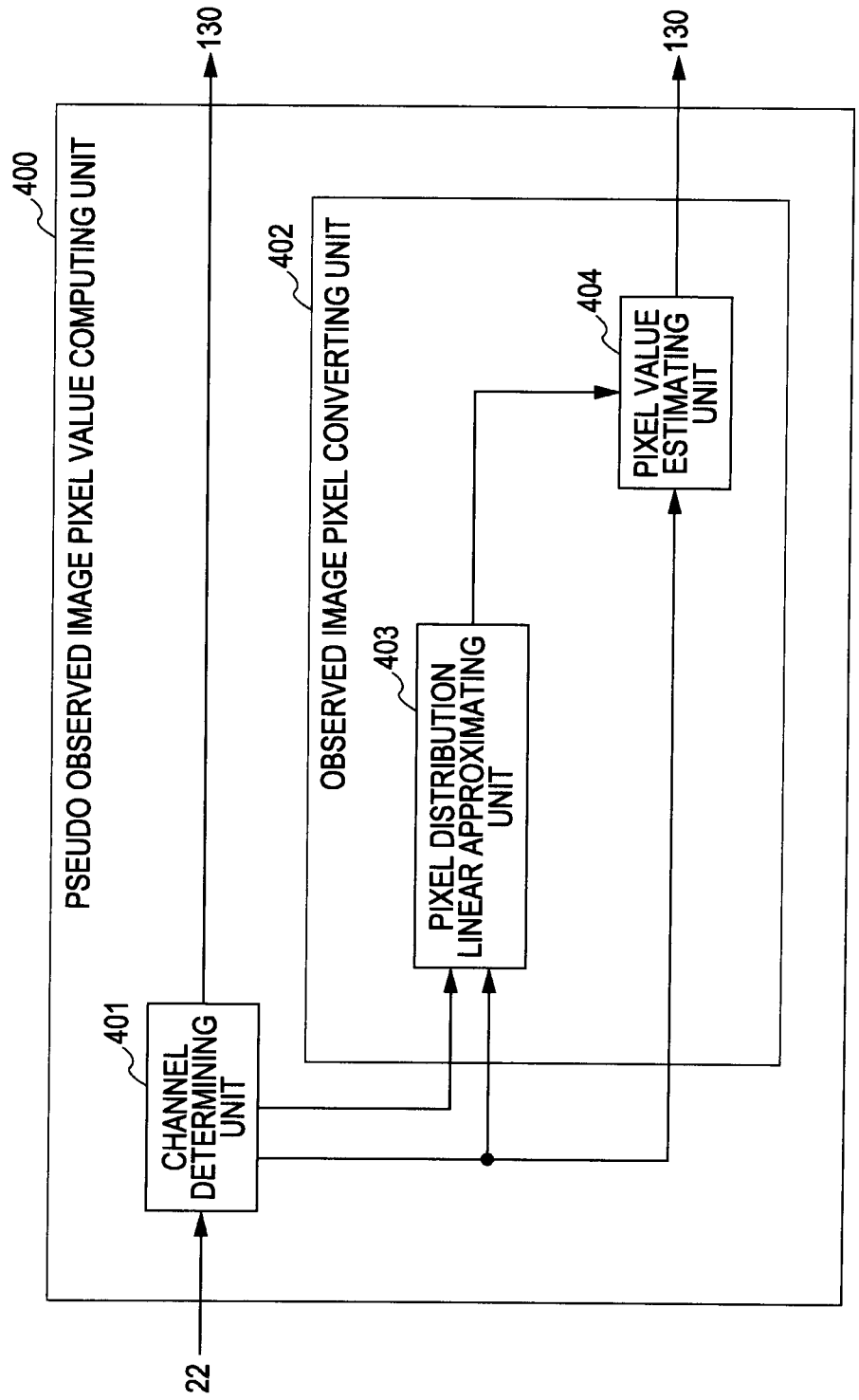
FIG. 23 is a block diagram illustrating a functional configuration example of a pseudo observed image pixel value computing unit according to an embodiment of the present invention.

FIG. 23 is a block diagram illustrating a functional configuration example of a pseudo observed image pixel value computing unit 400 according to an embodiment of the present invention. The pseudo observed image pixel value computing unit 400 includes the restoration processing unit 100 shown in FIG. 5 instead of the pseudo observed image pixel value computing unit 120, and is a modification of the pseudo observed image pixel value computing unit 120. Note that there is no change in other configurations of the restoration processing unit 100, and accordingly, only the pseudo observed image pixel value computing unit 400 will be described here, and description regarding the other configurations of the restoration processing unit 100 will be omitted. Also, the pseudo observed image pixel value computing unit 400 is an example of the pseudo target image pixel value computing unit that realizes a feature of the present invention.

The pseudo observed image pixel value computing unit 400 includes a channel determining unit 401, and an observed image pixel converting unit 402. Note that the channel determining unit 401 is generally the same as the channel determining unit 121 shown in FIG. 10, and accordingly, description will be made with a point different from the channel determining unit 121 as the center, and description regarding common points will be omitted.

The channel determining unit 401 determines whether or not the channel of the pixel of interest and the target channel are the same. In a case where determination is made that the channel of the pixel of interest and the target channel are the same, the pixel value of the pixel of interest thereof is output to the updating signal computing unit 130 as a pseudo observed image pixel value. On the other hand, in the case of determining that the channel of the pixel of interest and the target channel are not the same, the channel determining unit 401 outputs, of the pixel of interest and each pixel adjacent thereto, the pixel values of the target channel to the pixel distribution linear approximating unit 403. Also, the channel determining unit 401 outputs, of the pixel of interest and each pixel adjacent thereto, the pixel value of the channel (reference channel) of the pixel of interest to the pixel distribution linear approximating unit 403 and the pixel value estimating unit 404.

The observed image pixel converting unit 402 includes a pixel distribution linear approximating unit 403, and a pixel estimating unit 404.

The pixel distribution linear approximating unit 403 creates a pixel value distribution between the target channel and the reference channel regarding the pixel values of the pixel of interest and each pixel adjacent thereto, and calculates the expression of a linear approximation straight line based on this pixel value distribution. Specifically, two adjacent pixels of the target channel and the reference channel are plotted sequentially regarding the pixel values of the pixel of interest and each pixel adjacent thereto, and as shown in FIG. 22, a pixel value distribution that indicates the corresponding positions of the pixel values of the two pixels is created sequentially. Subsequently, an approximation straight line is calculated based on the created pixel value distribution. For example, in a case where pixel values are distributed as shown in FIG. 22, a linear approximate straight line 410 is obtained by calculation.

The pixel value estimating unit 404 substitutes the pixel value of a pixel of interest of the observed image (the pixel value of the reference channel) for the approximated straight line expression calculated and obtained by the pixel distribution linear approximating unit 403 to calculate the pixel value of the corresponding target channel, and subsequently, outputs the pixel value of the target channel obtained by the approximated straight line expression to the updating signal computing unit 130 as the pseudo observed image pixel value of the pixel-of-interest position. For example, in a case where the pixel value of the pixel of interest is I'(p) shown in FIG. 22, the value of the I'(p) is calculated and obtained as the pixel of the target channel.

Figure 24:
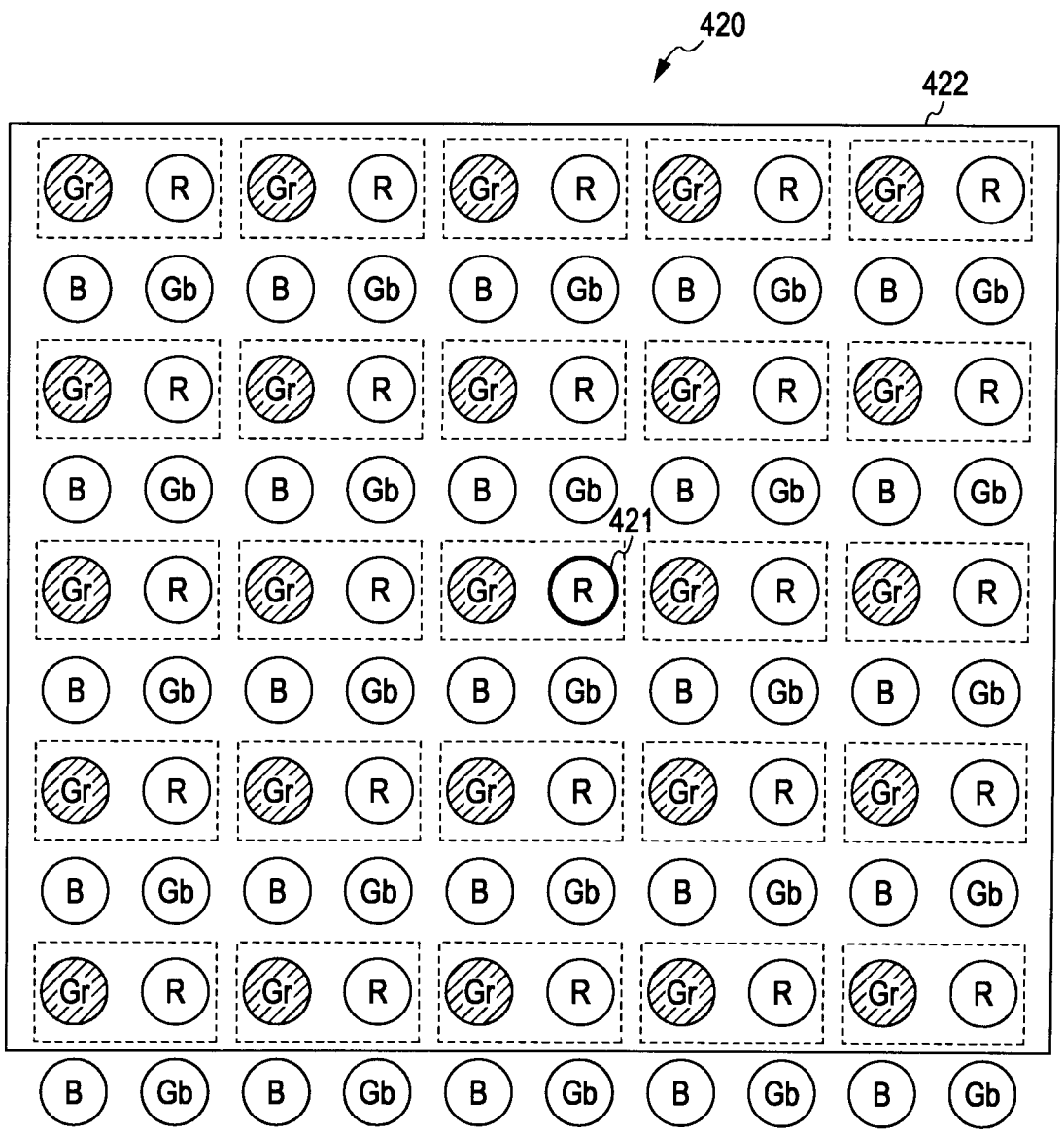
FIG. 24 is a diagram schematically illustrating an observed image to be input to the pseudo observed image pixel value computing unit 400 according to an embodiment of the present invention.
Figure 25:
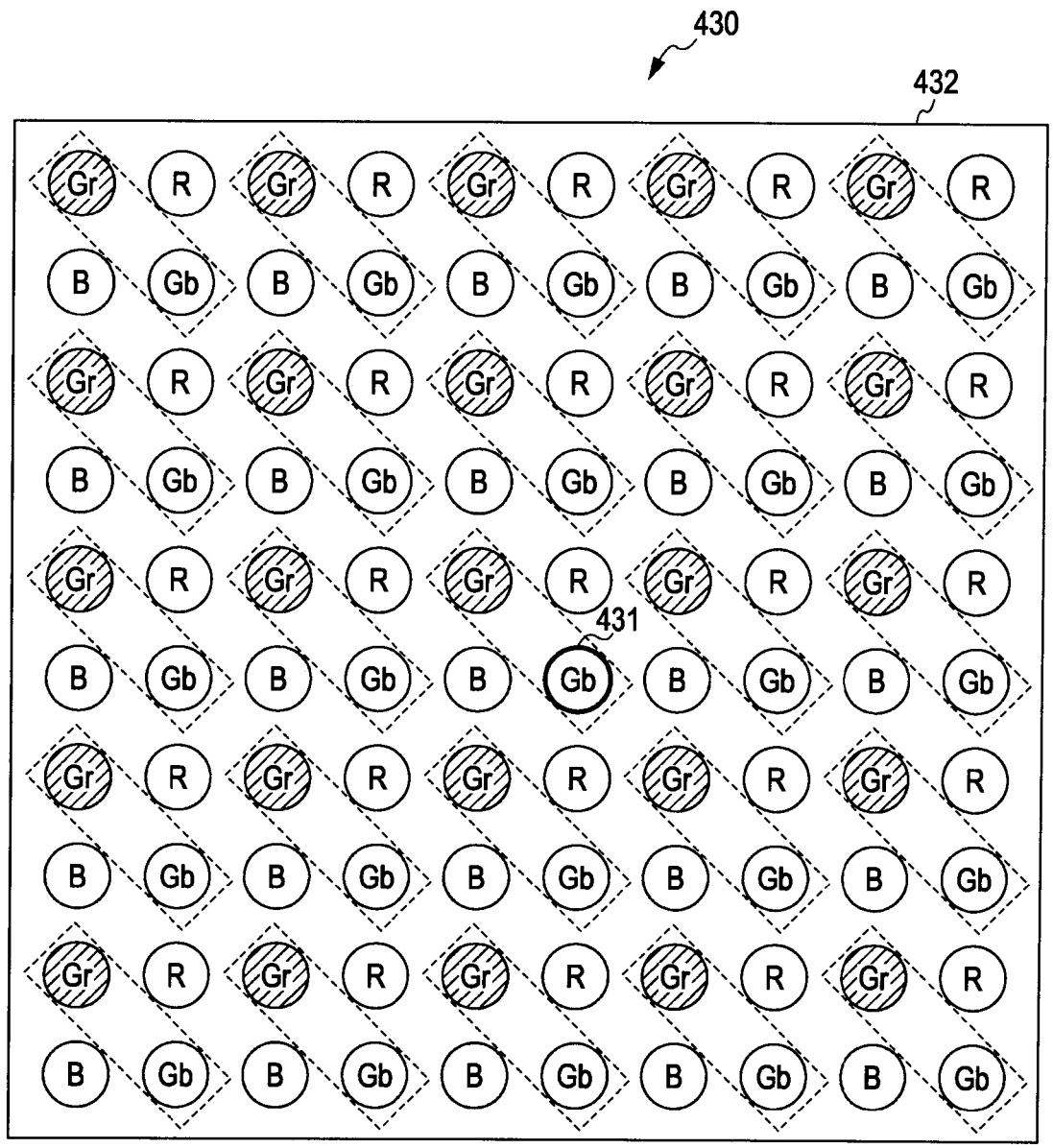
FIG. 25 is a diagram schematically illustrating an observed image to be input to the pseudo observed image pixel value computing unit according to an embodiment of the present invention.

FIGS. 24 and 25 are diagrams schematically illustrating an observed image to be input to the pseudo observed image pixel value computing unit 400 according to an embodiment of the present invention. Note that the pixel arrays shown in FIGS. 24 and 25 are the same as the pixel arrays of the observed images shown in FIGS. 11 and 12. Also, in the same way as the observed images shown in FIGS. 11 and 12, a pixel of interest is indicated with a heavy circle, and a pixel of the target channel is indicated with a hatched circle. FIG. 24 illustrates an observed image 420 made up of a pixel of interest 421, and each pixel adjacent to the pixel of interest 421. Also, FIG. 24 exemplifies a case where the R channel is taken as the channel (reference channel) of the pixel of interest 421, and the channel Gr is taken as the target channel.

With the example shown in FIG. 24, the channel R of the pixel of interest 421, and the target channel Gr are not the same. Therefore, of each pixel adjacent to the pixel of interest 421, the pixel value of the target channel Gr is output to the pixel distribution linear approximating unit 403. Also, of the pixel of interest 421 and each pixel adjacent thereto, the pixel value of the reference channel R is output to the pixel distribution linear approximating unit 403 and the pixel value estimating unit 404.

Next, the pixel distribution linear approximating unit 403 plots a set of the pixel of the target channel Gr, and the pixel of the reference channel R, included in a pixel value distribution approximation straight line calculation range 422 (a range indicated with a solid-line rectangle). For example, as shown in FIG. 24, the set of two pixels of the target channel Gr and the reference channel R that are adjacent mutually are plotted. Note that FIG. 24 illustrates the two plotted pixels by surrounding these with a dashed-line rectangle. Note that an arrangement may be made wherein one of the pixel of the target channel Gr, and the pixel of the reference channel R, included in the calculation range 422 is interpolated to the pixel position of the other, and a set of the pixel values are created at this pixel position. Subsequently, the pixel distribution linear approximating unit 403 creates a pixel value distribution between the reference channel and the target channel regarding the two pixels thus plotted, and calculates a linear approximation straight line expression based on this pixel value distribution.

Next, the pixel value estimating unit 404 substitutes the pixel value of the pixel of interest 421 (the pixel value of the reference channel R) for the expression of the approximation straight line calculated and obtained by the pixel distribution linear approximating unit 403 to calculate the pixel value of the target channel Gr, and subsequently, outputs the pseudo observed image pixel value at the position of the pixel of interest 421 to the updating signal computing unit 130.

FIG. 25 illustrates an observed image 430 made up of a pixel of interest 431, and each pixel adjacent to the pixel of interest 431. Also, FIG. 25 exemplifies a case where the channel Gb is taken as the channel (reference channel) of the pixel of interest 431, the channel Gr is taken as the target channel. Note that this example is a modification of FIG. 24, a set of two pixels to be plotted differs from the set in FIG. 24. Therefore, description regarding portions common to FIG. 24 will be omitted, and description will be made below with a portion different from FIG. 24 as the center.

With the example shown in FIG. 25, the channel Gb of the pixel of interest 431, and the target channel Gr are not the same. Therefore, of each pixel adjacent to the pixel of interest 431, the pixel values of the target channel Gr are output to the pixel distribution linear approximating unit 403. Also, of the pixel of interest 431 and each pixel adjacent thereto, the pixel values of the reference channel Gb are output to the pixel distribution linear approximating unit 403 and the pixel value estimating unit 404.

Subsequently, the pixel distribution linear approximating unit 403 plots a set of the pixel of the target channel Gr, and the pixel of the reference channel Gb, included in a pixel value distribution approximation straight line calculation range 432 (a range indicated with a solid-line rectangle). For example, as shown in FIG. 25, the set of two pixels of the target channel Gr and the reference channel Gb that are adjacent mutually are plotted. FIG. 25 illustrates the two plotted pixels by surrounding these with a dashed-line rectangle. Note that an arrangement may be made wherein one of the pixel of the target channel Gr, and the pixel of the reference channel Gb, included in the calculation range 432 is interpolated to the pixel position of the other, and a set of the pixel values are created at this pixel position. Subsequently, the pixel distribution linear approximating unit 403 creates a pixel value distribution between the reference channel and the target channel regarding the two pixels thus plotted, and calculates a linear approximation straight line expression based on this pixel value distribution. Subsequently, in the same way as in FIG. 24, the pixel value estimating unit 404 substitutes the pixel value of the pixel of interest 431 (the pixel value of the reference channel Gb) for the approximation straight line expression calculated and obtained by the pixel distribution linear approximating unit 403 to calculate the pixel value of the target channel Gr, and subsequently, outputs the pseudo observed image pixel value at the position of the pixel of interest 431 to the updating signal computing unit 130.

Figure 26:
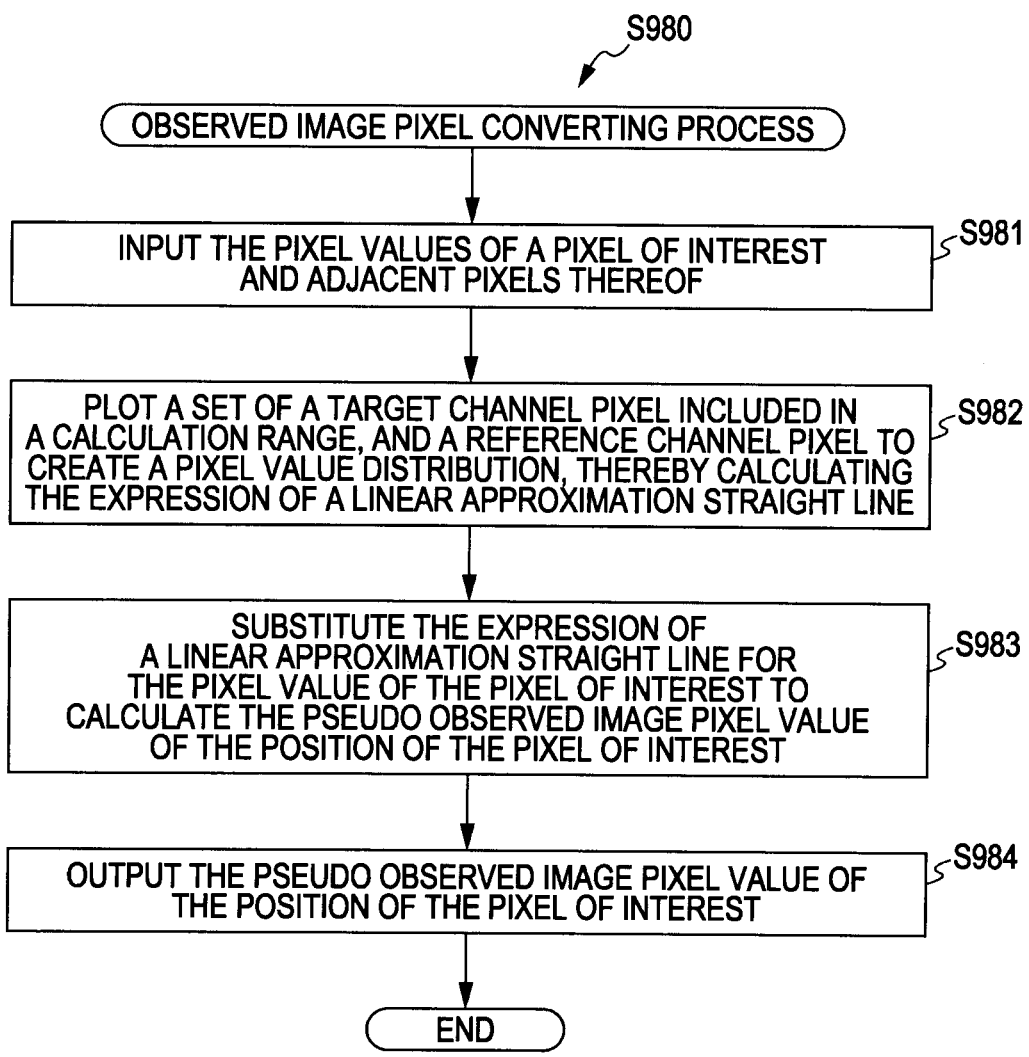
FIG. 26 is a flowchart illustrating the procedure of observed image pixel converting process by an observed image pixel converting unit according to an embodiment of the present invention.

FIG. 26 is a flowchart illustrating the procedure of the observed image pixel converting process by the observed image pixel converting unit 402 according to an embodiment of the present invention. This observed image pixel converting process is a process to be executed instead of step S950 shown in FIG. 18, and description regarding the other processes shown in FIG. 18 will be omitted.

First, the observed image pixel converting unit 402 inputs the pixel values of the pixel of interest, and each pixel adjacent thereto of the observed image output from the channel determining unit 401 (step S981).

Next, the pixel distribution linear approximating unit 403 plots a set of the pixel of the target channel, and the pixel of the reference channel, included in the calculation range, creates a pixel value distribution based on the set of these pixels, and calculates a linear approximation straight line expression based on this pixel value distribution (step S982).

Subsequently, the pixel value estimating unit 404 substitutes the pixel value of the pixel of interest for the obtained approximation straight line expression to calculate the pixel value of the target channel at the pixel-of-interest position (step S983), and subsequently, outputs the obtained pixel value of the target channel at the pixel-of-interest position to the updating signal computing unit 130 as a pseudo observed image pixel value (step S984).

In FIGS. 23 through 26, description has been made regarding an example wherein, focusing attention on that there is a correlation between channels regarding change in pixel values, following this correlation between channels being approximated linearly, the pixel of the target channel is estimated from the pixel value of the reference channel at the pixel-of-interest position. Description will be made below regarding an example wherein a cross bilateral filter is employed to estimate the pixel value of the target channel at a pixel-of-interest position.

Figure 27A:
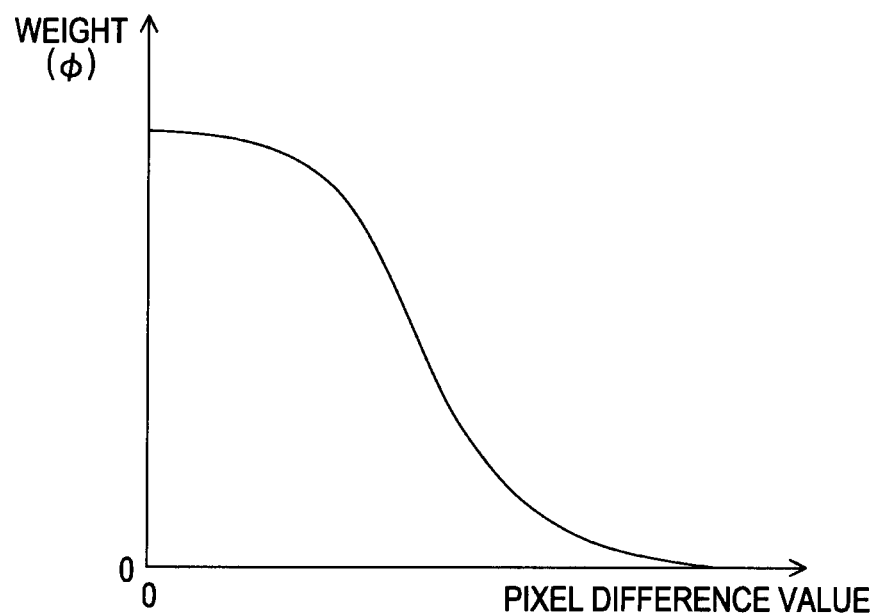
FIGS. 27A and 27B are diagrams illustrating examples of a pixel value axis weight function LUT (Look Up Table) and a spatial axis weight function LUT.
Figure 27B:
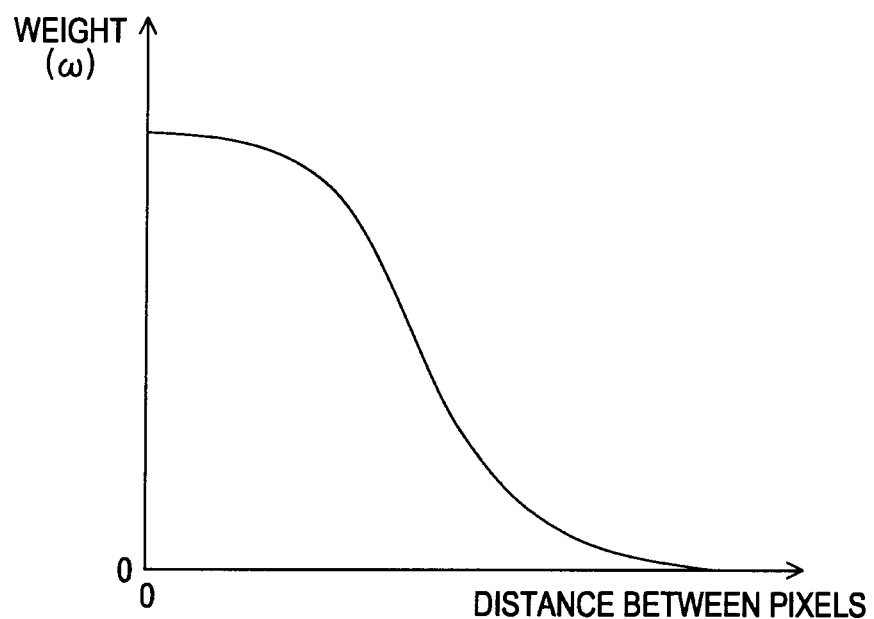

FIGS. 27A and 27B are diagrams illustrating examples of a pixel value axis weight function LUT (Look up Table) and a spatial axis weight function LUT. FIG. 27A illustrates an example of the pixel value axis weight function LUT, and FIG. 27B illustrates an example of the spatial axis weight function LUT.

The pixel value axis weight function LUT is a LUT that indicates the relation between the difference value of the pixel values of different two pixels of an observed image, and weight $\phi$ as to this difference value. The spatial axis weight function LUT is a LUT that indicates the relation between the distance between two pixels of an observed image, and weight $\omega$ as to this distance. Here, as a function used for obtaining weight $\phi$ or $\omega$, it is desirable to employ a function having a property of monotone decreasing that returns a large value when an argument is small. Note that the functions shown in FIGS. 27A and 27B will be described in detail with reference to FIG. 28.

Figure 28:
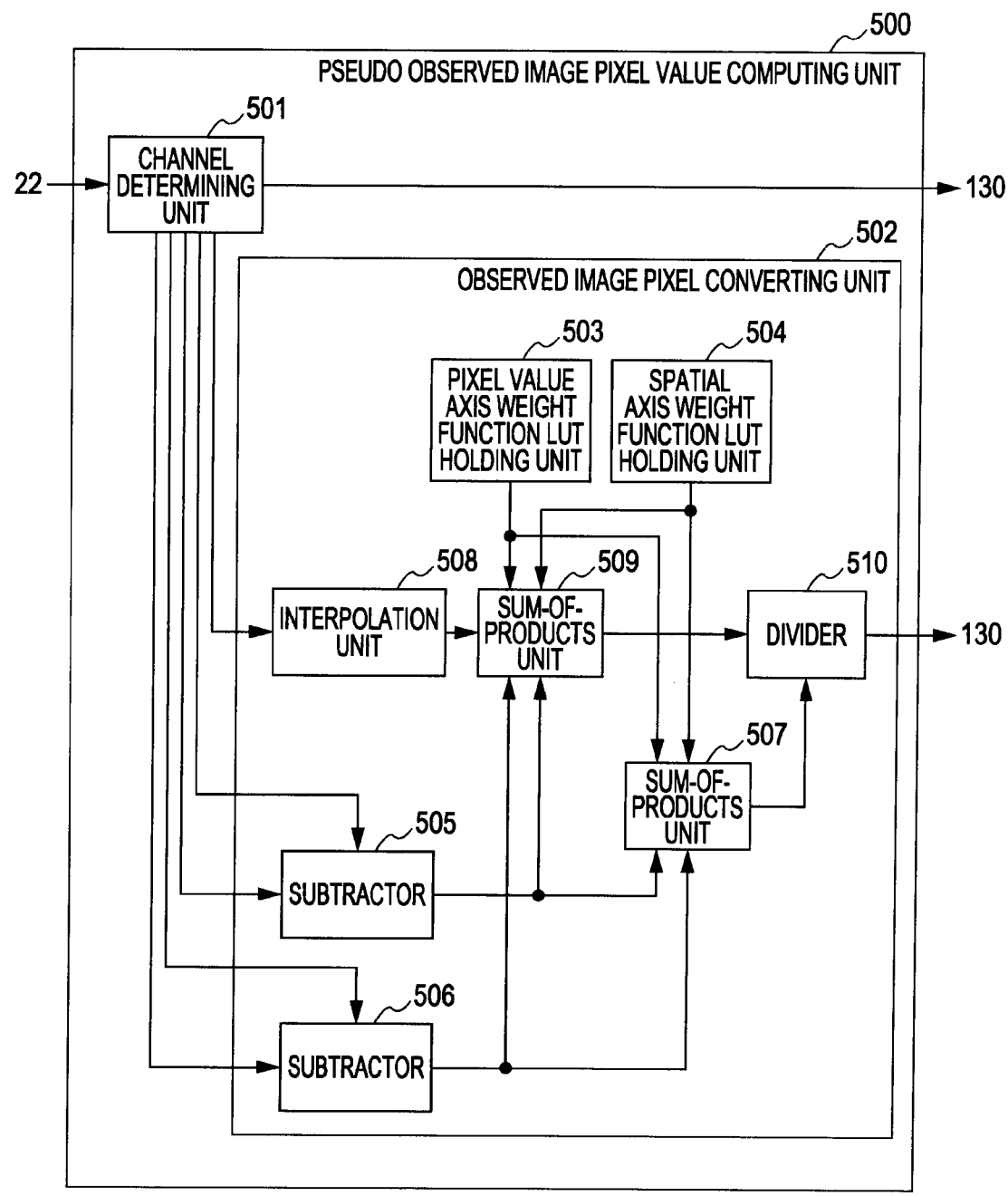
FIG. 28 is a block diagram illustrating a functional configuration example of a pseudo observed image pixel value computing unit according to an embodiment of the present invention.

FIG. 28 is a block diagram illustrating a functional configuration example of a pseudo observed image pixel value computing unit 500 according to an embodiment of the present invention. The pseudo observed image pixel value computing unit 500 includes the restoration processing unit 100 shown in FIG. 5 instead of the pseudo observed image pixel value computing unit 120, and is a modification of the pseudo observed image pixel value computing unit 120. Note that there is no change in other configurations of the restoration processing unit 100, and accordingly, only the pseudo observed image pixel value computing unit 500 will be described here, and description regarding the other configurations of the restoration processing unit 100 will be omitted. Also, the pseudo observed image pixel value computing unit 500 is an example of the pseudo target image pixel value computing unit that realizes a feature of the present invention.

The pseudo observed image pixel value computing unit 500 includes a channel determining unit 501, and an observed image pixel converting unit 502. Note that the channel determining unit 501 is generally the same as the channel determining unit 121 shown in FIG. 10, and accordingly, description will be made with a point different from the channel determining unit 121 as the center, and description regarding common points will be omitted.

The channel determining unit 501 determines whether or not the channel of the pixel of interest and the target channel are the same. In a case where determination is made that the channel of the pixel of interest and the target channel are the same, the pixel value of the pixel of interest thereof is output to the updating signal computing unit 130 as a pseudo observed image pixel value. On the other hand, in the case of determining that the channel of the pixel of interest and the target channel are not the same, the channel determining unit 501 outputs, of the pixel of interest and each pixel adjacent thereto, the pixel values of the target channel to an interpolation unit 508. Also, the channel determining unit 501 outputs the position of the pixel of interest and the positions of the pixels of the reference channel adjacent thereto to a subtractor 505, and further, outputs the pixel value of the pixel of interest, and the pixel values of the pixels of the reference channel adjacent thereto to a subtractor 506.

The observed image pixel converting unit 502 includes a pixel value axis weight function LUT holding unit 503, a spatial axis weight function LUT holding unit 504, subtractors 505 and 506, sum-of-products units 507 and 509, an interpolation unit 508, and a divider 510.

The pixel value axis weight function LUT holding unit 503 holds the pixel value axis weight function LUT used for a sum-of-products process by the sum-of-products units 507 and 509, and supplies the held pixel value axis weight function LUT to the sum-of-products units 507 and 509. For example, the pixel value axis weight function LUT shown in FIG. 27A is held.

The spatial axis weight function LUT holding unit 504 holds the spatial axis weight function LUT used for a sum-of-products process by the sum-of-products units 507 and 509, and supplies the held spatial axis weight function LUT to the sum-of-products units 507 and 509. For example, the spatial axis weight function LUT shown in FIG. 27B is held.

The subtractor 505 executes a subtraction process between the position of the pixel of interest, and the position of a pixel of the reference channel adjacent thereto to calculate the distance between the position of the pixel of interest, and the position of the pixel of the reference channel adjacent thereto, and outputs the distance to the sum-of-products units 507 and 509.

The subtractor 506 executes a subtraction process between the pixel value of the pixel of interest, and the pixel value of a pixel of the reference channel adjacent thereto to calculate the difference value between the pixel value of the pixel of interest, and the pixel value of the pixel of the reference channel adjacent thereto, and outputs the difference value to the sum-of-products units 507 and 509.

The sum-of-products unit 507 executes a sum-of-products process regarding the difference value output from the subtractor 506, and the distance output from the subtractor 505, and outputs a sum-of-products value that is the sum-of-products result to the divider 510. Specifically, regarding each pixel of the reference channel adjacent to the pixel of interest, the sum-of-products unit 507 uses the pixel value axis weight function LUT held at the pixel value axis weight function LUT holding unit 503 to obtain the weight $\phi$ corresponding to the difference value output from the subtractor 506. Also, the sum-of-products unit 507 uses the spatial axis weight function LUT held at the spatial axis weight function LUT holding unit 504 to obtain the weight $\omega$ corresponding to the distance output from the subtractor 505, and subsequently, calculates sum of products between the weight $\phi$ and weight $\omega$ corresponding to each pixel of the reference channel adjacent to the pixel of interest. Note that the sum-of-products unit 507 is an example of the second sum-of-products unit that realizes a feature of the present invention.

The interpolation unit 508 subjects the pixel values of two pixels of the target channel to an interpolation process at the position of each pixel of the reference channel adjacent to the pixel of interest, and outputs the interpolation value that is the interpolation process result to the integrator 509. This interpolation process is a process wherein the pixel values of two pixels of the target channel adjacent to each pixel of the reference channel adjacent to the pixel of interest are added to calculate a mean value.

The sum-of-products unit 509 executes a sum-of-products process regarding the difference value output from the subtractor 506, the distance output from the subtractor 505, and the interpolation value output from the interpolation unit 508, and outputs a sum-of-products value that is the sum-of-products result to the divider 510. Specifically, in the same way as the sum-of-products unit 507, the sum-of-products unit 509 obtains the weight $\phi$ and weight $\omega$ corresponding to each pixel of the reference channel adjacent to the pixel of interest. Subsequently, the sum-of-products unit 509 calculates sum of products between the weight $\phi$ and weight $\omega$ corresponding to each pixel of the reference channel adjacent to the pixel of interest, and the interpolation value output from the interpolation unit 508. Note that the sum-of-products unit 509 is an example of the first sum-of-products unit that realizes a feature of the present invention.

The divider 510 divides the sum of products output from the sum-of-products unit 509 by the sum of products output from the sum-of-products unit 507, and outputs the division value that is the division result to the updating signal computing unit 130 as a pseudo observed image pixel value. Note that the divider 510 is an example of the pseudo target image pixel value computing unit that realizes a feature of the present invention.

As described above, the observed image pixel converting unit 502 employs the cross bilateral filter shown in Expression 11 to estimate the pixel value $I_{pseudo}(p_c)$ of the target channel of the pixel of interest from a pixel value $I'(p)$ of the reference channel adjacent to the pixel of interest. Note that, in Expression 11, let us say that the calculation range adjacent to the pixel of interest is a calculation range $\Omega$, the position of each pixel of the reference channel included in the calculation range $\Omega$ is a position p, and the position of the pixel of interest is a position $p_c$. Also, let us say that a weight function with the difference of the pixel values of the pixel of interest, and each pixel of the reference channel included in the calculation range $\Omega$ as an argument is $\phi$, and a weight function with the distance of the position p of each pixel of the reference channel included in the calculation range $\Omega$ and the pixel-of-interest position $p_c$ as an argument is $\omega$.

$$I_{pseudo}(p_c) = \frac{\sum_{p \in \Omega} \omega(p - p_c)\varphi(I'(p) - I'(p_c))I(p)}{\sum_{p \in \Omega} \omega(p - p_c)\varphi(I'(p) - I'(p_c))} \quad \text{Expression 11}$$

Figure 29:
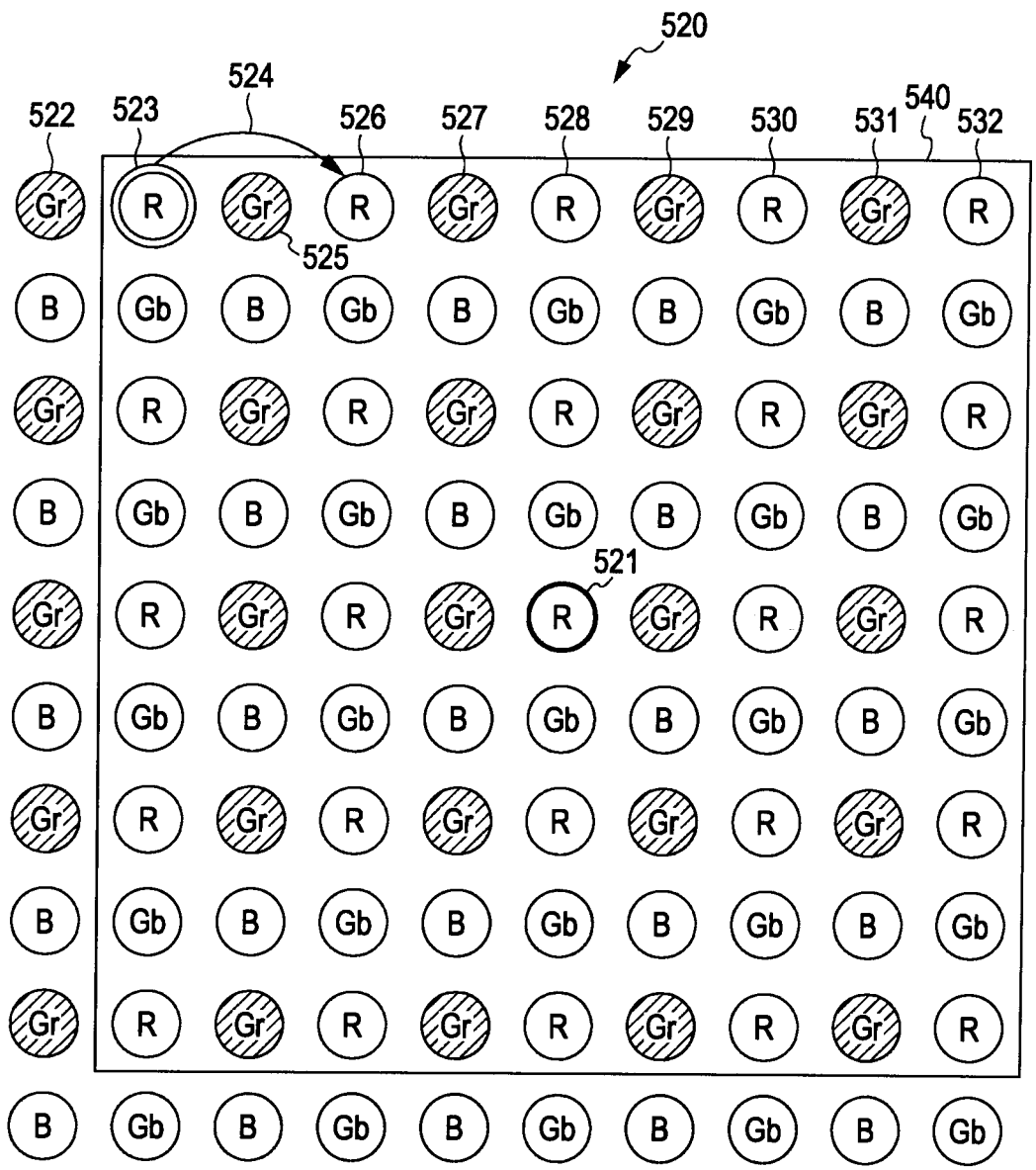
FIG. 29 is a diagram schematically illustrating an observed image to be input to the pseudo observed image pixel value computing unit according to an embodiment of the present invention.
Figure 30:
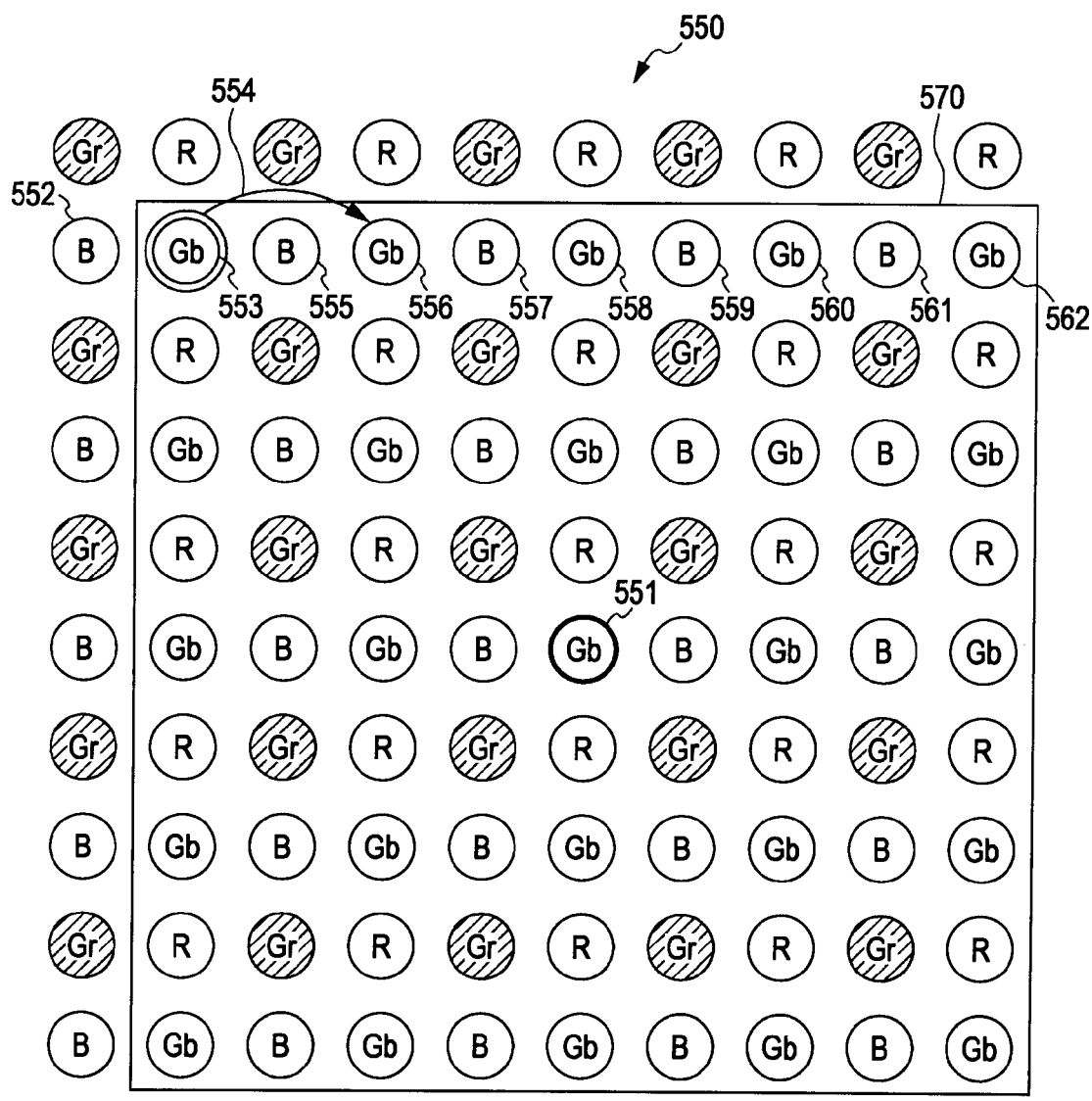
FIG. 30 is a diagram schematically illustrating an observed image to be input to the pseudo observed image pixel value computing unit according to an embodiment of the present invention.

FIGS. 29 and 30 are diagrams schematically illustrating an observed image to be input to the pseudo observed image pixel value computing unit 500 according to an embodiment of the present invention. Note that the pixel arrays shown in FIGS. 29 and 30 are the same as those of the observed images shown in FIGS. 11 and 12. In the same way as with the observed images shown in FIGS. 11 and 12, a pixel of interest is indicated with a heavy circle, and the pixels of the target channel are indicated with a hatched circle. FIG. 29 illustrates an observed image 520 made up of a pixel of interest 521 (indicated with a heavy circle), and each pixel adjacent to the pixel of interest 521. Also, FIG. 29 exemplifies a case where the channel R is taken as the channel (reference channel) of the pixel of interest 521, and the channel Gr is taken as the target channel.

With the example shown in FIG. 29, the channel R of the pixel of interest 521 and the target channel Gr are not the same. Therefore, of each pixel adjacent to the pixel of interest 521, the pixel values of the target channel Gr are output to the interpolation unit 508. Also, the position of the pixel of interest 521, and the positions of the pixels of the reference channel R adjacent thereto are output to the subtractor 505. Further, the pixel value of the pixel of interest 521, and the pixel values of the pixels of the reference channel R adjacent thereto are output to the subtractor 506.

Subsequently, the subtractor 506 calculates the difference value between the pixel value of the pixel of interest 521, and the pixel value of a pixel 523 that is one of the pixels of the reference channel R included in a calculation range 540 (range indicated with a solid-line rectangle). Subsequently, the sum-of-products units 507 and 509 employ the pixel value axis weight function LUT held at the pixel value axis weight function LUT holding unit 503 to obtain the weight φ corresponding to the difference value between the pixel value of the pixel of interest 521, and the pixel value of the pixel 523.

Subsequently, the subtractor 505 calculates the distance between the position of the pixel of interest 521, and the position of the pixel 523 that is one of the pixels of the reference channel R included in the calculation range 540. Subsequently, the sum-of-products units 507 and 509 employ the spatial axis weight function LUT held at the spatial axis weight function LUT holding unit 504 to obtain the weight ω corresponding to the distance between the position of the pixel of interest 521, and the position of the pixel 523.

Subsequently, the interpolation unit 508 subjects the pixel values of two pixels 522 and 525 of the target channel Gr to an interpolation process at the position of the pixel 523 serving as a calculation target. This interpolation process is a process wherein the pixel values of the two pixels 522 and 525 of the target channel Gr adjacent to the pixel 523 serving as a calculation target are added to calculate a mean value.

Subsequently, the sum-of-products unit 509 calculates sum of products between the weight φ corresponding to the difference value between the pixel of interest 521 and the pixel 523, the weight ω corresponding to the distance between the pixel of interest 521 and the pixel 523, and the interpolation value obtained by the interpolation process. Subsequently, the sum-of-products unit 507 calculates sum of products between the weight φ corresponding to the difference value between the pixel of interest 521 and the pixel 523, and the weight ω corresponding to the distance between the pixel of interest 521 and the pixel 523. As described above, the sum of products processes of the sum-of-products units 507 and 509 are executed in order regarding each pixel of the reference channel R included in the calculation range 540. Examples of this order include, such as an arrow 524 shown in FIG. 29, the order of the pixels 523, 526, 528, 530, 532, and so on (raster order).

Subsequently, the divider 510 divides the sum of products value output from the sum-of-products unit 509 by the sum of products output from the sum-of-products unit 507. The division value that is the division result is output to the updating signal computing unit 130 as a pseudo observed image pixel value at the position of the pixel of interest 521.

FIG. 30 illustrates an observed image 550 made up of a pixel of interest 551 (indicated with a heavy circle), and each pixel adjacent to the pixel of interest 551. Also, FIG. 30 exemplifies a case where the channel Gb is taken as the channel (reference channel) of the pixel of interest 551, and the channel Gr is taken as the target channel. Note that this example is a modification of FIG. 29, and the reference channel differs from that in FIG. 29. Therefore, description regarding portions common to FIG. 29 will be omitted, and description will be made below with a portion different from FIG. 29 as the center.

With the example shown in FIG. 30, the channel Gb of the pixel of interest 551 and the target channel Gr are not the same. Therefore, of each pixel adjacent to the pixel of interest 551, the pixel values of the target channel Gr are output to the interpolation unit 508. Also, the position of the pixel of interest 551, and the positions of the pixels of the reference channel Gb adjacent thereto are output to the subtractor 505. Further, the pixel value of the pixel of interest 551, and the pixel values of the pixels of the reference channel Gb adjacent thereto are output to the subtractor 506.

Subsequently, in the same way as in FIG. 29, the sum of products processes of the sum-of-products units 507 and 509 are executed in order regarding each pixel of the reference channel Gb included in a calculation range 570. Examples of this order include, such as an arrow 554 shown in FIG. 30, the order of the pixels 553, 556, 558, 560, 562, and so on (raster order). Subsequently, the divider 510 divides the sum of products value output from the sum-of-products unit 509 by the sum of products value output from the sum-of-products unit 507. The division value that is the division result is output to the updating signal computing unit 130 as a pseudo observed image pixel value at the position of the pixel of interest 551.

Figure 31:
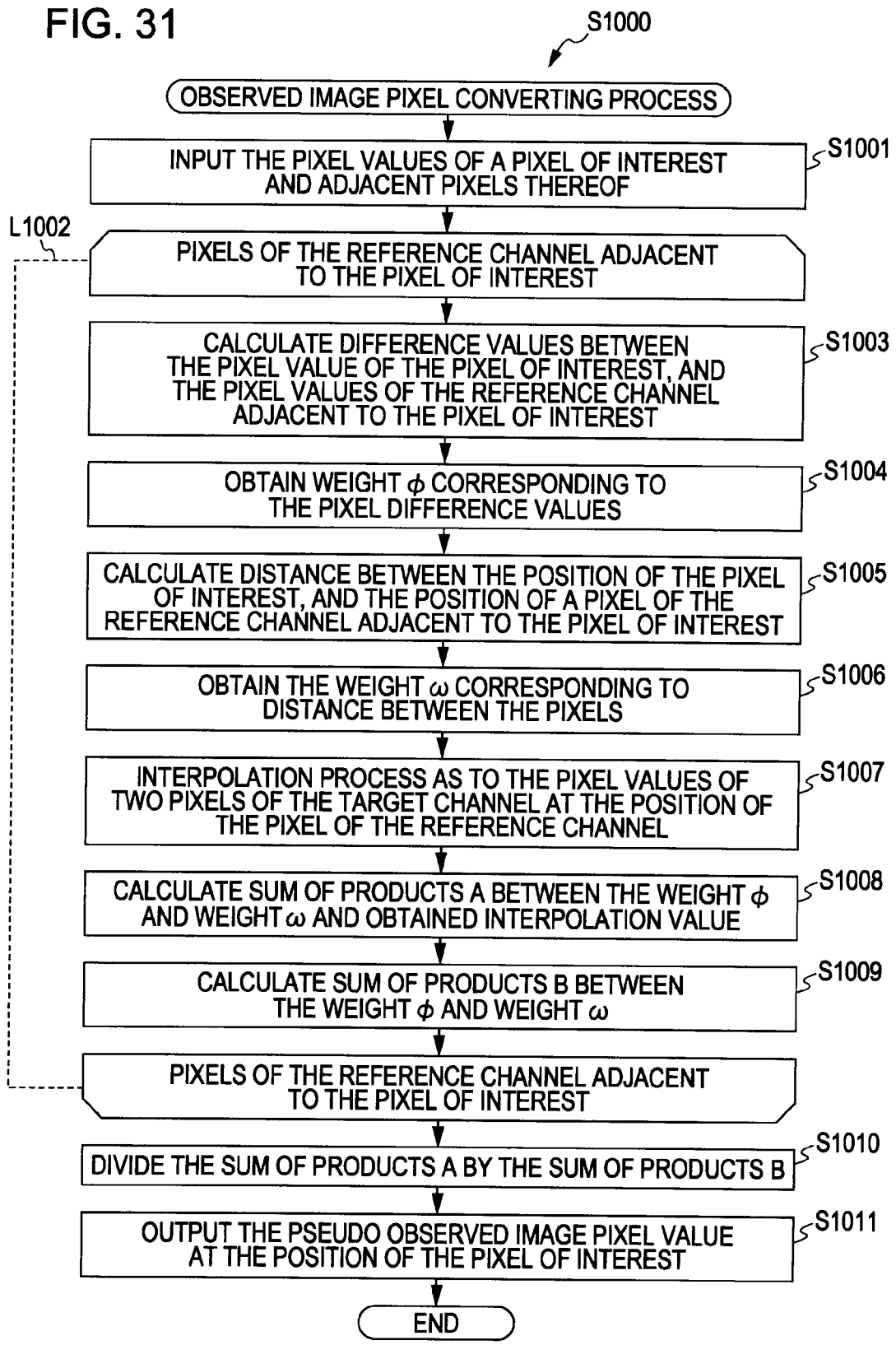
FIG. 31 is a flowchart illustrating the procedure of observed image pixel converting process by an observed image pixel converting unit according to an embodiment of the present invention.

FIG. 31 is a flowchart illustrating the procedure of the observed image pixel converting process by the observed image pixel converting unit 502 according to an embodiment of the present invention. This observed image pixel converting process is a process to be executed instead of step S950 shown in FIG. 18, and description of the other processes shown in FIG. 18 will be omitted.

First, the observed image pixel converting unit 502 inputs the pixel values of the pixel of interest, and each pixel adjacent thereto of the observed image output from the channel determining unit 501 (step S1001).

Next, in loop L1002, processes in step S1003 through S1009 are executed regarding each pixel of the reference channel adjacent to the pixel of interest.

First, the subtractor 506 calculates the difference value between the pixel value of the pixel of interest, and a pixel value of the reference channel adjacent to the pixel of interest (step S1003). Next, the sum-of-products units 507 and 509 employ the pixel value axis weight function LUT held at the pixel value axis weight function LUT holding unit 503 to obtain the weight φ corresponding to the pixel difference value between the pixel of interest, and a pixel of the reference channel adjacent thereto (step S1004).

Next, the subtractor 505 calculates the distance between the position of the pixel of interest, and the position of a pixel of the reference channel adjacent to the pixel of interest (step S1005). Subsequently, the sum-of-products units 507 and 509 employ the spatial axis weight function LUT held at the spatial axis weight function LUT holding unit 504 to obtain the weight ω corresponding to the distance between the pixel of interest, and a pixel of the reference channel adjacent thereto (step S1006). Subsequently, the interpolation unit 508 subjects the pixel values of two pixels of the target channel to an interpolation process at the position of the pixel of the reference channel serving as a calculation target (step S1007).

Next, the sum-of-products unit 509 calculates sum of products between the weight $\phi$ corresponding to the pixel difference value, the weight $\omega$ corresponding to the distance between pixels, and the interpolation value obtained by the interpolation process (step S1008). Subsequently, the sum-of-products unit 507 calculates sum of products between the weight $\phi$ corresponding to the pixel difference value, and the weight $\omega$ corresponding to the distance between pixels (step S1009).

Loop L1002 is repeated until the sum-of-products processes of the sum-of-products units 507 and 509 are ended regarding each pixel of the reference channel adjacent to the pixel of interest. In a case where the sum-of-products processes of the sum-of-products units 507 and 509 have been ended regarding each pixel of the reference channel adjacent to the pixel of interest, the Loop L1002 is ended, and the process proceeds to step S1010.

Subsequently, the divider 510 divides the sum of product value output from the sum-of-product unit 509 by the sum of product value output from the sum-of-products unit 507 (step S1010), and subsequently, outputs the obtained division value at the pixel-of-interest position to the updating signal computing unit 130 as a pseudo observed image pixel value (step S1011).

With the example shown in FIG. 8, description has been made regarding the example wherein sum of products of a blurring matrix that is the reproduction of optical deterioration, and resampling that is the reproduction of deterioration due to the imaging device 13 are carried out in a cascade manner. Description will be made below regarding a case where sum of products is carried out regarding the blurring matrix corresponding to the position to be resampled, thereby carrying out sum of products and resampling simultaneously.

Figure 32:
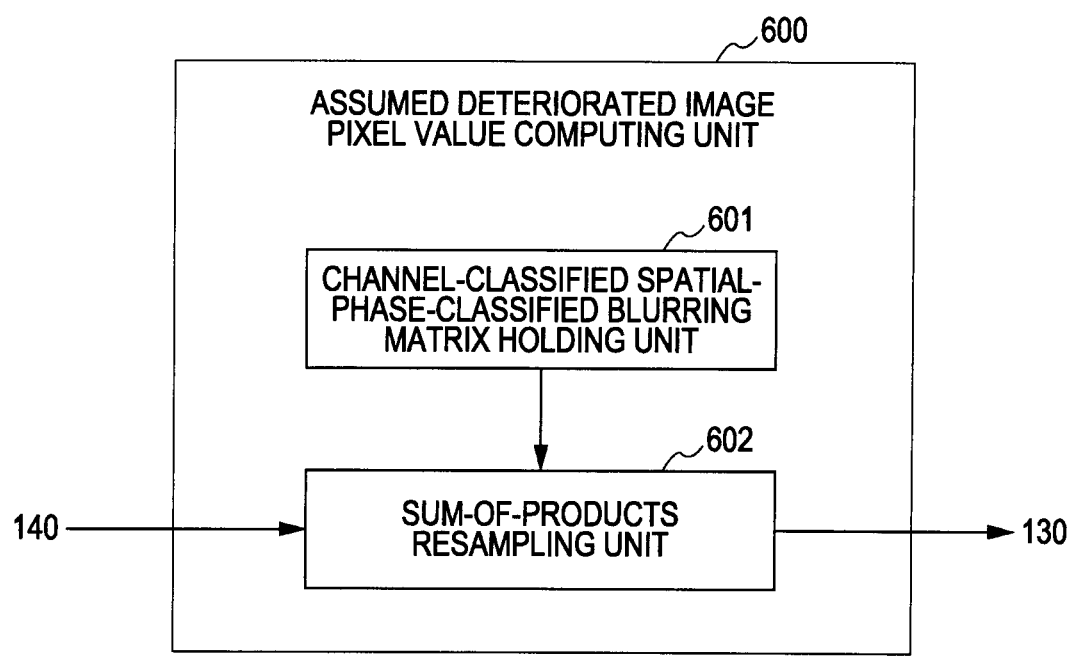
FIG. 32 is a block diagram illustrating a functional configuration example of an assumed deteriorated image pixel value computing unit according to an embodiment of the present invention.

FIG. 32 is a block diagram illustrating a functional configuration example of the assumed deteriorated image pixel value computing unit 600 according to an embodiment of the present invention. The assumed deteriorated image pixel value computing unit 600 includes a channel-classified spatial-phase-classified blurring matrix holding unit 601, and a sum-of-products and resampling unit 602. Note that the assumed deteriorated image pixel value computing unit 600 is a modification of the assumed deteriorated image pixel value computing unit 110 shown in FIG. 8.

The channel-classified spatial-phase-classified blurring matrix holding unit 601 holds the spatial-phase-classified blurring matrix corresponding to the phase of the resampling position that is a pixel-of-interest position of an observed image, and supplies the held spatial-phase-classified blurring matrix to the sum-of-products and resampling unit 602.

Of a pixel of interest in a restored image, and pixels adjacent thereto, the sum-of-products and resampling unit 602 carries out sum of products regarding the pixel values of the same channel, and the spatial-phase-classified blurring matrix held at the channel-classified spatial-phase-classified blurring matrix holding unit 601 corresponding to the phase of the resampling position. According to this sum of products, the assumed deteriorated image pixel value resampled at the pixel-of-interest position thereof is calculated, and the resampled assumed deteriorated image pixel value is output to the updating signal computing unit 130.

Figure 33:
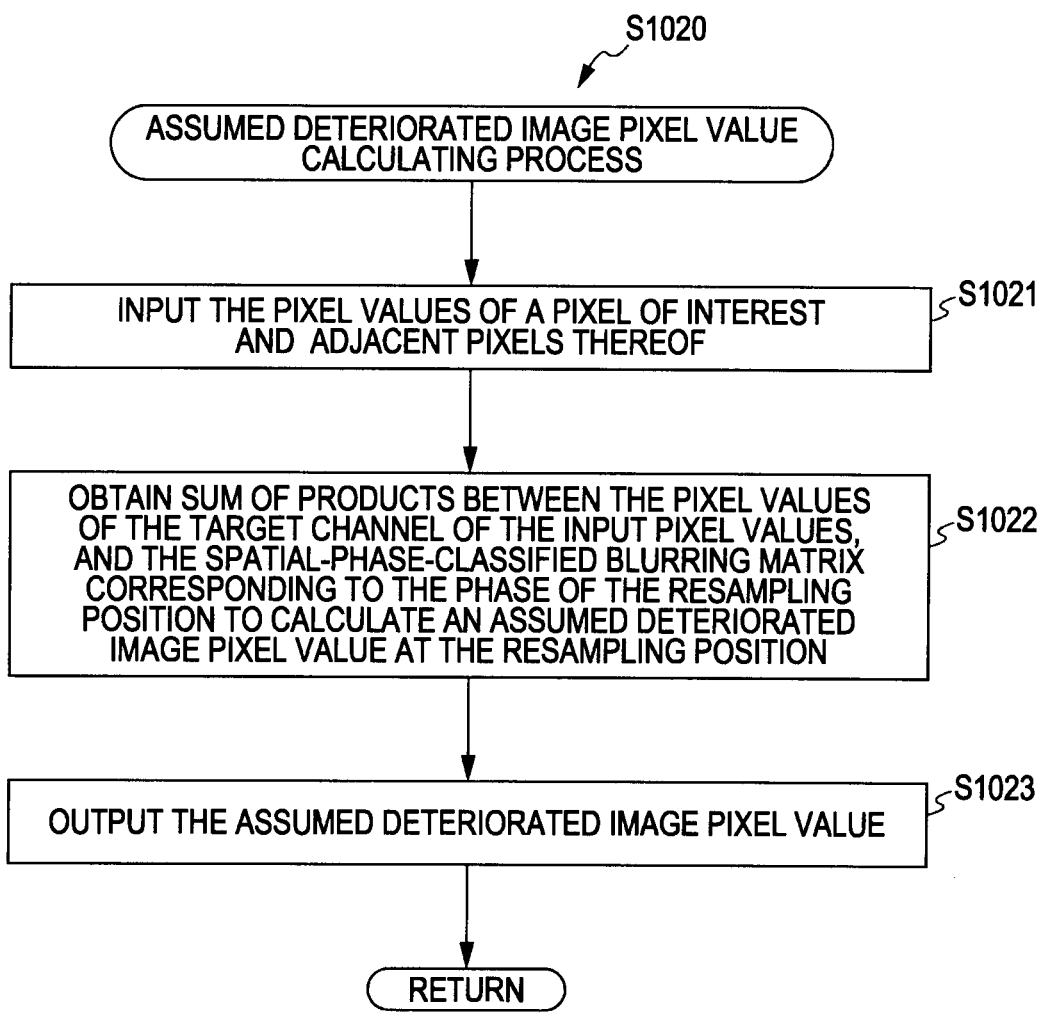
FIG. 33 is a flowchart illustrating the procedure of an assumed image pixel value calculating process by the assumed deteriorated image pixel value computing unit according to an embodiment of the present invention.

FIG. 33 is a flowchart illustrating the procedure of the assumed image pixel value calculating process by the assumed deteriorated image pixel value computing unit 600 according to an embodiment of the present invention. This assumed deteriorated image pixel value calculating process is a process to be executed instead of step S930 shown in FIG. 16, and description of the other processes shown in FIG. 16 will be omitted.

First, the sum-of-products and resampling unit 602 inputs the pixel values of the pixel of interest, and each pixel adjacent thereto of the restored image output from the restored image creating unit 140 (step S1021).

Next, of the pixel of interest in the restored image, and pixels adjacent thereto, the sum-of-products and resampling unit 602 carries out sum of products regarding the pixel values of the same channel as the target channel, and the spatial-phase-classified blurring matrix corresponding to the phase of the resampled position (step S1022), and subsequently, outputs the resampled assumed deteriorated image pixel value to the updating signal computing unit 130 (step S1023).

Next, a modification of the updating signal computing unit 130 shown in FIG. 13 will be described in detail with reference to the drawing.

Figure 34:
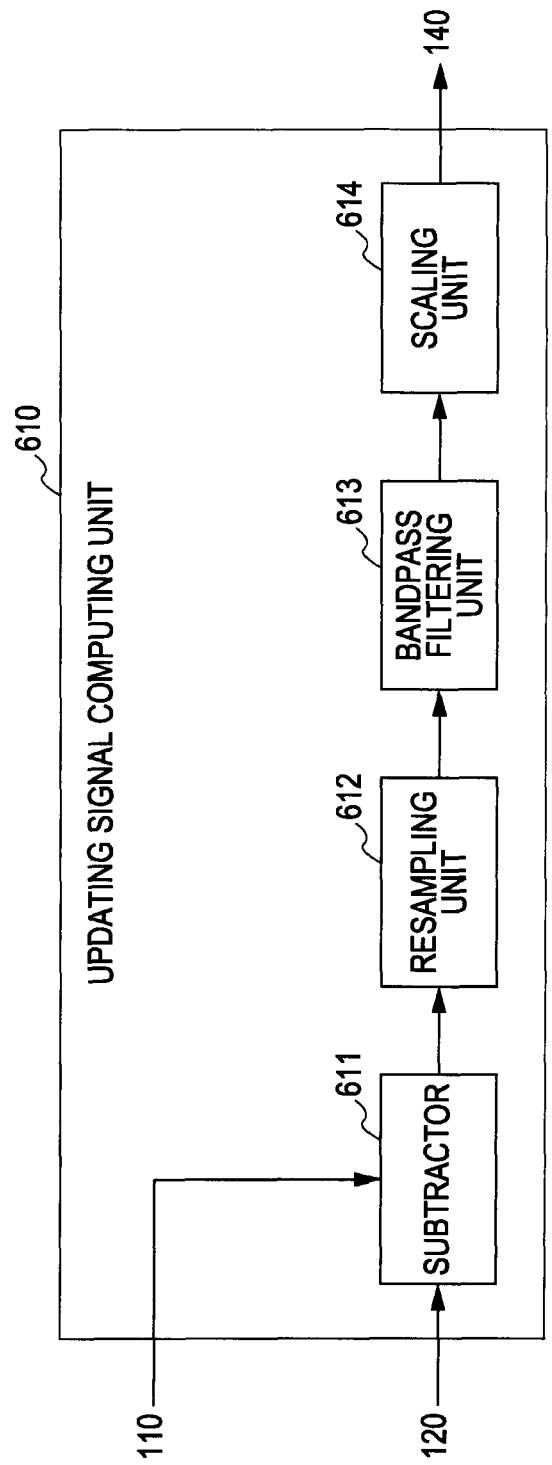
FIG. 34 is a block diagram illustrating a functional configuration example of an updating signal computing unit according to an embodiment of the present invention.

FIG. 34 is a block diagram illustrating a functional configuration example of the updating signal computing unit 610 according to an embodiment of the present invention. The updating signal computing unit 610 includes a subtractor 611, a resampling unit 612, and a band-pass filtering unit 613, and a scaling unit 614. Note that the subtractor 611 and resampling unit 612 are the same as the subtractor 131 and the resampling unit 132 shown in FIG. 13, and accordingly, description thereof will be omitted here.

The band-pass filtering unit 613 executes a band-pass filter process as to the resampled difference value signal to adjust the frequency property of the updating signal, and outputs the signal of which the frequency property has been adjusted to the scaling unit 614.

The scaling unit 614 executes a scaling process to integrate an arbitrary constant regarding the signal of which the frequency property has been adjusted, and outputs the signal subjected to the scaling process to the restored image creating unit 140 as an updating signal.

Here, in the case of comparing the updating signal computing unit 610 and the updating signal computing unit 130, there is a different point in that the updating signal computing unit 610 additionally executes the band-pass filter process and the scaling process regarding the difference value between the pseudo observed image pixel value and the assumed deteriorated image pixel value. For example, the frequency property of the updating signal can be adjusted by employing a band-pass filter. For example, in the event that there are features regarding the spatial frequency band of the noise of the imaging device 13, the emphasis of the noise can be suppressed by decreasing the gain of the frequency band thereof. Also, deterioration such as the overshoot or undershoot of a contoured portion can be reduced by suppressing the low-frequency components. Also, the intensity of a restored signal can be adjusted by executing the scaling process. For example, in the event that a great value is set, the restoration effects can be improved, but in the case of setting an excessively great value, some deterioration due to each process is emphasized in some cases, and accordingly, the intensity has to be adjusted with subjective image quality.

Note that the processing order of this example is the resampling process, the band-pass filter process, and the scaling process, but this order may be changed. For example, in the case of involving resolution conversion, upon the band-pass filter process being executed before the resampling process, the throughput decreases, but in the case of deterioration occurring due to the restoration process, a case is assumed wherein the spatial propagation of deterioration becomes great. Therefore, it is important to suitably set the processing order of the resampling process, the band-pass filter process, and the scaling process according to the processing content. Also, any one of the band-pass filter process and the scaling process may be applied to the updating signal computing unit 610.

Figure 35:
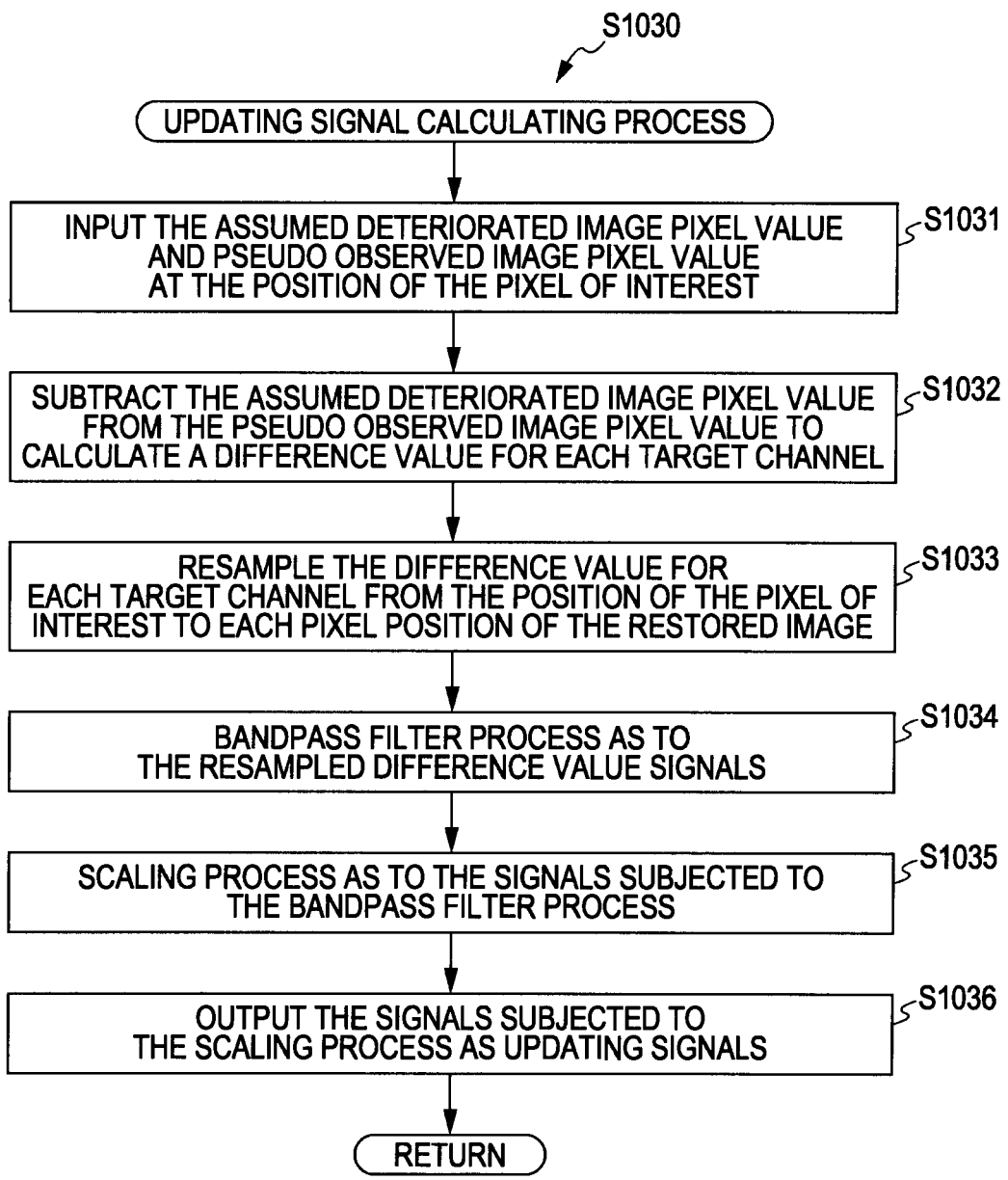
FIG. 35 is a flowchart illustrating the procedure of an updating signal calculating process by the updating signal computing unit according to an embodiment of the present invention.

FIG. 35 is a flowchart illustrating the procedure of the updating signal calculating process by the updating signal computing unit 610 according to an embodiment of the present invention. This updating signal calculating process is a process to be executed instead of step S960 shown in FIG. 16, and description regarding the other processes shown in FIG. 16 will be omitted. Also, steps S1031 through S1033 are the same as steps S961 through S963 shown in FIG. 20, and accordingly, description thereof will be omitted here.

The band-pass filtering unit 613 subjects the difference value signal resampled to each pixel position of the restored image by the resampling unit 612 to the band-pass filter process, thereby adjusting the frequency property of the updating signal (step S1034).

Subsequently, the scaling unit 614 executes the scaling process to integrate an arbitrary constant regarding the signal of which the frequency property has been adjusted (step S1035), and subsequently, outputs the signal subjected to the scaling process to the restored image creating unit 140 as an updating signal (step S1036).

Figure 36:
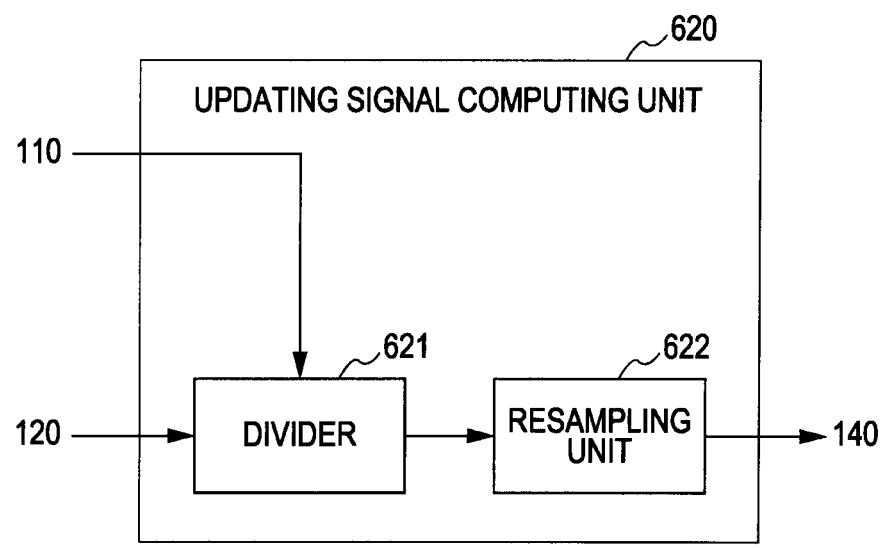
FIG. 36 is a block diagram illustrating a functional configuration example of an updating signal computing unit according to an embodiment of the present invention.

FIG. 36 is a block diagram illustrating a functional configuration example of the updating signal computing unit 620 according to an embodiment of the present invention. The updating signal computing unit 620 includes a divider 621, and a resampling unit 622. Note that the resampling unit 622 is the same as the resampling unit 132 shown in FIG. 13, and accordingly, description thereof will be omitted here. Also, the updating signal computing unit 620 is employed, for example, in combination with the restored image creating unit 640 shown in FIG. 40.

The divider 621 divides the pseudo observed image pixel value output from the pseudo observed image pixel value computing unit 120 by the assumed deteriorated image pixel value output from the assumed deteriorated image pixel value computing unit 110, and outputs the division value that is the division result to the resampling unit 622.

Figure 37:
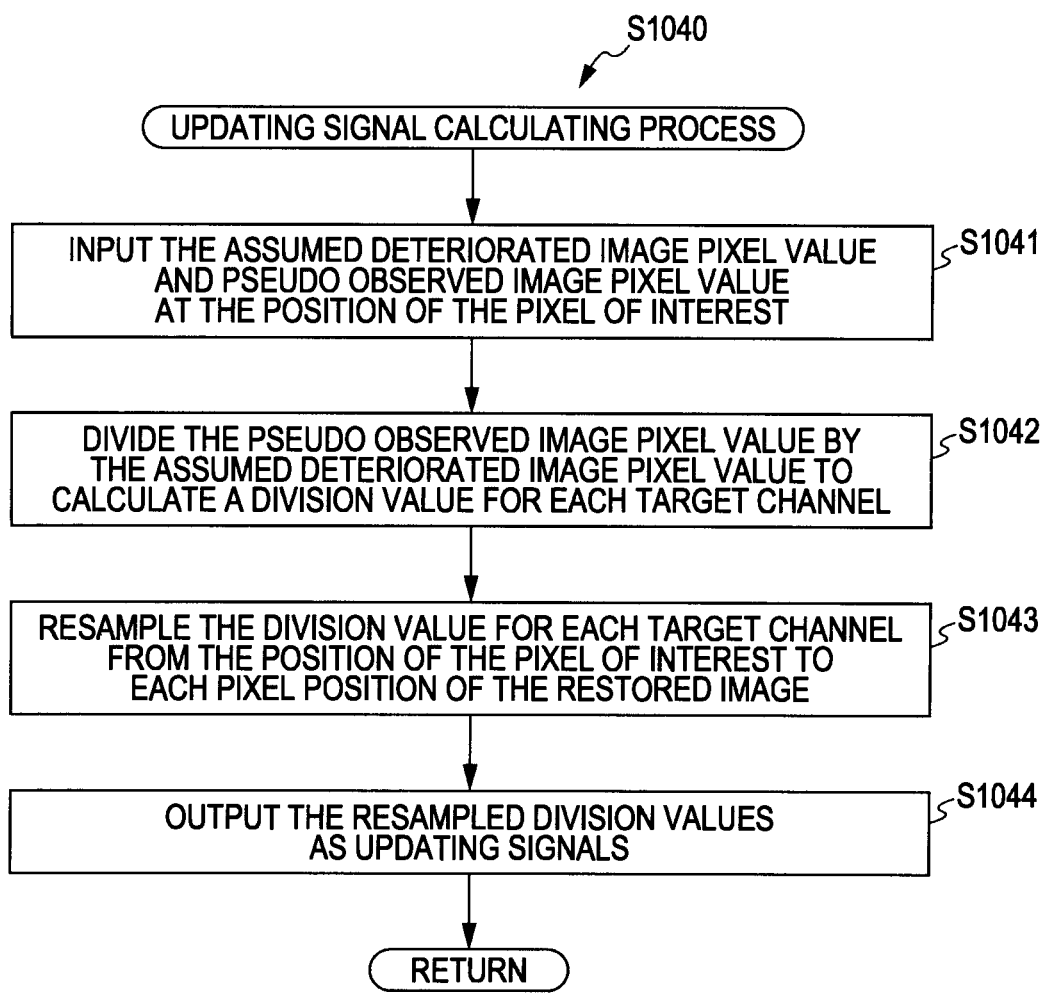
FIG. 37 is a flowchart illustrating the procedure of an updating signal calculating process by the updating signal computing unit according to an embodiment of the present invention.

FIG. 37 is a flowchart illustrating the procedure of the updating signal calculating process by the updating signal computing unit 620 according to an embodiment of the present invention. This updating signal calculating process is a process to be executed instead of step S960 shown in FIG. 16, and description regarding the other processes shown in FIG. 16 will be omitted.

First, the divider 621 inputs the assumed deteriorated image pixel value and the pseudo observed image pixel value calculated regarding the pixel-of-interest position (step S1041), and subsequently, divides the pseudo observed image pixel value by the assumed deteriorated image pixel value for each target channel to calculate a division value for each target channel (step S1042). That is to say, a division value for each target channel is calculated regarding the assumed deteriorated image pixel value and the pseudo observed image pixel value calculated at every four target channels regarding the one pixel-of-interest position.

Next, the resampling unit 132 resamples the division value obtained for each target channel from the pixel-of-interest position to each pixel position of the restored image (step S1043), and subsequently, outputs the division value resampled to each pixel position of the restored image to the restored image creating unit 140 as an updating signal (step S1044).

Figure 38:
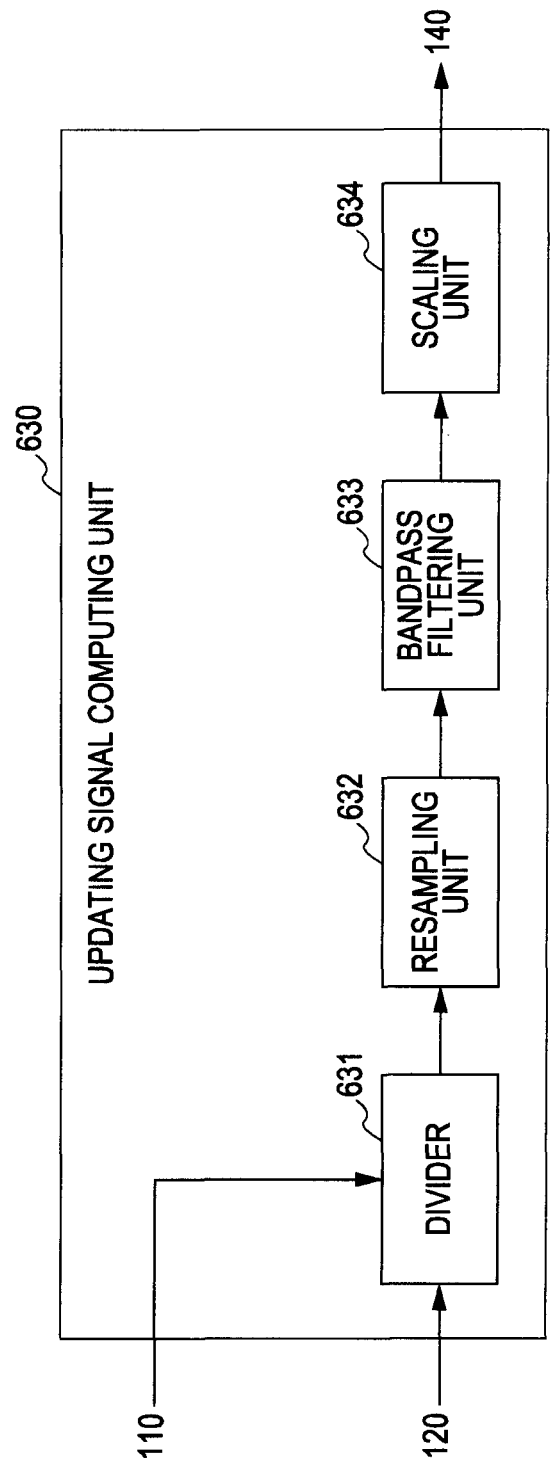
FIG. 38 is a block diagram illustrating a functional configuration example of an updating signal computing unit according to an embodiment of the present invention.

FIG. 38 is a block diagram illustrating a functional configuration example of the updating signal computing unit 630 according to an embodiment of the present invention. The updating signal computing unit 630 includes a divider 631, a resampling unit 632, a band-pass filtering unit 633, and a scaling unit 634. Note that the divider 631 is the same as the divider 621 shown in FIG. 36, and accordingly, description thereof will be omitted here. Also, the resampling unit 632, the band-pass filtering unit 633, and the scaling unit 634 are also the same as the resampling unit 612, the band-pass filtering unit 613, and the scaling unit 614, shown in FIG. 34, and accordingly, description thereof will be omitted here. The processing order of this example is the resampling process, the band-pass filter process, and the scaling process, but this order may be changed. Also, any one of the band-pass filter process and the scaling process may be applied to the updating signal computing unit 630. Note that the updating signal computing unit 630 is employed, for example, in combination with the restored image creating unit 640 shown in FIG. 40.

Figure 39:
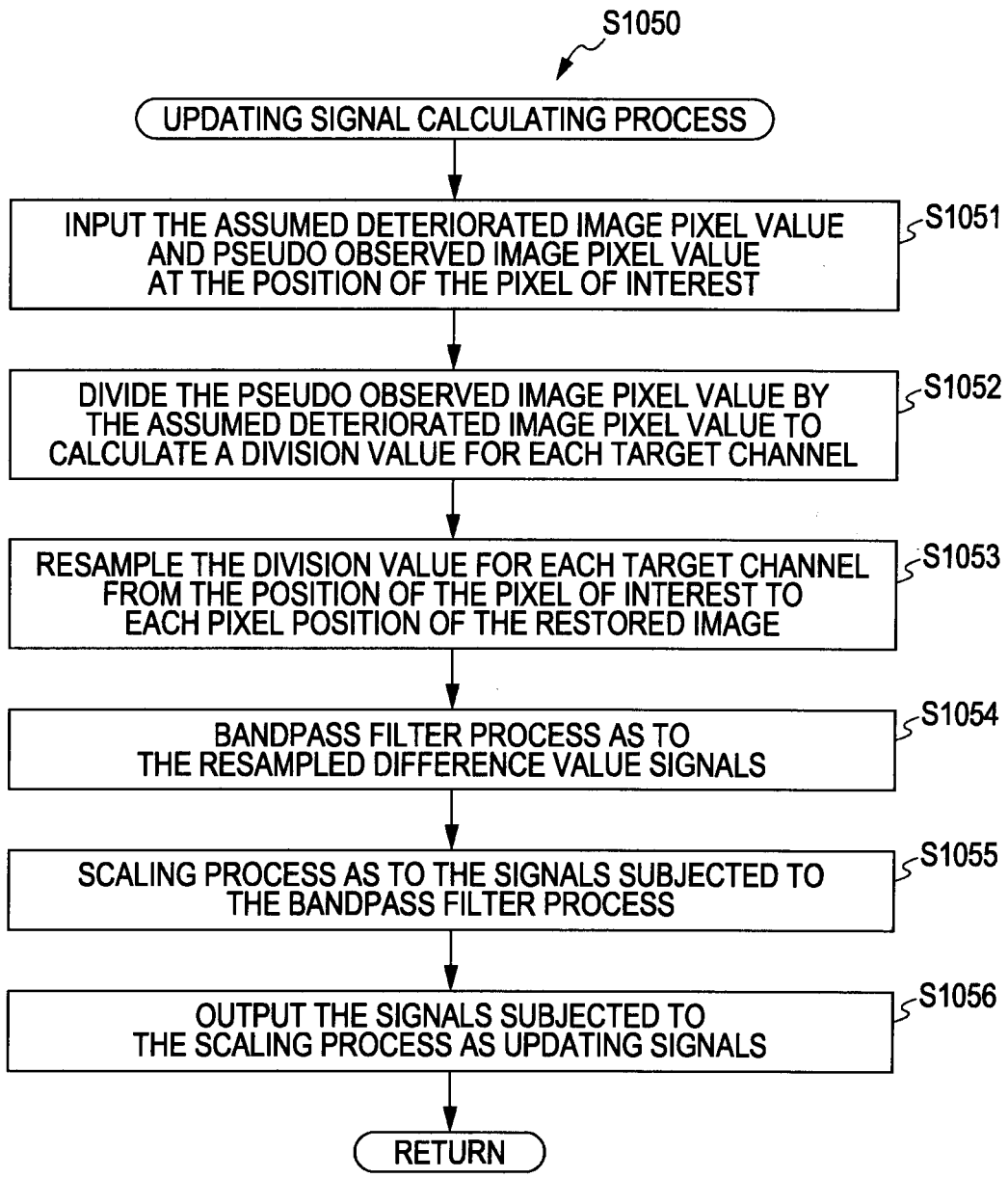
FIG. 39 is a flowchart illustrating the procedure of an updating signal calculating process by the updating signal computing unit according to an embodiment of the present invention.

FIG. 39 is a flowchart illustrating the procedure of the updating signal calculating process by the updating signal computing unit 630 according to an embodiment of the present invention. This updating signal calculating process is a process to be executed instead of step S960 shown in FIG. 16, and description regarding the other processes shown in FIG. 16 will be omitted. Also, steps S1051 through S1053 are the same as steps S1041 through S1043 shown in FIG. 37, and accordingly, description thereof will be omitted here.

The band-pass filtering unit 633 subjects the difference value signal resampled to each pixel position of the restored image by the resampling unit 632 to the band-pass filter process, thereby adjusting the frequency property of the updating signal (step S1054).

Subsequently, the scaling unit 634 executes the scaling process to integrate an arbitrary constant regarding the signal of which the frequency property has been adjusted (step S1055), and subsequently, outputs the signal subjected to the scaling process to the restored image creating unit 140 as an updating signal (step S1056).

Figure 40:
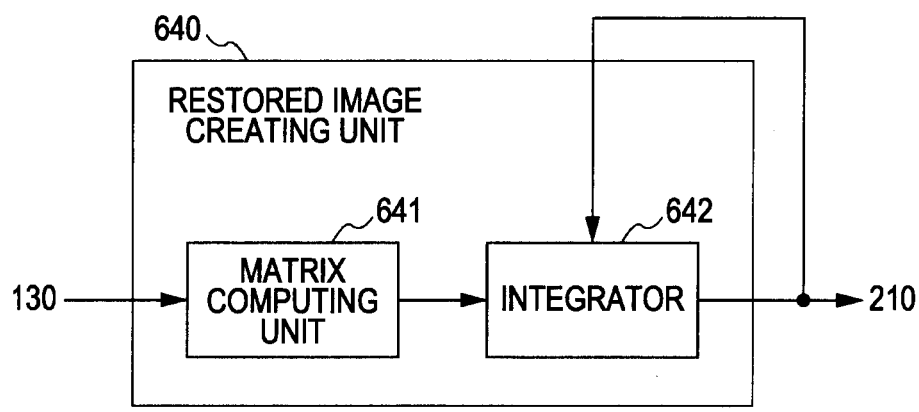
FIG. 40 is a block diagram illustrating a functional configuration example of a restored image creating unit according to an embodiment of the present invention.

Next, a modification of the restored image creating unit 140 shown in FIG. 14 will be described in detail with reference to the drawings. FIG. 40 is a block diagram illustrating a functional configuration example of the restored image creating unit 640 according to an embodiment of the present invention. The restored image creating unit 640 includes a matrix computing unit 641, and an integrator 642. Note that the restored image creating unit 640 creates a restored image with, for example, the Lucy Richardson method and a simplified type thereof shown in Expressions 4 and 6.

The matrix computing unit 641 executes computation to apply a predetermined matrix to the updating signal (the difference value between the pseudo observed image pixel value and the assumed deteriorated image pixel value) output from the resampling unit 132, and outputs the computation results to the integrator 642. Here, the predetermined matrix is, for example, the matrix shown in Expression 4 or Expression 6 (e.g., matrix h or matrix b).

The integrator 642 integrates the values of the computation results output from the matrix computing unit 641, and the pixel value (restored image signal) of each pixel position making up the restored image created most recently, and subsequently, outputs the integration value that is the integration result to the white balance processing unit 210 as a restored image signal. Also, this restored image signal is used for creation of the next restored image signal. That is to say, the restored image created most recently is updated by the restored image creating unit 640, and a new restored image is created.

Figure 41:
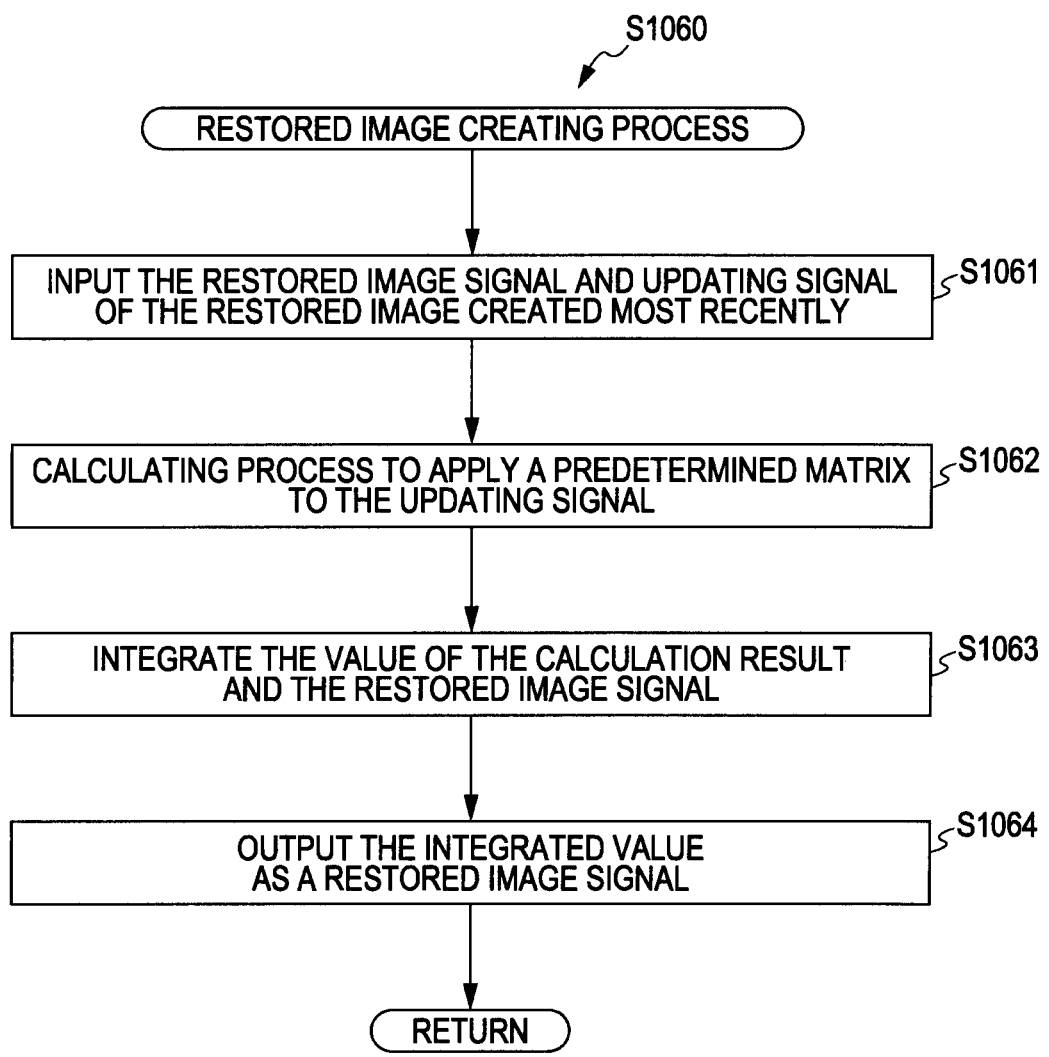
FIG. 41 is a flowchart illustrating the procedure of a restored image creating process by the restored image creating unit according to an embodiment of the present invention.

FIG. 41 is a flowchart illustrating the procedure of the restored image creating process by the restored image creating unit 640 according to an embodiment of the present invention. This restored image creating process is a process to be executed instead of step S970 shown in FIG. 16, and description regarding the other processes shown in FIG. 16 will be omitted.

First, the matrix computing unit 641 inputs the updating signal output from the resampling unit 132 (step S1061), and executes computation to apply a predetermined matrix to the updating signal (step S1062).

Next, the integrator 642 integrates the values of the computation results output from the matrix computing unit 641, and the restored image signal of the restored image created most recently (step S1063), and subsequently, outputs the integration value that is the integration result to the white balance processing unit 210 as a restored image signal (step S1064).

Description has been made so far regarding the restoration process wherein a restored image is updated by executing one-time feedback from a frame of observed image, and this updated restored image is output. Here, for example, the restoration process is executed after the alignment of a restored image one frame back is executed with an observed image as a reference, whereby the time phase of the updated restored image can be aligned with the observed image. Thus, even in a case where the imaging operation of a moving image is performed by the imaging apparatus 10, a restored image with further high precision can be created. Description will be made below in detail regarding an example wherein the time phase of a restored image is aligned to that of an observed image by executing a motion compensating process and a moving subject hiding process regarding the restored image, with reference to the drawings.

Figure 42:
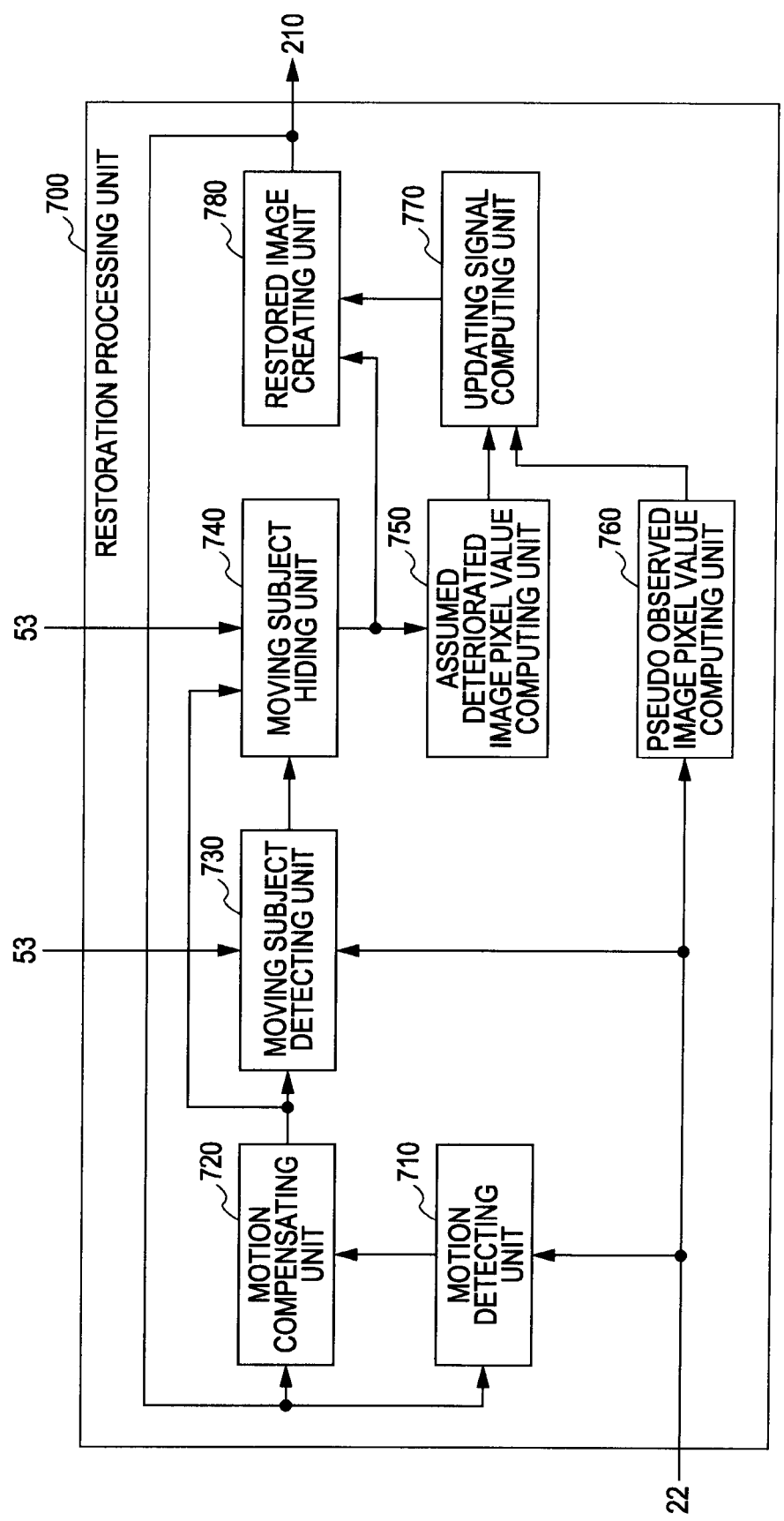
FIG. 42 is a block diagram illustrating a functional configuration example of a restoration processing unit according to an embodiment of the present invention.

FIG. 42 is a block diagram illustrating a functional configuration example of a restoration processing unit 700 according to an embodiment of the present invention. The restoration processing unit 700 includes a motion detecting unit 710, a motion compensating unit 720, a moving subject detecting unit 730, a moving subject hiding unit 740, an assumed deteriorated image pixel value computing unit 750, a pseudo observed image pixel value computing unit 760, an updating signal computing unit 770, and a restored image creating unit 780. Note that the restoration processing unit 700 is a modification of the restoration processing unit 100 shown in FIG. 5, wherein the motion detecting unit 710, the motion compensating unit 720, the moving subject detecting unit 730, and the moving subject hiding unit 740 are additionally provided to the restoration processing unit 100. Also, the assumed deteriorated image pixel value computing unit 750, the pseudo observed image pixel value computing unit 760, the updating signal computing unit 770, and the restored image creating unit 780 are generally the same as those shown in FIG. 5, and accordingly, description will be made with a different point as the center, and description of the other points will be omitted.

The motion detecting unit 710 detects motion information based on the frame (restored image) output from the restored image creating unit 780, and the frame (observed image) output from the A/D conversion circuit 22, and outputs the detected motion information to the motion compensating unit 720. This motion information is information relating to motion between two frames, and for example, one set of motion parameters (Global Motion) regarding one screen (one frame) is detected. In order to improve restoration effects, this motion information suitably includes translation components and rotation components, and further suitably includes scaling components and keystone distortion components. For example, an affine matrix may be employed as this motion information. Note that motion detection may be executed for each block of an arbitrary size on one screen of one frame. However, in the case of considering discontinuity between blocks on an image, or influence of image feedback, motion detection is suitably executed for each screen of one frame, whereby restoration precision can be improved. Note that an arrangement may be made wherein the detection of the motion information is executed on the previous stage of the restoration processing unit 700, and this detection result is supplied to the motion compensating unit 720.

Now, the detection method of an affine matrix will be described as an example of the detection method of the motion information. For example, extraction of feature points from the restored image output from the restored image creating unit 780, and the observed image output from the A/D conversion circuit 22. For example, a point where the edge slope in the vertical direction or horizontal direction is strong (e.g., corner point) can be extracted as a feature point by employing an edge detection technique. Also, another feature point extracting process can be employed wherein a feature point where a corresponding point between images can be searched is extracted.

Next, matching between a feature point extracted from the restored image and a feature point extracted from the observed image is executed. The matching between feature points is to extract a pair of feature points regarded as the same subject regarding the restored image and the observed image. As a method for matching feature points, for example, a technique may be employed wherein similar feature points are coupled based on an index such as a normalized function between rectangular images around a feature point. Alternatively, another matching method may be employed wherein a camera motion matrix can be calculated correctly.

Subsequently, an affine matrix is calculated by using the extracted matched points pair (a pair of matched feature points). As this affine matrix calculating method, for example, an affine matrix calculating method employing RANSAC (RANdom SAmple Consensus) may be employed. Specifically, an operation is repeated wherein a matched points pair is selected from the extracted matched points pairs at random, and the selected matched points pair is used to carry out least squares estimation of an affine matrix. Subsequently, the calculated affine matrix that decreases inexplicable matched points pairs as less as possible is selected as an estimation result. Also, for example, the gradient method, the block matching method, or the like may be employed as an affine matrix calculating method.

The motion compensating unit 720 executes the motion compensation of the restored image based on the motion information detected by the motion detecting unit 710. Specifically, a process is executed wherein each pixel position of the restored image is moved to a position shifted for the motion worth corresponding to the motion information detected by the motion detecting unit 710.

The moving subject detecting unit 730 compares the pixel values between the restored image subjected to the motion compensation process output from the motion compensating unit 720, and the observed image output from the A/D conversion circuit 22 to detect a moving subject included in the restored image, and outputs the detection result to the moving subject hiding unit 740. Note that the moving subject detecting unit 730 will be described in detail with reference to FIG. 43.

The moving subject hiding unit 740 hides a moving subject included in the restored image subjected to the motion compensation process output from the motion compensating unit 720 based on the moving subject detection result output from the moving subject detecting unit 730, and subsequently, outputs the restored image of which the moving subject has been hidden to the assumed deteriorated image pixel value computing unit 750 and the restored image creating unit 780. Note that the moving subject hiding unit 740 will be described in detail with reference to FIG. 46.

Figure 43:
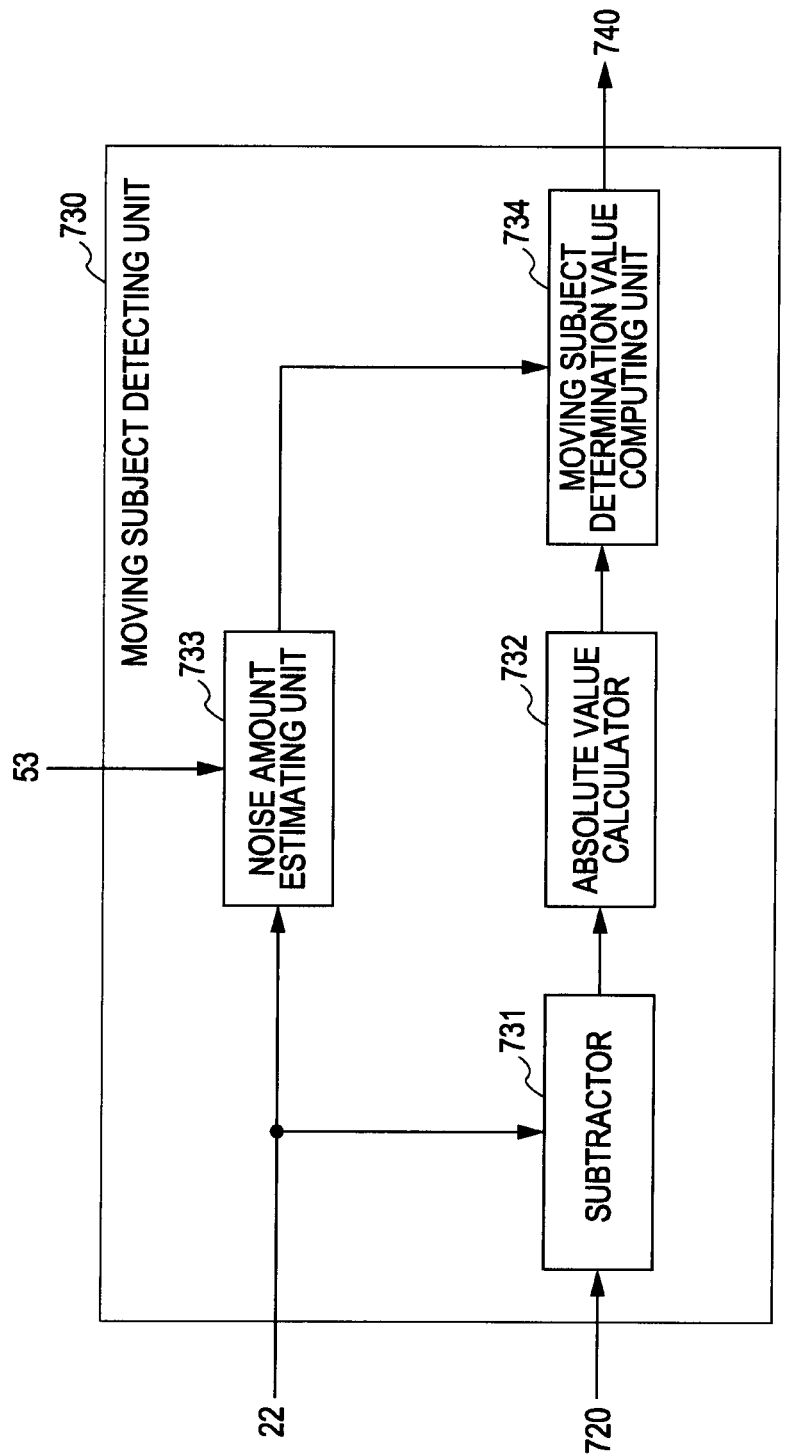
FIG. 43 is a block diagram illustrating a functional configuration example of a moving subject detecting unit according to an embodiment of the present invention.
Figure 44:
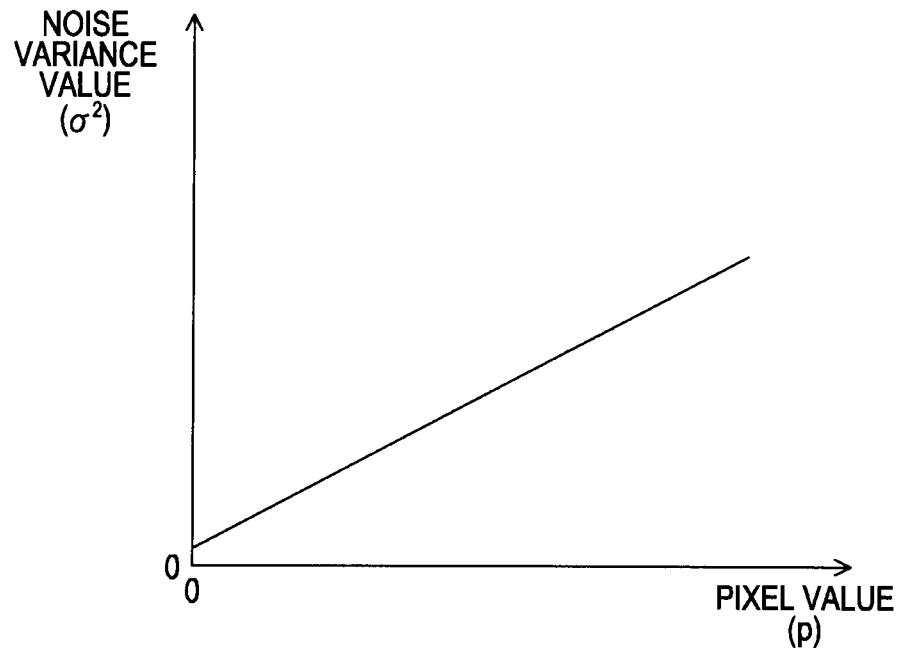
FIG. 44 is a diagram illustrating an example of a noise model of the imaging device according to an embodiment of the present invention.
Figure 45:
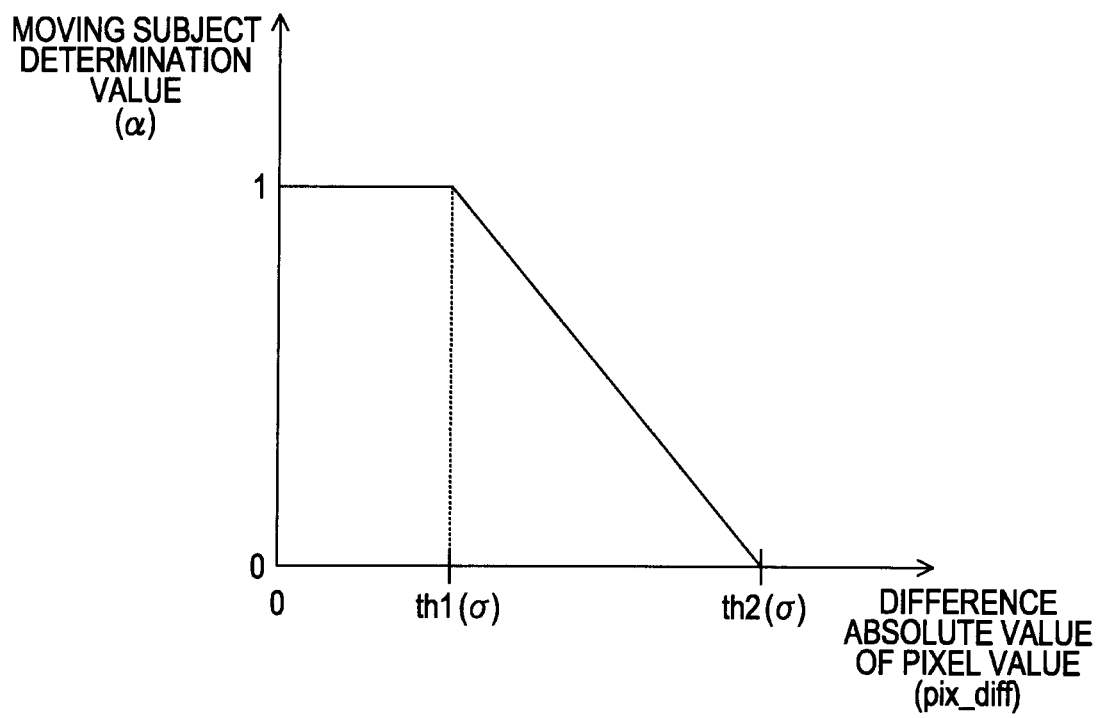
FIG. 45 is a diagram illustrating an example of a moving subject determination model according to an embodiment of the present invention.

FIG. 43 is a block diagram illustrating a functional configuration example of the moving subject detecting unit 730 according to an embodiment of the present invention. FIG. 44 is a diagram illustrating an example of a noise model of the imaging device 13 according to an embodiment of the present invention. FIG. 45 is a diagram illustrating an example of a moving subject determination model according to an embodiment of the present invention. Note that FIGS. 44 and 45 will be described with reference to FIG. 43. The moving subject detecting unit 730 includes a subtractor 731, an absolute value calculator 732, a noise amount estimating unit 733, and a moving subject determination value computing unit 734.

The subtractor 731 calculates the difference value between a pixel value of the observed image output from the A/D conversion circuit 22, and a pixel of the restored image output from the motion compensating unit 720, and outputs the difference value that is the calculation result to the absolute value calculator 732.

The absolute value calculator 732 calculates the absolute value of the difference value output from the subtractor 731, and outputs the absolute difference value (pix_diff) of the pixel values that is the calculation result to the moving subject determination value computing unit 734.

The noise amount estimating unit 733 estimates the noise amount of the pixel corresponding to the pixel value based on the digital gain information at the time of imaging (gain amount (ISO sensitivity), decibel for each frame, etc.) and a noise model, and outputs the estimated noise amount to the moving subject determination value computing unit 734. Note that the digital gain information at the time of imaging is supplied form the control unit 53. Here, as a common noise model, the relation between the pixel value p of RAW data, and the variance value $\sigma^2$ of noise can be represented with a function of which the inclination is gain, e.g., it has been familiar to represent this with the graph shown in FIG. 44. Therefore, for example, the variance value $\sigma^2$ of noise can be estimated by using the graph shown in FIG. 44.

The moving subject determination value computing unit 734 calculates a moving subject determination value α ($0 \leq \alpha \leq 1$) based on the absolute difference value (pix_diff) of the pixel values output from the absolute value calculator 732, and the standard variation σ of noise, and outputs the moving subject determination value α to the moving subject hiding unit 740. FIG. 45 illustrates an example of a conversion model between the absolute difference value (pix_diff) and the standard variation σ of noise. Note that the th1 (σ) and th2 (σ) shown in FIG. 45 are thresholds that are determined according to the noise standard variation σ.

Figure 46:
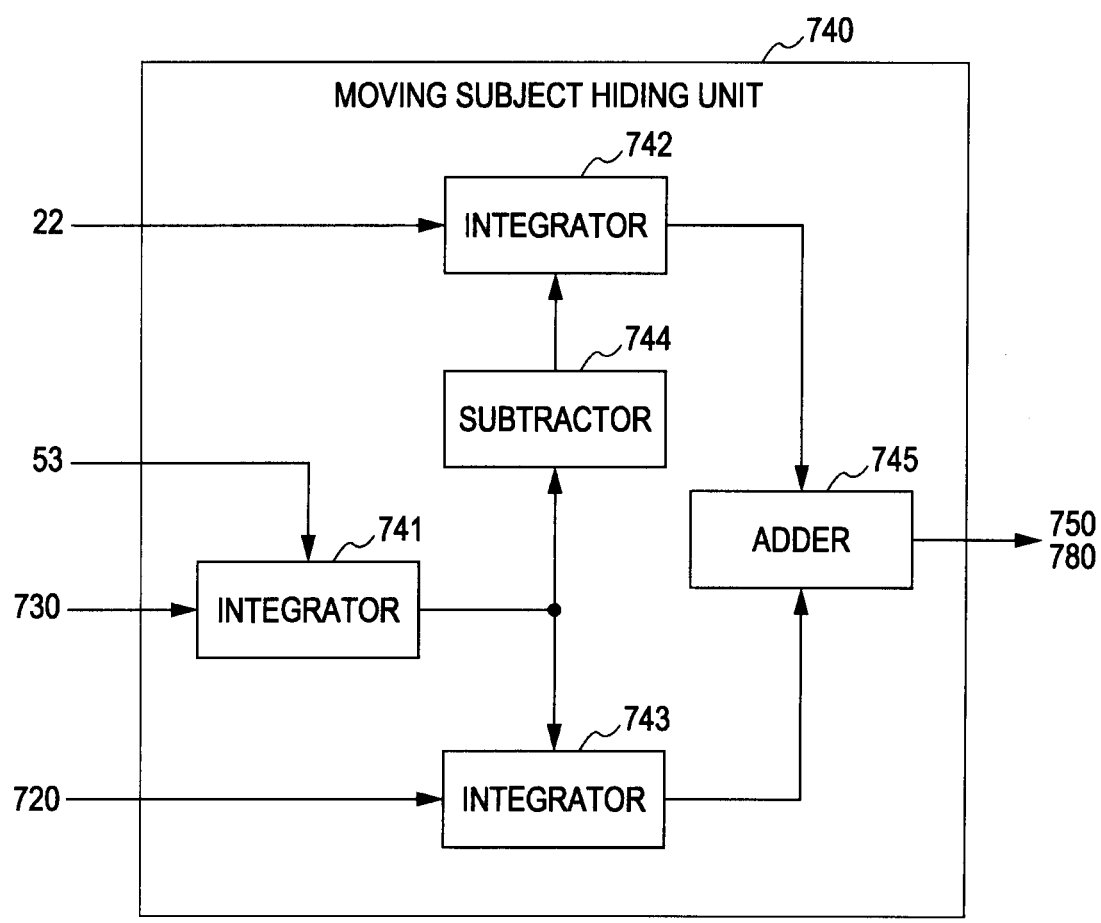
FIG. 46 is a block diagram illustrating a functional configuration example of a moving subject hiding unit according to an embodiment of the present invention.

FIG. 46 is a block diagram illustrating a functional configuration example of the moving subject hiding unit 740 according to an embodiment of the present invention. The moving subject hiding unit 740 includes integrators 741 through 743, a subtractor 744, and an adder 745, calculates an internal division pixel value between a pixel value of a reference image (observed image) and a pixel value of a determined image (restored image), and outputs this calculation result as a moving subject hiding process pixel value.

The integrator 741 applies gain G for adjustment to the moving subject determination value α output from the moving subject determination value computing unit 734, and outputs this integration result Gα to the integrator 743 and the subtractor 744. Note that the gain G for adjustment is supplied from the control unit 53.

The subtractor 744 subtracts the integration result Gα output from the integrator 741 from 1, and outputs the subtraction result (1−Gα) to the integrator 742.

The integrator 742 integrates a pixel value A of the observed image output from the A/D conversion circuit 22, and the subtraction result value (1−Gα) output from the subtractor 744, and outputs the integration result A(1−Gα) to the adder 745.

The integrator 743 integrates a pixel value B of the restored image output from the motion compensating unit 720, and the integration result value Gα output from the integrator 741, and outputs the integration result BGα to the adder 745.

The adder 745 adds the integration result A(1−Gα) output from the integrator 742, and the integration result BGα output from the integrator 743, and subsequently, outputs the addition result (A(1−Gα)+BGα) to the assumed deteriorated image pixel value computing unit 750 and the restored image creating unit 780 as a moving subject hiding process pixel value.

Thus, the pixel values of the observed image, and the restored image subjected to the motion compensating process are compared by the moving subject detecting unit 730, and a moving subject determination value is calculated. A weighted average between a pixel value of the observed image and a pixel value of the restored image is calculated by the moving subject hiding unit 740, according to the moving subject determination value. That is to say, the hiding process of a moving subject is executed such that the higher a moving subject degree is, the greater the rate of the observed image is. Note that, in the case of involving resolution conversion between the observed image and the restored image, the moving compensating process and the moving subject hiding process are executed after the resolution is matched with either the observed image or the restored image.

Thus, a moving subject is detected between images and a pixel of interest after alignment, and the feedback of the region thereof is limited, whereby deterioration due to the restoration process at the subject region thereof can be suppressed. Thus, the precision of the restoration process can be improved.

Figure 47:
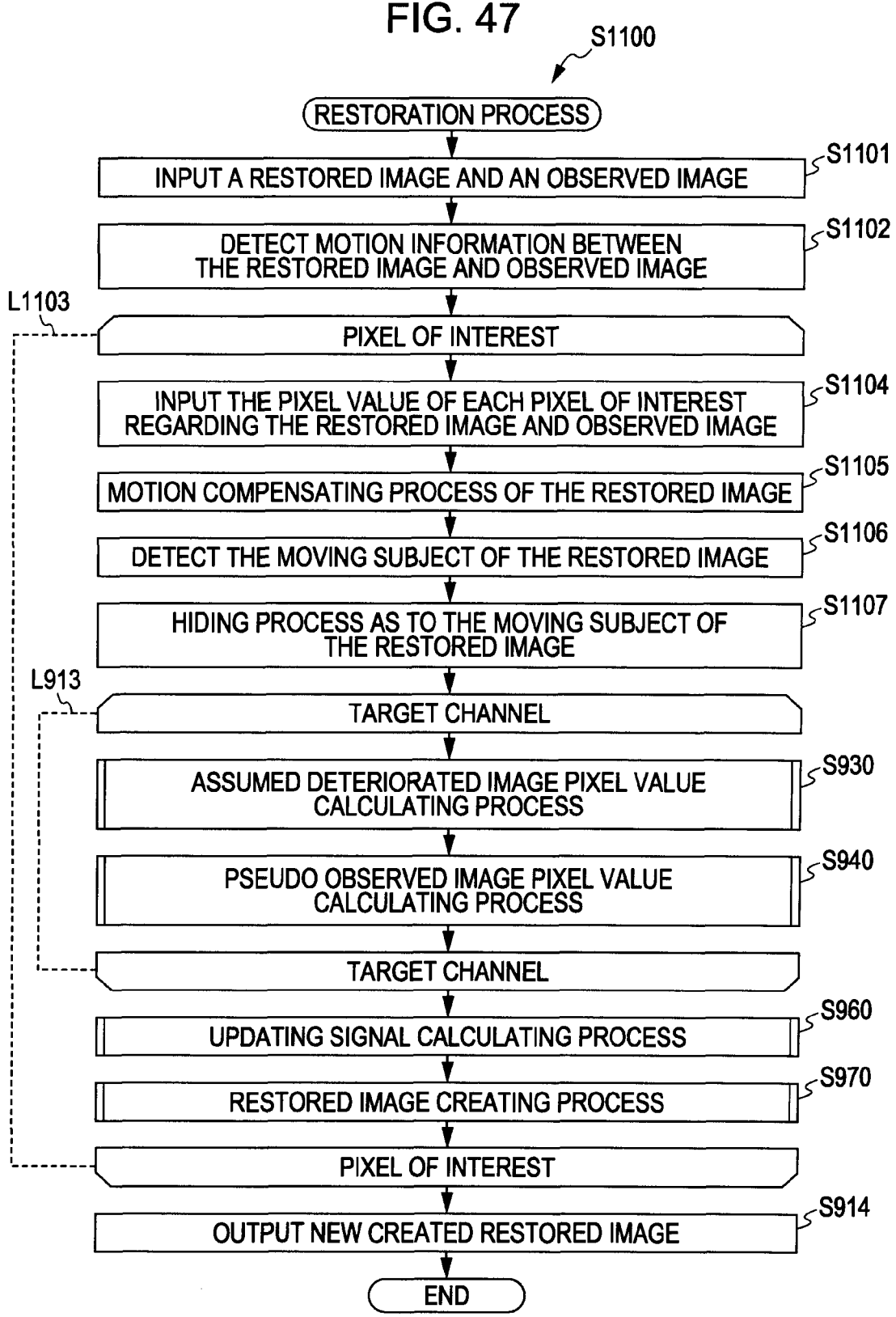
FIG. 47 is a flowchart illustrating the procedure of a restoration process by the restoration processing unit according to an embodiment of the present invention.

FIG. 47 is a flowchart illustrating the procedure of the restoration process by the restoration processing unit 700 according to an embodiment of the present invention. This restoration process is a process to be executed instead of step S910 shown in FIG. 15, and description regarding the other processes shown in FIG. 15 will be omitted.

First, the restoration processing unit 700 inputs the mosaic image (observed image) read out from the internal image memory of the image processing circuit 23, and the mosaic image (restored image) output from the restored image creating unit 140 (step S1101).

Next, the motion detecting unit 710 detects the motion information between the input observed image and the input restored image (step S1102).

Subsequently, in loop L1103, processes in steps S1104 through S1107, loop L913, steps S960, S970, and S914 are executed regarding each pixel of interest of the observed image and the restored image (two mosaic images). Note that the processes in loop L913, steps S960, and S970 are the same as the processes shown in FIG. 16, and accordingly, description thereof will be omitted here.

In loop L1103, first, the motion compensating unit 720 inputs the pixel value of each pixel of interest of the observed image and the restored image (step S1104), and subsequently, executes the motion compensating process of the restored image based on the motion information detected by the motion detecting unit 710 (step S1105). Next, the motion subject detecting unit 730 executes a moving subject detecting process regarding the restored image after motion compensation (step S1106). Subsequently, the moving subject hiding unit 740 executes the hiding process regarding the moving subject detected by the moving subject detecting unit 730 (step S1107). Note that an example has been described wherein a series of the restoration process is executed in increments of pixels, but each restoration process may be executed in increments of frames.

Figure 48:
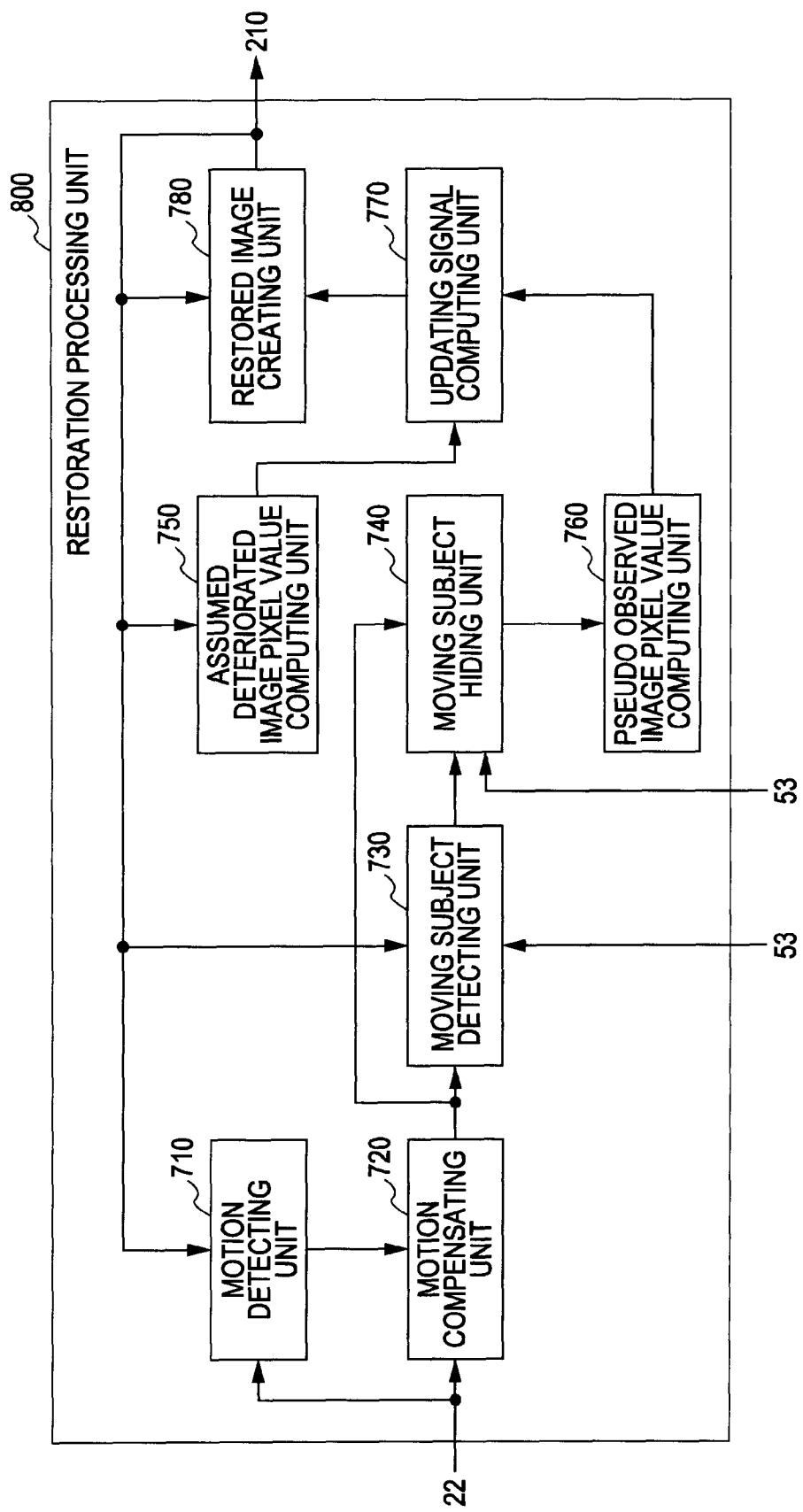
FIG. 48 is a block diagram illustrating a functional configuration example of a restoration processing unit according to an embodiment of the present invention.

Now, for example, in a case where a restoration process to output a still image is executed, after alignment of the observed image with the restored image of a frame to be subjected the restoration process as a reference, the restoration process is executed, whereby the restored image of an arbitrary frame can be obtained. Thus, in the case of executing a restoration process to output a still image, the motion compensating process and the moving subject hiding process are executed regarding the observed image. FIG. 48 illustrates a functional configuration example in this case.

FIG. 48 is a block diagram illustrating a functional configuration example of a restoration processing unit 800 according to an embodiment of the present invention. Note that the restoration processing unit 800 is a modification of the restoration processing unit 700 shown in FIG. 42, and differs from the restoration processing unit 700 in that the motion compensating process and the moving subject hiding process are executed regarding the observed image. The other configurations are the same as those of the restoration processing unit 700, and accordingly, a portion having the same function is denoted with the same reference numeral as in FIG. 42, and description thereof will be omitted here.

Thus, in a case where multiple times of an iterative process is executed regarding one observed image, or in a case where multiple observed images are input, the motion detection and motion compensation of each observed image or restored image are executed regarding a pixel of interest. Subsequently, after the motion detection and motion compensation, feedback between different channels is executed, whereby restoration effects can be further improved.

Figure 49:
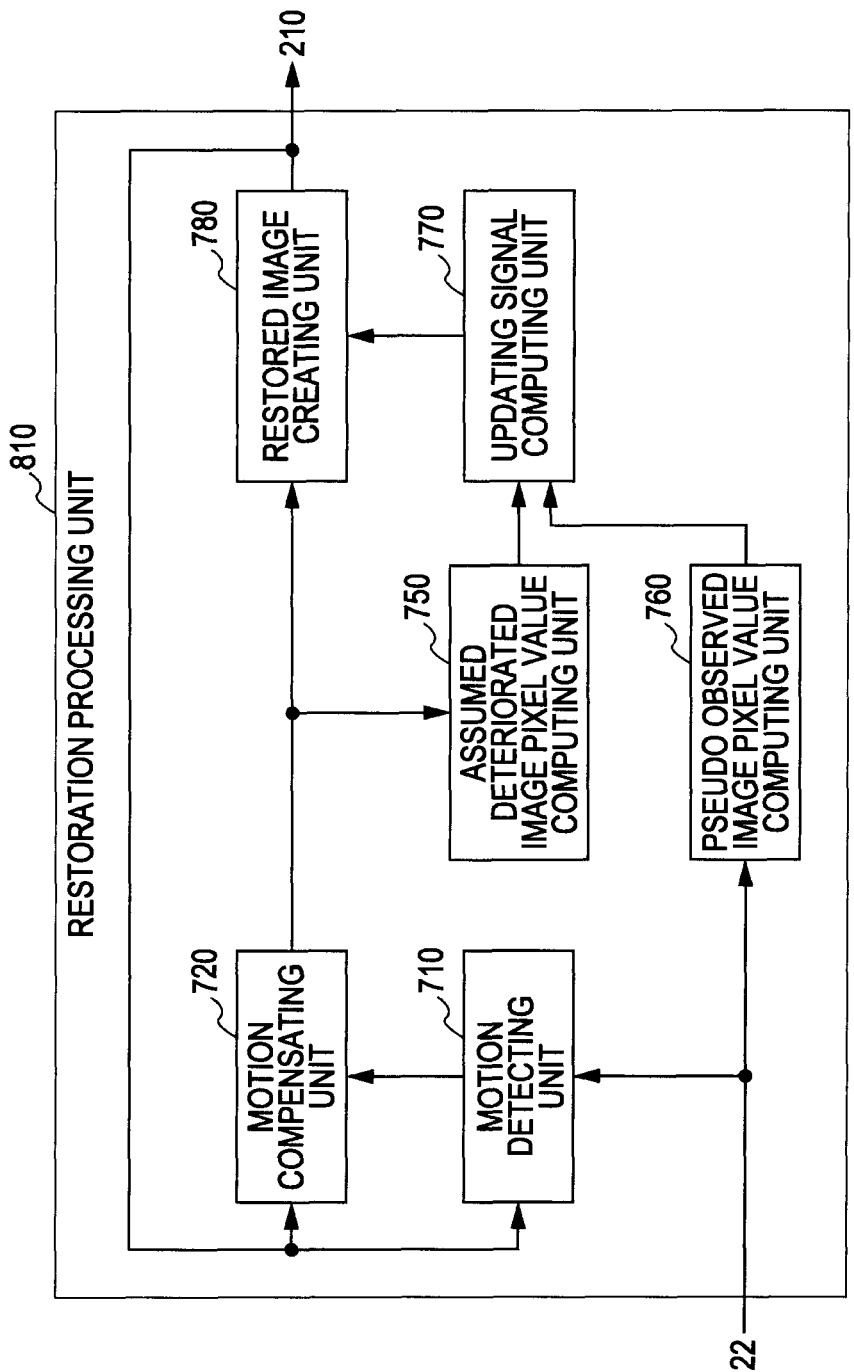
FIG. 49 is a block diagram illustrating a functional configuration example of a restoration processing unit according to an embodiment of the present invention.
Figure 50:
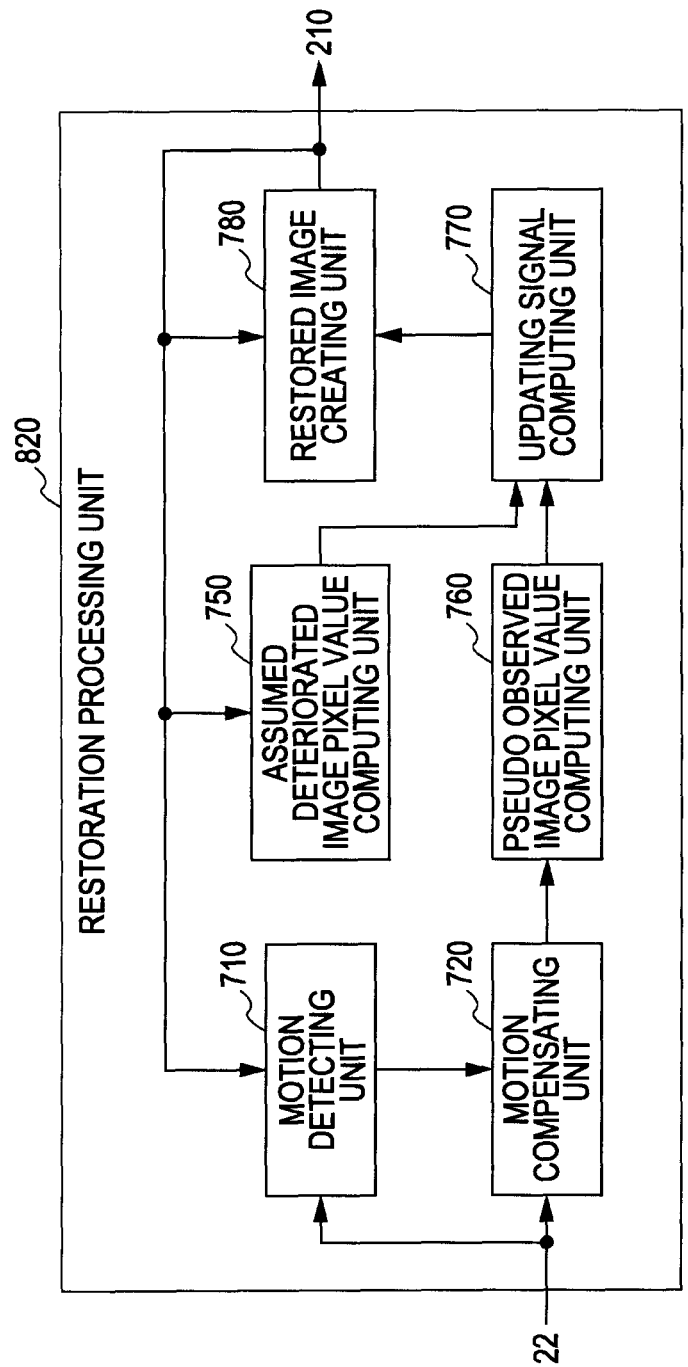
FIG. 50 is a block diagram illustrating a functional configuration example of a restoration processing unit according to an embodiment of the present invention.

Also, with regard to the restoration processing unit 700 shown in FIG. 42, and the restoration processing unit 800 shown in FIG. 48, the moving subject hiding process has been executed as an example, but for example, the moving subject hiding process may not be executed. Thus, the restoration processing unit can have a relatively simplified configuration. FIG. 49 illustrates a functional configuration example, for example, in the case of executing a restoration process wherein a moving image is output without executing the moving subject hiding process. Also, FIG. 50 illustrates a functional configuration example, for example, in the case of executing a restoration process wherein a still image is output without executing the moving subject hiding process.

FIG. 49 is a block diagram illustrating a functional configuration example of a restoration processing unit 810 according to an embodiment of the present invention. FIG. 50 is a block diagram illustrating a functional configuration example of a restoration processing unit 820 according to an embodiment of the present invention. Note that the restoration processing unit 810 is a modification of the restoration processing unit 700 shown in FIG. 42, and differs from the restoration processing unit 700 in that the moving subject hiding process is not executed. Note that the restoration processing unit 820 is a modification of the restoration processing unit 800 shown in FIG. 48, and differs from the restoration processing unit 800 in that the moving subject hiding process is not executed. The other configurations are the same as those of the restoration processing unit 700 or 800, and accordingly, a portion having the same function is denoted with the same reference numeral as in FIG. 42 or FIG. 48, and description thereof will be omitted here.

Also, description has been made so far regarding the example wherein in the case of calculating a pseudo observed image pixel value, when the channel (reference channel) of a pixel of interest differs from the target channel, a pseudo observed image pixel value is calculated by using the pixel values of the reference channel and the target channel adjacent thereto. However, for example, a combination between the target channel and the reference channel may be selected according to the correlativity between channels and the frequency properties of channels of an observed image. Thus, restoration effects can be improved.

FIG. 51 is a diagram illustrating relationship between a reference channel and a target channel used for the pseudo observed image pixel value calculating process according to an embodiment of the present invention. With the example shown in FIG. 51, relationship between channels is high, but a combination example is illustrated assuming a case where the frequency properties of the channels R and B are inferior to those of the channels Gr and Gb. For example, in a case where the target channel is R or B, all of the channels R, B, Gr, and Gb are employed as the reference channel. On the other hand, in a case where the target channel is Gr or Gb, the channels Gr and Gb are employed as the reference channel. That is to say, in the case of the target channel being Gr or Gb, the pseudo observed image pixel value calculating process can be executed by employing a channel other than a pixel of interest as the reference channel.

For example, heretofore, in the case of executing image restoration by calculating an updating signal from an assumed deteriorated image created from an observed image or restored image being subjected to a deterioration filter, a feedback process has been executed generally by channel within the same channel even regarding the image is made up of multiple channels. On the other hand, with an embodiment of the present invention, in addition to feedback from the same channel, the restoration process is executed between a pseudo observed image created from a different channel of an observed image in a pseudo manner, and an assumed deteriorated image, thereby executing a feedback process between channels. Thus, restoration effects can be improved. In other words, with the restoration process of a deteriorated image, in addition to feedback between images, feedback between channels within an image is executed, whereby feedback effects can be further improved.

That is to say, with an embodiment of the present invention, in the case of executing the restoration process of an observed image made up of multiple channels, an assumed deteriorated image pixel value and a pseudo observed image pixel value are calculated for each channel. Subsequently, an updating signal is created based on a difference value or division value for each channel, and a restored image is created by using this updating signal. Thus, as compared to the case where the restoration process is executed by using an assumed deteriorated image pixel value alone, the precision of the restoration process can be improved. Also, an assumed deteriorated image pixel value is calculated by using the pixel values of the same channel as the target channel, and a pseudo observed image pixel value is calculated by using the pixel values of the target channel and the reference channel. Thus, as compared to the case where the restoration process is executed by using only an assumed deteriorated image pixel value calculated by using the pixel values of the same channel as the target channel, the precision of the restoration process can be improved. That is to say, a pseudo observed image pixel value is calculated based on the correlation of the pixel values between channels, and the restoration process is executed by using this, whereby the precision of the restoration process can be improved.

Also, with an embodiment of the present invention, the difference value or division value between a pseudo observed image and an assumed deteriorated image is fed back to a restored image by executing resampling according to sensor deterioration, thereby updating the restored image. This feedback is executed in a different combination of channels, whereby high restoration effects can be obtained as compared to the case of feedback between the same channels.

Note that, with an embodiment of the present invention, a configuration example of the image processing circuit 23 has been shown wherein the restoration processing unit 100 is disposed before the white balance processing unit 210, but an arrangement may be made wherein the restoration processing unit 100 is disposed in the other position of the image processing circuit 23.

Also, an embodiment of the present invention may be applied as a signal process within an imaging apparatus such as a digital video camera, a digital still camera, or the like, or within an image processing apparatus such as a printer, a display, or the like. Also, an embodiment of the present invention may be applied to an image processing apparatus or computer program for image processing and editing, or the like.

Also, with an embodiment of the present invention, an example of three times has been shown as resolution conversion assuming deterioration due to the imaging device, but an arbitrary magnification ratio may be assumed.

Note that an embodiment of the present invention shows an example to realize the present invention, which has correspondence relationship with each of features of the present invention, as described above. However, the present invention is not restricted to the above-mentioned embodiments, and various modifications can be made without departing from the essence of the present invention.

Also, the procedures described with the above-mentioned embodiments may be taken as a method having these series of procedures, or may be taken as a program through a recording medium which stores the program thereof to cause a computer to execute these series of procedures. Examples of this recording medium include CD (Compact Disc), MD (Mini-Disc), DVD (Digital Versatile Disk), memory card, and Blu-ray Disc (registered trademark).

The present application contains subject matter related to that disclosed in Japanese Priority Patent Application JP filed in the Japan Patent Office on Aug. 25, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image restoration processing apparatus comprising:
a memory storing an image comprising a plurality of channels and a plurality of pixels, each pixel corresponding to a location within said image, and having a pixel value corresponding to one of said plurality of channels; and
a processor configured to:
select one of said plurality of pixels as a pixel of interest;
calculate an assumed deteriorated pixel value of the pixel of interest for each of said plurality of channels, wherein said assumed deteriorated pixel values are calculated based on the pixel value of the pixel of interest and the pixel values of pixels proximate to the pixel of interest;
select one of said plurality of channels as a target channel;
calculate a pseudo observed image pixel value of the pixel of interest for each of said plurality of channels, wherein
the pseudo observed image pixel value is the pixel value of the pixel of interest if the channel of the pixel of interest and the target channel are identical, and
the pseudo observed image pixel value is calculated based on the pixel value of the pixel of interest and the pixel values of pixels proximate to the pixel of interest if the channel of the pixel of interest and the target channel are different; and
create a restored image based on said assumed deteriorated pixel values and said pseudo observed image pixel values.

2. The image restoration processing apparatus according to claim 1, wherein the processor is configured to:
calculate pseudo observed image pixel values based on a target channel that is identical to the channel of the pixel of interest and a target channel that is different from the channel of the pixel of interest.

3. The image restoration processing apparatus according to claim 1, wherein the processor is configured to:
calculate the spatial high-frequency component of each pixel of a first channel that is the channel of said pixel of interest of the pixels proximate to said pixel of interest;
calculate the spatial low-frequency component of said first channel of the pixels proximate to said pixel of interest;
calculate the spatial low frequency component of each pixel of a second channel that is a channel different from said first channel of the pixels proximate to said pixel of interest;
calculate the scaling coefficient of said spatial high-frequency component based on the spatial low-frequency component according to said second channel, and the spatial low-frequency component according to said first channel; and
calculate said pseudo target image pixel value of said second channel based on the spatial low-frequency component according to said second channel, the spatial high-frequency component according to said first channel, and said scaling coefficient.

4. The image restoration processing apparatus according to claim 1, wherein the processor is configured to:
calculate a linear approximation straight line where a pixel value distribution regarding the pixel values of pixels of a first channel that is the channel of said pixel of interest, and a second channel that is a different channel from said first channel, of said pixel of interest, and the pixels proximate to the pixel of interest, is subjected to linear approximation; and estimate said pseudo target image pixel value of said second channel from the pixel value of said pixel of interest by using said linear approximation straight line.

5. The image restoration processing apparatus according to claim 1, wherein the processor is configured to:
   interpolate, at the position of a pixel of a first channel that is the channel of said pixel of interest, of the pixels proximate to the pixel of interest, the pixel values of two pixels of a second channel that is a channel different from said first channel to calculate an interpolation value;
   integrate difference value weight corresponding to the difference value of said pixel of interest, and the pixel value of a pixel of said first channel proximate to the pixel of interest, distance weight corresponding to distance between said pixel of interest and a pixel of said first channel proximate to the pixel of interest, and said interpolation value for each pixel of said first channel of the pixels proximate to the pixel of interest; and add the integrated values integrated for each of the pixels to calculate a first sum-of-products value;
   integrate said difference value weight and said distance weight for each pixel of said first channel of the pixels proximate to the pixel of interest, and add the integrated values integrated for each of the pixels to calculate a second sum-of-products value; and
   calculate said pseudo target image pixel value of said second channel based on said first sum-of-products value and said second sum-of-products value.

6. The image restoration processing apparatus according to claim 1, wherein said processor is configured to:
   calculate the pixel values of said assumed deteriorated image by using the blurring function for each channel regarding the pixel values of the pixel corresponding to said pixel of interest and pixels proximate to the pixel of interest, which are pixels making up said restored image created most recently by said restored image creating unit.

7. The image restoration processing apparatus according to claim 1, wherein said processor is configured to:
   calculate the difference value between said calculated assumed deteriorated image pixel value and said calculated pseudo target image pixel value; and
   calculate an updating signal used for creating said restored image based on the difference value thereof;
      wherein said restored image is based on said calculated updating signal.

8. An imaging apparatus comprising:
   an ND conversion circuit configured to convert an analog signal into a digital image comprising a plurality of channels and a plurality of pixels, each pixel corresponding to a location within said image, and having a pixel value corresponding to one of said plurality of channels; and
   a processor configured to:
      select one of said plurality of pixels as a pixel of interest;
      calculate an assumed deteriorated pixel value of the pixel of interest for each of said plurality of channels, wherein said assumed deteriorated pixel values are calculated based on the pixel value of the pixel of interest and the pixel values of pixels proximate to the pixel of interest;
      select one of said plurality of channels as a target channel;
      calculate a pseudo observed image pixel value of the pixel of interest for each of said plurality of channels, wherein
         the pseudo observed image pixel value is the pixel value of the pixel of interest if the channel of the pixel of interest and the target channel are identical, and
         the pseudo observed image pixel value is calculated based on the pixel value of the pixel of interest and the pixel values of pixels proximate to the pixel of interest if the channel of the pixel of interest and the target channel are different; and
      create a restored image based on said assumed deteriorated pixel values and said pseudo observed image pixel values.

9. An image restoration processing method comprising the steps of:
   selecting a pixel of interest in an image comprising a plurality of channels and a plurality of pixels, each pixel of said image corresponding to a location within said image, and having a pixel value corresponding to one of said plurality of channels;
   calculating an assumed deteriorated pixel value of the pixel of interest for each of said plurality of channels, wherein said assumed deteriorated pixel values are calculated based on the pixel value of the pixel of interest and the pixel values of pixels proximate to the pixel of interest;
   selecting one of said plurality of channels as a target channel;
   calculating a pseudo observed image pixel value of the pixel of interest for each of said plurality of channels, wherein
      the pseudo observed image pixel value is the pixel value of the pixel of interest if the channel of the pixel of interest and the target channel are identical, and
      the pseudo observed image pixel value is calculated based on the pixel value of the pixel of interest and the pixel values of pixels proximate to the pixel of interest if the channel of the pixel of interest and the target channel are different; and
   creating a restored image based on said assumed deteriorated pixel values and said pseudo observed image pixel values.

10. A non-transitory computer-readable medium storing program instructions that, when executed by a processor, cause the processor to perform a data processing method for restoring an image, the method comprising the steps of:
   selecting a pixel of interest in an image comprising a plurality of channels and a plurality of pixels, each pixel of said image corresponding to a location within said image, and having a pixel value corresponding to one of said plurality of channels;
   calculating an assumed deteriorated pixel value of the pixel of interest for each of said plurality of channels, wherein said assumed deteriorated pixel values are calculated based on the pixel value of the pixel of interest and the pixel values of pixels proximate to the pixel of interest;
   selecting one of said plurality of channels as a target channel;
   calculating a pseudo observed image pixel value of the pixel of interest for each of said plurality of channels, wherein
      the pseudo observed image pixel value is the pixel value of the pixel of interest if the channel of the pixel of interest and the target channel are identical, and
      the pseudo observed image pixel value is calculated based on the pixel value of the pixel of interest and the pixel values of pixels proximate to the pixel of interest if the channel of the pixel of interest and the target channel are different; and creating a restored image based on said assumed deteriorated pixel values and said pseudo observed image pixel values.

\* \* \* \* \*